United States Patent
Raduchel et al.

(10) Patent No.: US 12,222,231 B2
(45) Date of Patent: *Feb. 11, 2025

(54) WATER METERING SYSTEM

(71) Applicant: Vaughn Realty Ventures LLC, Great Falls, VA (US)

(72) Inventors: William J. Raduchel, Palo Alto, CA (US); Bradley Moser Vaughn, Burlingame, CA (US)

(73) Assignee: Vaughn Realty Ventures LLC, Great Falls, VA (US)

( * ) Notice: Subject to any disclaimer, the term of this patent is extended or adjusted under 35 U.S.C. 154(b) by 501 days.

This patent is subject to a terminal disclaimer.

(21) Appl. No.: 17/572,610

(22) Filed: Jan. 10, 2022

(65) Prior Publication Data
US 2022/0128388 A1 Apr. 28, 2022

Related U.S. Application Data

(63) Continuation-in-part of application No. 16/288,519, filed on Feb. 28, 2019, now Pat. No. 11,221,245, (Continued)

(51) Int. Cl.
*G01F 1/66* (2022.01)
*G01F 1/696* (2006.01)
(Continued)

(52) U.S. Cl.
CPC .............. *G01F 1/666* (2013.01); *G01F 1/696* (2013.01); *H04Q 9/00* (2013.01); *G01F 15/063* (2013.01);
(Continued)

(58) Field of Classification Search
CPC ........ G01F 1/666; G01F 1/696; G01F 15/063; G01F 15/0755; H04Q 9/00; H04Q 2209/40; H04Q 2209/60
(Continued)

(56) References Cited

U.S. PATENT DOCUMENTS 5,502,652 A * 3/1996 Hoggatt ................. G06Q 50/06
702/54
5,986,573 A * 11/1999 Franklin ............... G01F 15/005
73/195

(Continued)

FOREIGN PATENT DOCUMENTS

CN 1576803 2/2005
CN 1650149 8/2005
(Continued)

OTHER PUBLICATIONS

Office Action in Chinese Appln. No. 202110835992, dated Mar. 23, 2024, 13 pages (with English translation).
(Continued)

*Primary Examiner* — Naomi J Small
(74) *Attorney, Agent, or Firm* — Fish & Richardson P.C.

(57) ABSTRACT

Methods, systems, and apparatus, including computer programs encoded on a computer storage medium, for water metering are disclosed. In one aspect, sensor data can be received from a flexible sensing device fitted to medium that includes a restricted area through which fluid can move over a period of time. At least one of a level of vibration of the medium or a level of audio energy from the medium in the period of time is identified. A flow rate of fluid moving through the restricted area of the medium is determined. An event at a property that receives at least a portion of the fluid moving through the restricted area of the medium is determined. A notification indicating the event at the property is generated.

40 Claims, 14 Drawing Sheets

Related U.S. Application Data which is a continuation of application No. 15/896,258, filed on Feb. 14, 2018, now Pat. No. 10,222,246, which is a continuation of application No. 15/652,578, filed on Jul. 18, 2017, now Pat. No. 9,897,472.

(60) Provisional application No. 62/363,754, filed on Jul. 18, 2016.

(51) Int. Cl.
    *H04Q 9/00*    (2006.01)
    *G01F 15/063*   (2022.01)
    *G01F 15/075*   (2006.01)

(52) U.S. Cl.
    CPC ..... *G01F 15/0755* (2013.01); *H04Q 2209/40* (2013.01); *H04Q 2209/60* (2013.01)

(58) Field of Classification Search
    USPC .................................................. 340/870.02
    See application file for complete search history.

(56) References Cited

U.S. PATENT DOCUMENTS

| | | | |
|---|---|---|---|
| 6,161,100 A | 12/2000 | Saar | |
| 6,178,816 B1 | 1/2001 | Katzman | |
| 6,250,371 B1 * | 6/2001 | Amerman | F28D 20/0052 165/47 |
| 6,595,071 B1 * | 7/2003 | Doten | G01F 1/66 73/861.29 |
| 7,057,507 B1 | 6/2006 | Sandifer | |
| 7,637,277 B2 | 12/2009 | Norman | |
| 8,749,393 B1 * | 6/2014 | Tollefson | G01M 3/2815 137/460 |
| 9,291,483 B2 | 3/2016 | Mikami | |
| 9,335,297 B1 | 5/2016 | Cummins | |
| 9,574,923 B2 | 2/2017 | Williamson | |
| 10,914,055 B2 | 2/2021 | Kovscek et al. | |
| 2005/0011278 A1 | 1/2005 | Brown et al. | |
| 2006/0032317 A1 | 2/2006 | Furmidge | |
| 2009/0173168 A1 | 7/2009 | Cottam | |
| 2010/0231407 A1 * | 9/2010 | Carr | H04Q 9/00 340/10.3 |
| 2011/0282596 A1 | 11/2011 | Patel et al. | |
| 2012/0227647 A1 | 9/2012 | Gelinske et al. | |
| 2012/0305113 A1 | 12/2012 | Williamson | |
| 2013/0085688 A1 | 4/2013 | Miller et al. | |
| 2013/0211745 A1 | 8/2013 | Jaeger | |
| 2014/0121999 A1 | 5/2014 | Bracken | |
| 2014/0165719 A1 | 6/2014 | Williamson | |
| 2014/0192511 A1 | 7/2014 | Mikami | |
| 2014/0307414 A1 | 10/2014 | Mikami | |
| 2015/0253215 A1 | 9/2015 | Tomiyama | |
| 2017/0285665 A1 | 10/2017 | Nunally et al. | |
| 2017/0307466 A1 * | 10/2017 | Brennan, Jr. | G01F 1/666 |
| 2021/0183227 A1 | 6/2021 | Kovscek et al. | |

FOREIGN PATENT DOCUMENTS

| | | |
|---|---|---|
| CN | 1777792 | 4/2009 |
| CN | 102466501 | 5/2012 |
| CN | 102636226 | 8/2012 |
| CN | 103003670 | 3/2013 |
| EP | 2840362 | 2/2015 |
| JP | 2005098995 | 4/2005 |
| JP | 2012058186 | 3/2012 |
| WO | WO 2012153609 | 11/2012 |
| WO | WO 2015040607 | 3/2015 |

OTHER PUBLICATIONS

CN Office Action in Chinese Application No. 201780054863.9 dated Apr. 8, 2020, 17 pages (with English Translation).
CN Office Action in Chinese Application No. 201780054863.9 dated Feb. 8, 2021, 9 pages (with English Translation).
EP Office Action in European Appln. No. 17831668.3 dated Feb. 19, 2021, 6 pages.
Extended European Search Report in European Application No. 17831668.3, dated Jun. 6, 2019, 8 pages.
International Search Report in International Application No. PCT/US2017/42526, dated Oct. 3, 2017, 56 pages (with English translation).
Extended European Search Report in European Application No. 21193186.0, dated Feb. 25, 2022, 12 pages.
International Preliminary Report on Patentability in International Application No. PCT/US2017/042526, dated Jan. 31, 2019, 5 pages.

\* cited by examiner

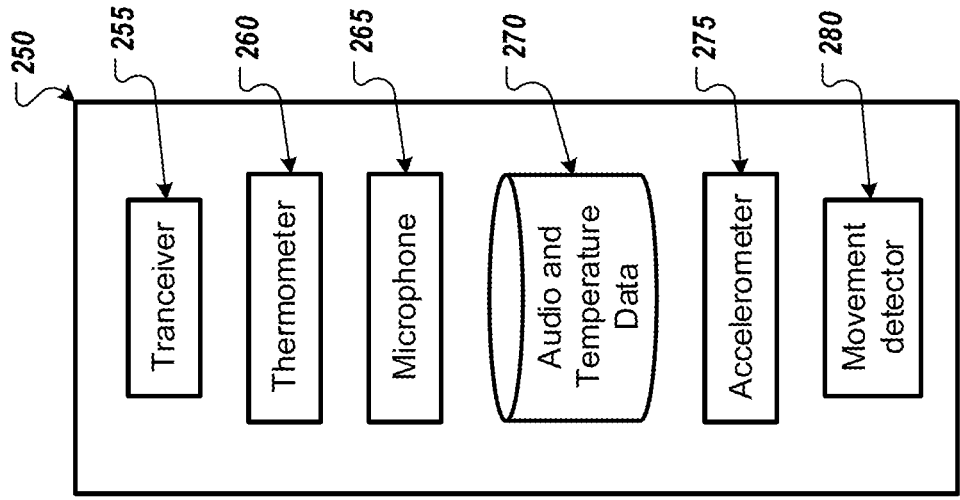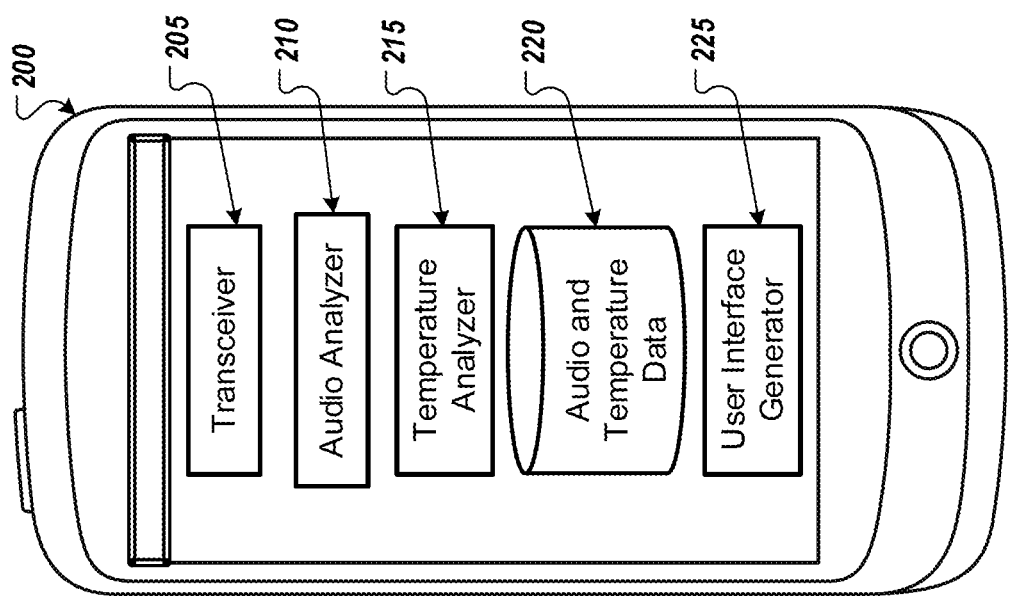
FIG. 2

300

```
┌─────────────────────────────────────────────┐
│ Receive, from a first meter that is connected to a first │
│ pipe, first audio data collected during a time period │
│ and first temperature data collected during the time │
│                    period                   │
│                                         310 │
└─────────────────────────────────────────────┘
                      │
                      ▼
┌─────────────────────────────────────────────┐
│ Receive, from a second meter that is connected to a │
│ second pipe, second audio data collected during the │
│ time period and second temperature data collected │
│              during the time period         │
│                                         320 │
└─────────────────────────────────────────────┘
                      │
                      ▼
┌─────────────────────────────────────────────┐
│ Based on the first audio data, the first temperature │
│    data, the second audio data, and the second │
│    temperature data, determine a first amount of │
│ material that has flowed through the first pipe during │
│   the time period relative to a second amount of │
│   material that has flowed through the second pipe │
│                                         330 │
└─────────────────────────────────────────────┘
```

FIG. 3

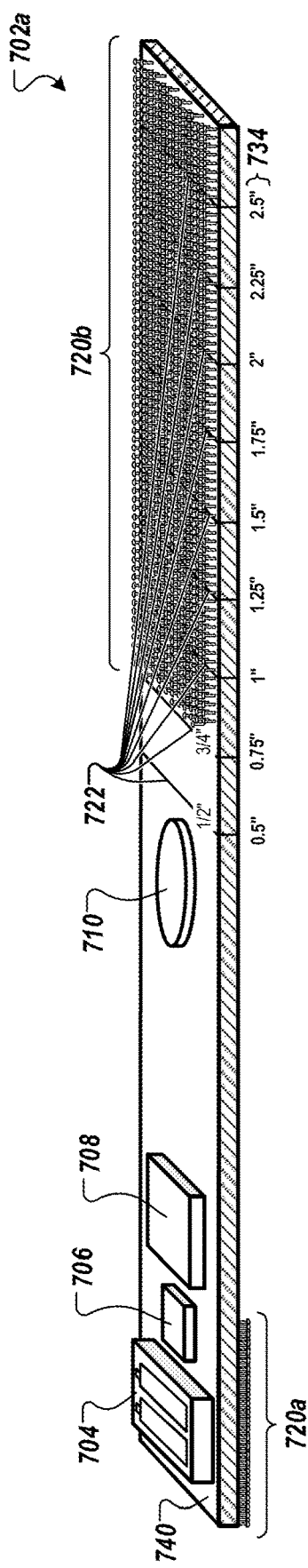
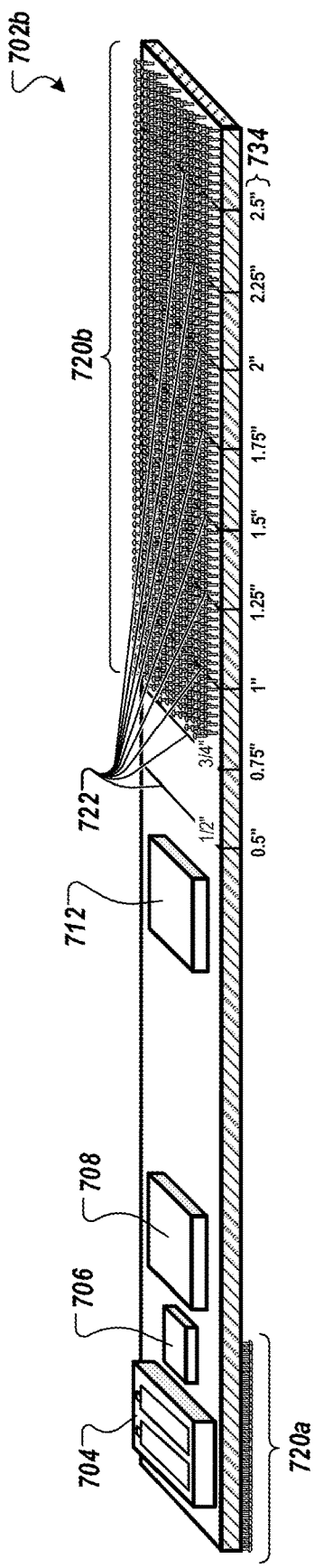
FIG. 7A
FIG. 7B

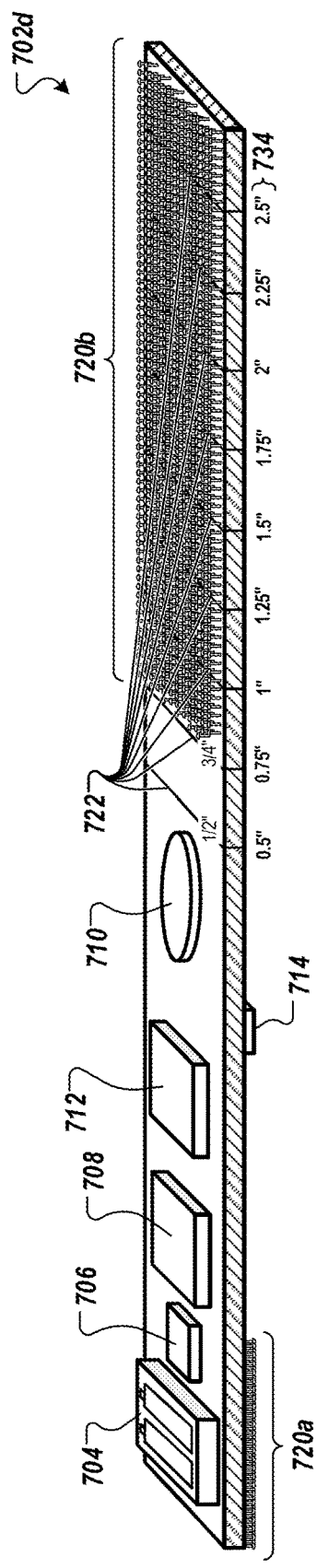
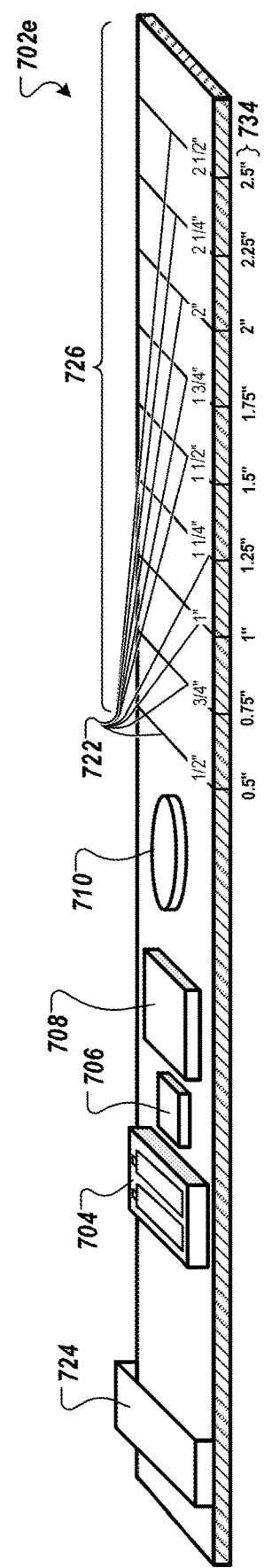
FIG. 7D
FIG. 7E

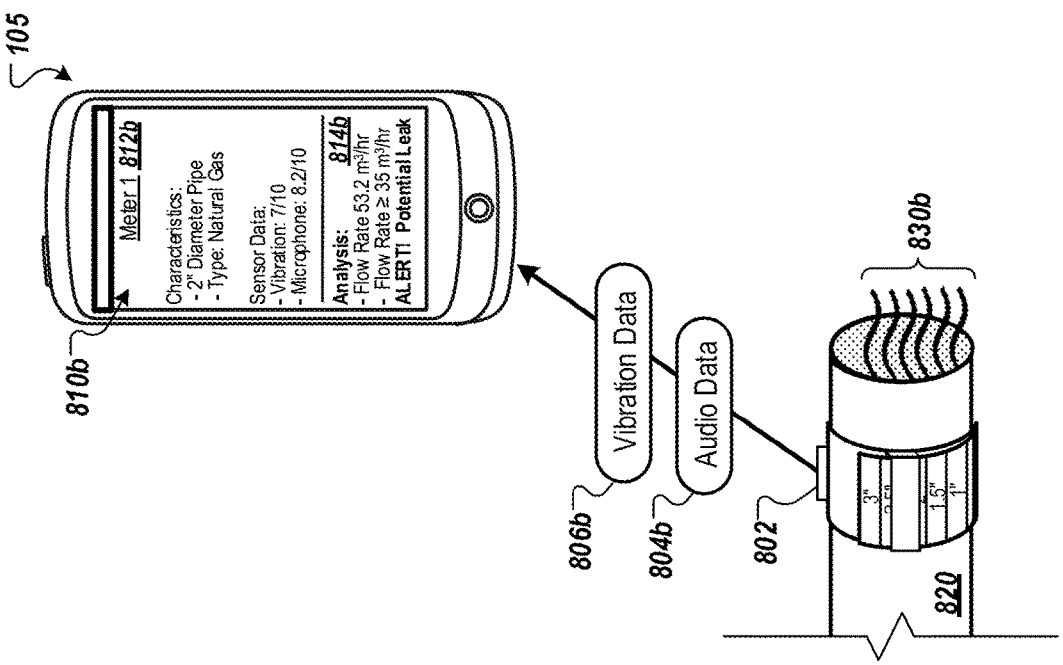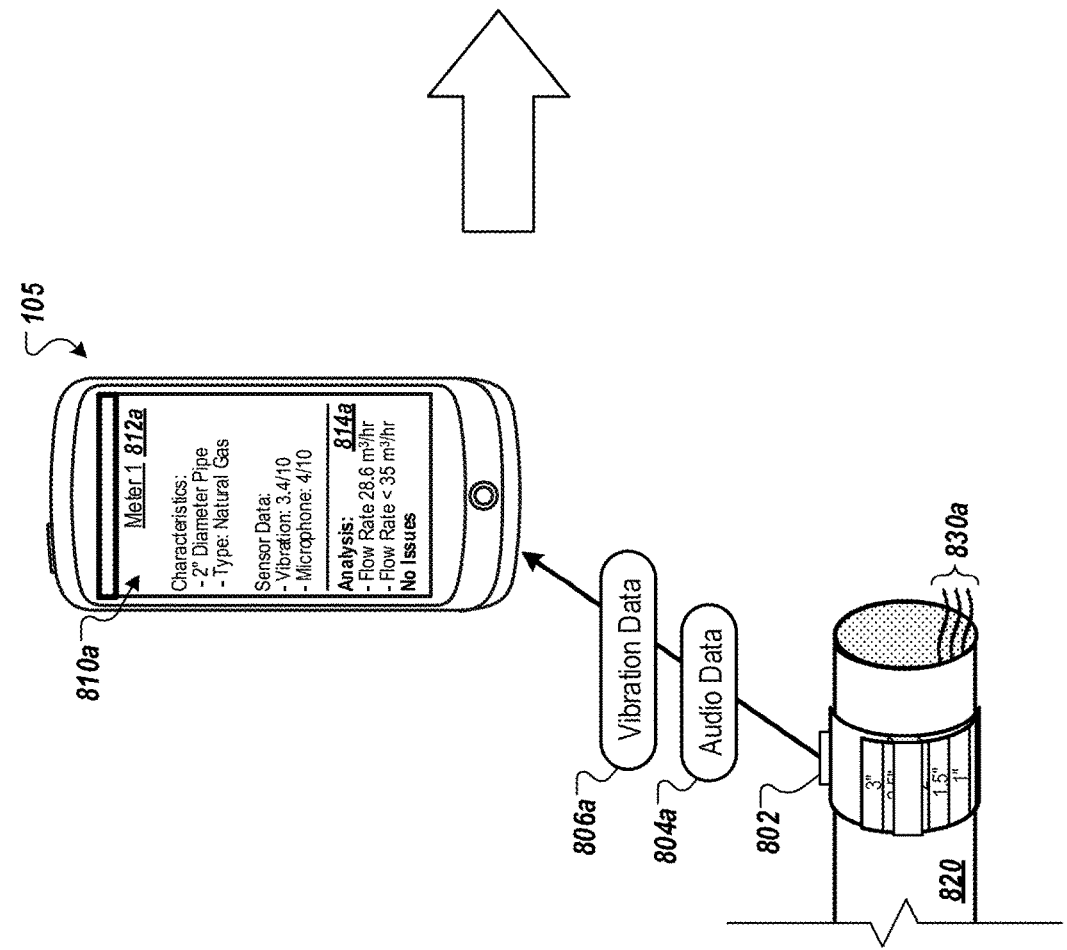
FIG. 8

1100

| Meter | Vibration Data | Audio Data | Temperature Data | Event |
|---|---|---|---|---|
| Meter A | 2.0-3.4 | 2.6-3.4 | 65°F-115°F | Appliance A is running |
| Meter A | 3.-4.5 | 4.1-5.2 | 65-75°F; 85°F-95°F; or 110°F-120°F | Appliance B is running |
| Meter A | 5-7.9 | 5.7-6.9 | 65°F-120°F | Appliance A and Appliance B running |
| Meter A | 1.1-1.8 | 2.2-3.1 | 75°F-110°F | Drainage leak (w. Appliance A running) |
| Meter B | 5.5-6.2 | 3.5-4.2 | 111°F-125°F | Hot water normal |
| Meter B | 2.4-5.2 | 2.8-3.4 | < 110°F | Hot water leak |
| Meter C | 5.2-5.9 | 3.4-4.1 | < 60°F | Cold water normal |
| Meter C | 2.2-5.0 | 2.7-3.7 | 70-85°F | Cold water leak |
| ... | ... | ... | ... | ... |

1102

FIG. 11

WATER METERING SYSTEM

CROSS REFERENCE TO RELATED APPLICATION

This application is a continuation-in-part of U.S. application Ser. No. 16/288,519, filed Feb. 28, 2019, which is a continuation of U.S. application Ser. No. 15/896,258, filed Feb. 14, 2018, which is a continuation of U.S. application Ser. No. 15/652,578, filed on Jul. 18, 2017, which claims the benefit of U.S. Application No. 62/363,754, filed on Jul. 18, 2016. Each of the applications are incorporated by reference.

TECHNICAL FIELD

This specification generally relates to measuring water flow.

BACKGROUND

Water metering is the process of measuring water use. Water meters may be used to measure the volume of water used by residential and commercial buildings that are supplied with water by a public water supply system. Water meters can also be used at the water source, well, or throughout a water system to determine flow through a particular portion of the system.

SUMMARY

This specification describes a sensing device for monitoring the flow of fluid through a medium and techniques for using the sensing device to determine events at a property or a state of the property. The sensing device can be a battery-operated device that is externally fitted to a medium, such as a pipe through which water or other fluids flow. The sensing device can be flexible and may include flexible components such as flexible electronic components so that it can be externally wrapped around pipes of varying sizes. The sensing device can be equipped with one or more sensors that are used to collect sensor data from the medium, such as a microphone, a vibration sensor, or a temperature sensor. The collected sensor data can be used by one or more computer systems to determine, for example, a flow rate for fluid or material flowing through the medium and the temperature of the fluid or material flowing through or in the medium. The one or more computer systems can use these determinations to make more intelligent determinations as to different events occurring or problems at a property where the sensing device is installed. For example, where a sensing device is fitted to a drain line of a washing machine of the property, a computing system can use a flow rate determined from the sensor data to determine if the washing machine is running, when the washing machine started running, and when the washing machine stopped running. The computing system can also use the determined temperature of the water to determine the type of cycle that the washing machine was running in.

The sensing device can operate at least part of the time in a low-power mode. For example, the sensing device can operate in a mode where power drawn by one or more electrical components of the sensing device is restricted or stopped. The sensing device can include one or more components configured to wake the device in particular events, such as a wake-on-sound microphone that can wake the sensing device from a low-power mode when it detects audio energy levels above a threshold audio energy level. By operating at least part of the time in a low-power mode, the power life of the sensing device can be greatly increased.

The sensing device can communicate through or otherwise belong to a low-power local area network. For example, the sensing device can be a node in a LR-WPAN mesh network. Other sensing devices can serve as nodes on this network, such as other sensing devices that are fitted to other pipes in the same property. A computing system can collect the sensor data from these multiple sensing devices and use the collection of sensor data to intelligently determine one or more events occurring or problems at a property where the multiple sensing devices are installed. For example, if data from a first sensing device on a cold water intake line for a washer indicates that the washer is on and data from a second sensing on a drain line for the washer indicates that the washer is not on, the computing system can determine that there is leak along the cold water intake line or that that washer is leaking water.

In identifying events or problems, the computing system can use one or more machine learning models that are trained to recognize typical operations of pipes (e.g., flow rate and/or ambient conditions for non-fault situations), appliances that receive fluid from the pipes, or fixtures that receive fluid from the pipes. The one or machine learning models can also be trained to recognize the typical behavior of occupants of the property where one or more sensing devices are installed. For example, the computing system may issue a warning in response to sensor data indicating that more than a threshold volume of water has flowed through a particular faucet in a home over the past 24 hours when the occupants of the home typically do not use half the threshold volume in a 24 hour period. The one or more machine learning models can be updated over time using, for example, collected sensor data and occupant feedback to improve output accuracy and to account for changes to typical operation and behavior. The device may be configured to receive status information from other appliances or devices that allow the device to dynamically change thresholds For example, an "away" message from a door or alarm system may be used to increase the sensitivity of ambient sounds in a water pipe.

According to an innovative aspect of the subject matter described in this application, a method for metering water includes the actions of receiving, from a first meter that is connected to a first pipe, first audio data collected during a time period and first temperature data collected during the time period; receiving, from a second meter that is connected to a second pipe, second audio data collected during the time period and second temperature data collected during the time period; and based on the first audio data, the first temperature data, the second audio data, and the second temperature data, determining a first amount of material that has flowed through the first pipe during the time period relative to a second amount of material that has flowed through the second pipe.

These and other implementations can each optionally include one or more of the following features. The action of determining a first amount of material that has flowed through the first pipe during the time period relative to a second amount of material that has flowed through the second pipe includes the actions of determining that a first temperature of the first pipe has changed by at least a threshold temperature change during a particular amount of time; determining that a second temperature of the second pipe has changed by at least the threshold temperature change during the particular amount of time; after determining that the first temperature of the first pipe has changed by at least the threshold temperature change during the particular amount of time, determining a first elapsed time that the first temperature of the first pipe is changing; after determining that the second temperature of the second pipe has changed by at least the threshold temperature change during the particular amount of time, determining a second elapsed time that the second temperature of the second pipe is changing; and based on the first elapsed time and the second elapsed time, determining the first amount of material that has flowed through the first pipe during the particular amount of time relative to the second amount of material that has flowed through the second pipe during the particular amount of time.

The action of determining a first amount of material that has flowed through the first pipe during the time period relative to a second amount of material that has flowed through the second pipe includes the actions of based on the first audio data, determining a first level of first audio energy that corresponds to the first audio data; based on the second audio data, determining a second level of second audio energy that corresponds to the second audio data; determining that the first level of first audio energy has changed by at least a threshold energy change during the particular amount of time; determining that the second level of audio energy has changed by at least the threshold energy change during the particular amount of time; after determining that the first level of first audio energy has changed by at least the threshold energy change during the particular amount of time, determining a first elapsed time that the first level of the first audio energy has changed by at least the threshold energy change; after determining that the second level of second audio energy has changed by at least the threshold energy change during the particular amount of time, determining a second elapsed time that the second level of the second audio energy has changed by at least the threshold energy change; and based on the first elapsed time and the second elapsed time, determining the first amount of material that has flowed through the first pipe during the particular amount of time relative to the second amount of material that has flowed through the second pipe during the particular amount of time.

The first pipe and the second pipe are water pipes and the material is water. The first pipe and the second pipe are gas pipes and the material is natural gas or propane. The actions further include transmitting a request for meter data. The first and second audio data and the first and second temperature data are received in response to the request for meter data. The actions further include receiving, from the first meter, data indicating that the first meter moved during the time period; and in response to receiving the data indicating that the first meter moved during the time period, providing, for display, data indicating movement of the first meter. The actions further include receiving, from a third meter that is connected to a third pipe that feeds into the first pipe and the second pipe, flow data collected during the time period; and based on the first amount of material that has flowed through the first pipe during the time period relative to the second amount of material that has flowed through the second pipe and based on the flow data from the third meter, determining a first absolute amount of material that has flowed through the first pipe during the time period and a second absolute amount of material that has flowed through the second pipe during the time period.

In one general aspect, a method for detecting movement of fluid through a restricted area, the method includes: receiving, by one or more computers and from a flexible sensing device fitted to a medium that includes the restricted area through which fluid can move, sensor data over a period of time; identifying, by the one or more computers and from the sensor data, at least one of a level of vibration of the medium or a level of audio energy from the medium in the period of time; based on the at least one of the level of vibration or the level of audio energy, determining, by the one or more computers, a flow rate of fluid moving through the restricted area of the medium; based on the at least one of the flow rate and the period of time, determining, by the one or more computers, an event at a property that receives at least a portion of fluid moving through the restricted area of the medium; and generating, by the one or more computers, a notification indicating the event at the property.

Implementations include one or more of the following features. For example, in some implementations, receiving sensor data over the period of time includes receiving vibration data over the period of time, where the vibration data is generated by a vibration sensor of the flexible sensing device that is configured to detect vibrations of the medium, where identifying at least one of the vibrations of the medium or the level of audio energy corresponding to the medium over the period of time includes identifying, from the vibration data, the vibrations of the medium over the period of time, and where determining the flow rate of fluid moving through the restricted area of the medium is based on the vibrations of the medium over the period of time.

In some implementations, receiving sensor data over the period of time includes receiving audio data over the period of time, where the audio data is generated by a microphone of the flexible sensing device that is configured to detect audio energy output by the medium due to fluid flowing through the restricted area of the medium, where identifying at least one of the vibrations of the medium or the level of audio energy corresponding to the medium over the period of time includes identifying, from the audio data, the level of audio energy over the period of time, and where determining the flow rate of fluid moving through the restricted area of the medium is based on the level of audio energy over the period of time.

In some implementations, the method includes determining, from the sensor data, a rate of change in the vibrations over the period of time; and where determining the flow rate of fluid moving through the restricted area of the medium includes determining the flow rate of fluid moving through the restricted area of the medium is based on the rate of change in the vibrations over the period of time.

In some implementations, the method includes determining, from the sensor data, a rate of change in the level of audio energy over the period of time; and where determining the flow rate of fluid moving through the restricted area of the medium includes determining the flow rate of fluid moving through the restricted area of the medium is based on the rate of change the level of audio energy over the period of time.

In some implementations, the method includes using the flow rate to generate a likelihood that a particular appliance is running or that a particular fixture is using fluid, where the appliance or the fixture receives fluid from the restricted area of the medium, where determining the event at the property includes: determining that the likelihood is greater than a likelihood threshold, indicating that the appliance is running or that the fixture is using fluid; determining that the likelihood is less than a likelihood threshold and that flow rate is less than a threshold flow rate, indicating that the appliance is not running or that the fixture is not using fluid; or determining that the likelihood is less than a likelihood threshold and that the flow rate is greater than a threshold flow rate, indicating that fluid is leaking; and where generating the notification includes: generating a notification indicating that the appliance is running or that the fixture is using fluid; generating a notification indicating the appliance has stopped running or that the fixture has stopped using fluid; or generating a notification indicating that a fluid leak has been detected.

In some implementations, using the flow rate to calculate the likelihood that the particular appliance is running or that the particular fixture is using fluid includes: increasing the likelihood in response to determining that the period of time is in a period of time when the appliance is typically running or the fixture is typically used; or decreasing the likelihood in response to determining that the period of time is outside of a period of time when the appliance is typically running or the fixture is typically used.

In some implementations, using the flow rate to calculate the likelihood that the particular appliance is running or that the particular fixture is using fluid includes: receiving information indicating an action performed by one or more occupants of the property at a time immediately preceding the period of time or during the period of time; and changing the likelihood in response to the action by the one or more occupants.

In some implementations, receiving information indicating the action includes receiving a notification indicating that power being drawn from the appliance is greater than a threshold amount of power; and changing the likelihood in response to the action includes increasing the likelihood in response to receiving the notification indicating that the power being drawn from the appliance is greater than the threshold amount of power.

In some implementations, receiving information indicating the action includes receiving image data indicating that the one or more occupants of the property are in area of the property (i) where the appliance or the fixture is located and (ii) at a time immediately preceding the period of time or during the period of time; and changing the likelihood in response to the action includes increasing the likelihood in response to receiving the image data.

In some implementations, receiving information indicating the action includes receiving location data indicating that the one or more occupants of the property are away from the property during the period of time; and changing the likelihood in response to the action includes decreasing the likelihood in response to receiving the location data.

In some implementations, using the flow rate to calculate the likelihood that the particular appliance is running or that the particular fixture is using fluid includes: using the sensor data to identify a category of medium that the medium belongs to; determining that the appliance belongs to a type of appliance or the fixture belongs to a type of fixture that receives fluid from mediums in the identified category of medium; and increasing the likelihood in response to the determination.

In some implementations, determining the event at the property includes: based on the flow rate, determining that a particular appliance is running, where the appliance is an appliance in the property and receives fluid from the medium; based on the flow rate, determining that a particular fixture is using fluid, where the fixture is a fixture of the property and receives fluid from the medium; based on the flow rate and the period of time, determining that a particular appliance is running at a time when the particular appliance is not expected to be running, where the appliance is an appliance in the property and receives fluid from the medium; based on the flow rate and the period of time, determining that a particular fixture in the property is using fluid at a time when the particular fixture is not expected to be using fluid, where the fixture is a fixture in the property and receives fluid from the medium; based on the flow rate and the period of time, determining that an appliance has been running for more than a threshold time, where the appliance is an appliance in the property and receives fluid from the medium; based on the flow rate and the period of time, determining that a fixture has been using fluid for more than a threshold time, where the fixture is a fixture in the property and receives fluid from the medium; based on the flow rate, determining that the flow rate is greater than a threshold flow rate for a particular appliance or fixture of the property; based on the flow rate, determining that the flow rate is less than a threshold flow rate for a particular appliance or fixture of the property; based on the flow rate, determining that the flow rate deviates more than a threshold percentage from an expected flow rate for a particular appliance or fixture of the property; based on the flow rate and the period of time, determining that a volume of fluid is greater than a threshold volume of fluid for a particular appliance or fixture; based on the flow rate and the period of time, determining that a volume of fluid is less than a threshold volume of fluid for a particular appliance or fixture; or based on the flow rate and the period of time, determining that a volume of fluid deviates more than a threshold percentage from an expected volume of fluid for a particular appliance or fixture.

In some implementations, the method includes: collecting, over a second period of time, use data for one or more occupants of the property, where the use data indicates at least one of (i) a frequency of use of an appliance or a fixture that receives at least a portion of the fluid moving through the restricted area, (ii) times of use of an appliance or a fixture that receives at least a portion of the fluid moving through the restricted area, or (iii) a pattern of use of an appliance or a fixture that receives at least a portion of the fluid moving through the restricted area over the second period of time; training a machine learning model using the use data, where the use data indicates typical use of the appliance or the fixture over the second period of time, and where training the machine learning model includes training the machine learning model to recognize typical use of the fixture or the appliance by the one or more occupants; providing (i) the sensor data or (ii) the flow rate as input to the machine learning model; and after providing the sensor data or the flow rate as input to the machine learning model, receiving an output of the machine learning model indicating atypical use of the appliance or the fixture based on the sensor data or the flow rate, where generating the notification indicating the event at the property includes generating an alert indicating atypical use of the appliance or the fixture.

In some implementations, the method includes: collecting, over a third period of time, second use data for the one or more occupants of the property, where the second use data indicates at least one of a frequency of use of the appliance or the fixture, times of use of the appliance or the fixture, or a pattern of use of the appliance or the fixture over the third period of time, and where the third period of time (i) starts after the second period of time, (ii) starts at a beginning of the second period of time and ends at a time after an end of the second period of time, or (iii) starts at a time in the second period of time and ends at a time after the end of the second period of time; and updating the machine learning model using the second use data, where the second use data indicates a change to the typical use of the appliance or the fixture by the one or more occupants, and where updating the machine learning model includes updating the machine learning model to recognize typical use of the fixture or the appliance that accounts for the change to the typical use of the appliance or the fixture.

In some implementations, the method includes: providing the sensor data or the flow rate as input to the updated machine learning model; after providing the sensor data or the flow rate as input to the updated machine learning model, receiving an output of the updated machine learning model indicating typical use of the appliance or the fixture based on the sensor data or the flow rate; and in response to receiving the output of the updated machine learning model indicating typical use of the appliance or the fixture, removing the alert or generating a second notification indicating typical use of the appliance or fixture.

In another general aspect, a device for detecting movement of fluid through a restricted area includes: a flexible substrate having a first end, a second end, a first side, and a second side; a printed circuit board disposed on the first side of the flexible substrate; a power source electronically coupled to the printed circuit board and disposed on the first side of the flexible substrate; and one or more sensors electronically coupled to the circuit board and configured to collect sensor data from a medium that includes a restricted area through which fluid can move, where the printed circuit board includes: a microprocessor configured to obtain the sensor data from the one or more sensors and provide instructions to a transmitter to transmit the sensor data; and the transmitter configured to transmit sensor data obtained from the one or more sensors, where the flexible substrate is configured to be wrapped around the medium, where a length of the flexible substrate from the first end to the second end is greater than a width of the substrate at the first end, and where a length of the flexible substrate from the first end to the second end is greater than a width of the substrate at the second end.

Implementations can include one or more of the following features. For example, in some implementations, the one or more sensors include a microphone electronically coupled to the circuit board, and where the sensor data includes sensor data obtained from the microphone.

In some implementations, the one or more sensors include a vibration sensor electronically coupled to the circuit board, and the sensor data includes sensor data obtained from the vibration sensor.

In some implementations, the one or more sensors include a temperature sensor electronically coupled to the circuit board, and the sensor data includes sensor data obtained from the temperature sensor.

In some implementations, the one or more sensors include multiple sensors, and the sensor data includes sensor data obtained from the multiple sensors.

In some implementations, the device includes a wake-on-sound sensor, where the device is configured to operate in a first power mode when the wake-on-sound sensor does not detect more than a threshold level of audio energy such that the one or more sensors draw a first level of power from the power source, and where the device is configured to operate in a second power mode when the wake-on-sound sensor detects more than a threshold level of audio energy such that the one or more sensors draw a second level of power from the power source that is greater than the first level of power.

In some implementations, the device includes notches along at least a portion of the first side of the flexible substrate towards the second end of the flexible substrate, where the notches correspond to measurements that indicate a diameter, radius, or circumference of the medium that the flexible substrate can be wrapped around.

In some implementations, the device includes: a first layer of fasteners disposed on the second side of the flexible substrate towards the first end of the flexible substrate; and a second layer of fasteners disposed on the first of the flexible substrate towards the second end of the flexible substrate, where the first layer of fasteners is configured to interact with at least a portion of the second layer of fasteners when the flexible substrate is wrapped around a medium so as to lock a position of the first end of the flexible substrate with respect to the second end of the flexible substrate.

In some implementations, the device includes an adhesive layer disposed on the second side of the flexible substrate that is configured to interact with at least a portion of the first side of the flexible substrate when the flexible substrate is wrapped around a medium so as to lock a position of the first end of the flexible substrate with respect to the second end of the flexible substrate.

In some implementations, the device includes a band disposed on the first side of the flexible substrate towards the first end, where the band and a portion of the first side of the flexible substrate forms a sleeve configured to receive the second end of the flexible substrate when the flexible substrate is wrapped around a medium so as to lock a position of the first end of the flexible substrate with respect to the second end of the flexible substrate.

In some implementations, the flexible substrate defines a through-hole between the first side of the flexible substrate and the second side of the flexible substrate, and at least a portion of a sensor of the one or more sensors resides in the through-hole such that a surface of the sensor contacts a surface of a medium when the flexible substrate is wrapped around the medium.

In some implementations, the flexible substrate defines a second through-hole between the first side of the flexible substrate and the second side of the flexible substrate, and at least a portion of a second sensor of the one or more sensors resides in the second through-hole.

In some implementations, the flexible substrate defines a third through-hole between the first side of the flexible substrate and the second side of the flexible substrate, and at least a portion of a third sensor of the one or more sensors resides in the third through-hole.

In some implementations, the device includes a receiver configured to receive information from one or more external computing systems, where the device is configured to use the transmitter and the receiver to wirelessly communicate over a personal area network that connects one or more other devices.

In some implementations, the personal area network is a mesh network, the device serves as an infrastructure node of the mesh network, and each of the one or more other devices serve as a node of the mesh network.

In some implementations, the device includes a transceiver, where the transceiver includes the transmitter and the receiver.

In another general aspect, a method for detecting movement of fluid through a restricted area using a flexible sensing device fitted to a medium that includes the restricted area includes: obtaining, by one or more sensors of the flexible sensing device, sensor data over a period of time; identifying, by the flexible sensing device, at least one of a level of vibration of the medium or a level of audio energy from the medium in the period of time; and based on the level of vibration of the medium or the level of audio energy of the medium, transmitting, to one or more computing devices, a metric for fluid moving through the restricted area of the medium.

Implementations can include one or more of the following features. For example, in some implementations, the method includes using the sensor data to determine a flow rate of fluid moving through the restricted area of the medium.

In some implementations, the method includes: determining that the level of vibration of the medium or the level of audio energy from the medium is greater than a threshold level of vibration or a threshold level of audio energy; and in response determining that the level of vibration of the medium or the level of audio energy from the medium is greater than the threshold level of vibration or the threshold level of audio energy, providing power or additional power to one or more other sensors of the flexible sensing device and collecting second sensor data over a second period of time.

In some implementations, the one or more sensors include a wake-on-sound microphone; and providing power or additional power to the one or more other sensors of the flexible sensing device and collecting the second sensor data over the second period of time includes: providing power or additional power to at least one of a second microphone, to a vibration sensor, and a temperature sensor; and collecting at least one of audio data, vibration data, and temperature data over the second period of time.

In some implementations, the method includes producing the metric, where the metric is the sensor data or a collection of sensor data collected over a second period of time.

In some implementations, the method includes generating the metric, where the metric is a normalized value determined using the sensor data or a collection of sensor data collected over a second period of time.

In some implementations, the method includes generating the metric, where the metric is a flow rate of fluid through the restricted area of the medium determined using the sensor data or a collection of sensor data collected over a second period of time.

In some implementations, the method includes generating the metric, where the metric is a volume of fluid that has passed through the restricted area of the medium in the period of time or in a second period of time.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user may be able to calculate water consumption of individual units of a multi-unit building without installing individual flow meters for each unit.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example system for processing meter data and an example device for collecting meter data from a pipe.

FIG. 3 illustrates an example method for processing meter data to determine relative usage.

FIGS. 7A-7E illustrate example surface meters to collect sensor data from a pipe.

FIG. 8 illustrates an example system for analyzing sensor data from a surface meter.

FIG. 11 illustrates an example chart that associates different events to sensor measurements obtained from a surface meter.

DETAILED DESCRIPTION

Figure 1:
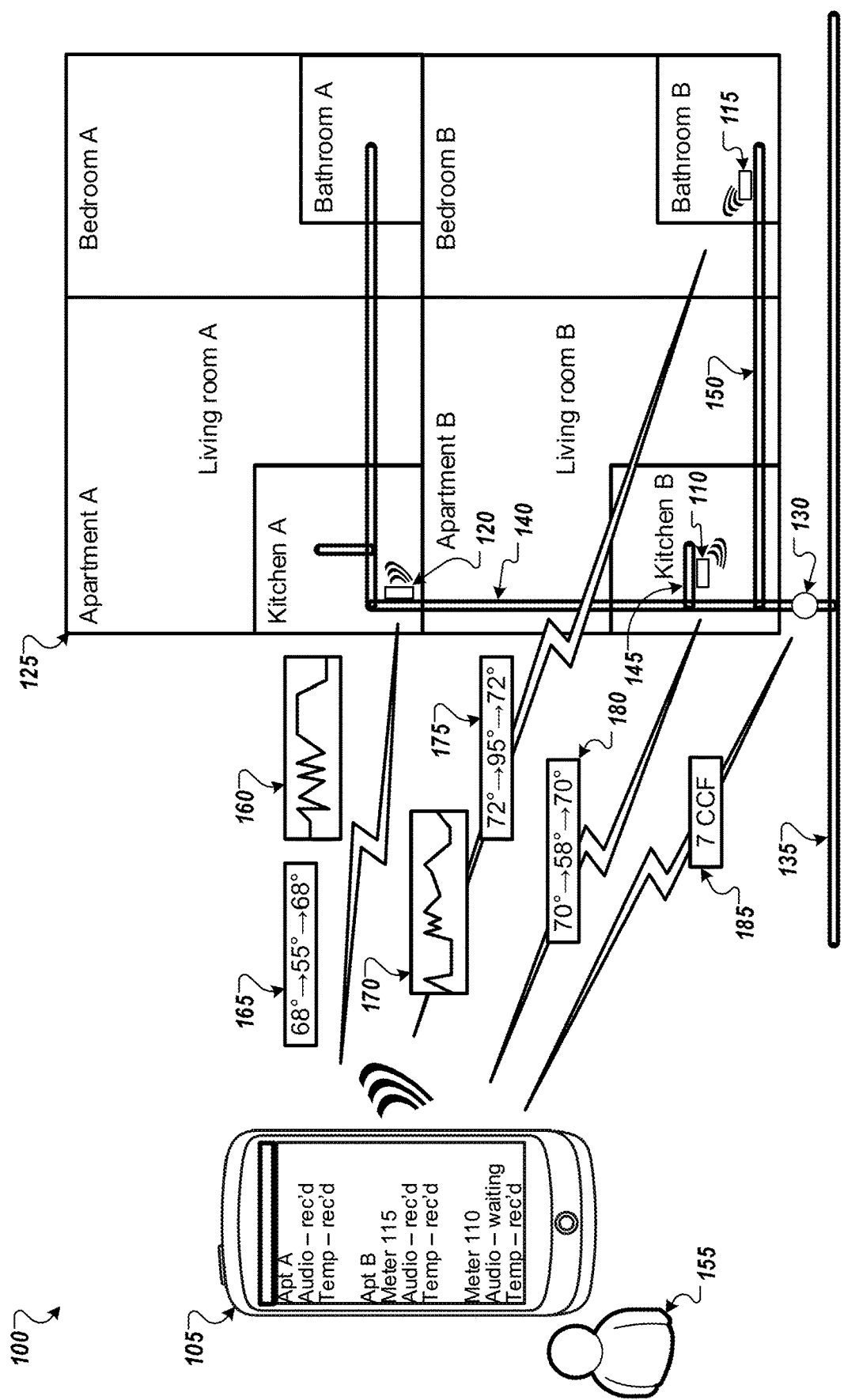
FIG. 1 illustrates an example system for collecting meter data from a plurality of meters connected to different pipes.

FIG. 1 illustrates an example system 100 for collecting meter data from a plurality of meters connected to different pipes. Briefly, and as described in more detail below, the system 100 includes a computing device 105 that collects data from surface meters 110, 115, and 120. The surface meters 110, 115, and 120 collect audio and temperature data from different pipes that are located in a multiunit building 125. The computing device 105 also collects flow data from flow meter 130. The computing device 105 processes the audio data, temperature data, and flow data to calculate the usage that corresponds to each of the surface meters 110, 115, and 120.

As illustrated in FIG. 1, the multiunit building 125 includes two apartment units, apartment A and apartment B. Apartment A has a bedroom A, bathroom A, kitchen A, and living room A. Apartment B has a bedroom B, bathroom B, kitchen B, and living room B. Neither apartment A nor apartment B has a dedicated water meter. Water pipe 140 provides water to apartment A, and a branch off water pipe 135 serves apartment B. The flow meter 130 measures the water consumption of both apartment A and apartment B without distinguishing between the usage of apartment A versus the usage of apartment B While the multiunit building 125 only includes two apartment units in this example, the multiunit building 125 may include multiple units and may be residential, commercial, or industrial space. The multiunit building 125 may have one flow meter 130 or may have multiple flow meters. For example, the multiunit building 125 may have one flow meter per floor or per tier. Additionally, the pipes may carry any type of material. For example, the pipe may provide natural gas to apartment A and apartment B.

To measure the individual water consumption of apartment A and apartment B, a plumber may install a flow meter in pipe 140. In different situations, the plumbing of the multiunit building 125 may have to be reconfigured to allow for locations where a plumber could install flow meters for each apartment. To avoid the complications of reconfiguring plumbing or cutting pipes and installing flow meters, an apartment manager 155 may attach surface meters 110, 115, and 120 to the exposed pipes in each apartment.

A surface meter 110, 115, or 120 may be configured to be attached to a pipe using tape, a clamp, or a similar fastener.

It may not be necessary to cut a pipe to install a surface meter 110, 115, or 120. The surface meter 110, 115, or 120 may include a microphone, thermometer, memory, and a transceiver. The microphone may detect and record audio data in the surrounding environment. When the surface meter 110, 115, or 120 is connected to a pipe, the audio data may include the sounds of water flowing through the pipe. The thermometer may detect and record the surface temperature of the pipe.

As illustrated in FIG. 1, to estimate the water usage of apartment B, an apartment manager 155 may install a surface meter 120 on pipe 140. Because pipe 140 is the only pipe that provides water to apartment B and only apartment B, the apartment manager 155 may install one surface meter 120 for apartment B. To estimate the water usage of apartment A, the apartment manager 155 may install surface meters 110 and 115. The apartment manager 155 may install surface mater 110 on pipe 145 in the kitchen B and install surface meter 115 on pipe 150 in the bathroom B. In some instances, the apartment manager 155 may install multiple surface meters in a bathroom. For example, without access to a pipe that provides water to all of the bathroom sink, toilet, and shower, an apartment manager 155 may install a surface meter at each of the sink, toilet supply, and shower head.

Each surface meter 110, 115, or 120 may record the audio and temperature of the corresponding pipe at periodic intervals, for example, every second. Each surface meter 110, 115, or 120 may be battery powered and be able to run for an extended period of time without new batteries. For example, a surface meter 110, 115, or 120 may be able to run on a set of batteries for at least a year or for at least two years.

A surface meter 110, 115, or 120 may be configured to receive a request for data from computing device 105. To conserve battery power, a surface meter 110, 115, or 120 may activate a corresponding transceiver for a particular period. For example, a surface meter 110, 115, or 120 may activate the transceiver for two days each month. During those two days, the surface meter 110, 115, or 120 is able to receive request for data. In response to a request, the surface meter 110, 115, or 120 may transmit the stored temperature data and the stored audio data. The surface meter 110, 115, or 120 may delete the stored temperature data and the stored audio data after transmitting to the computing device 105. Limiting the window during which the surface meter 110, 115, or 120 is able to receive and transmit data preserves battery power.

While using bathroom A and kitchen A, the resident draws water through pipe 140. The surface meter 120 may continuously record the audio data and temperature of pipe 140. The temperature of pipe 140 may change as water flows through it, and the water may generate sound waves as the water moves through the pipe 140. While using bathroom B, the resident draws water through pipe 150. Similar to surface meter 120, the surface meter 115 records the audio data and temperature of the pipe 150 to which it is attached. While using kitchen B, the resident draws water through pipe 145. The water changes the temperature of pipe 145 and generates sound waves as the water moves through pipe 145.

In some implementations, apartment A and apartment B may have separate incoming water pipes for both hot and cold water. In this instance an apartment manager 155 may add surface meters to each of the hot water pipes to measure the hot water used by the resident of each apartment. For example, if surface meter 120 is attached to a cold water pipe, then the apartment manager 155 may add a surface meter to the corresponding hot water pipe. In some implementations, an apartment may have an individual hot water heater. In this case, the apartment manager 155 may add a surface meter to the inlet or outlet to the hot water gather data related to hot water usage.

During the window where the transceivers of the surface meters 110, 115, and 120 are active, the apartment manager 155 may move around the multiunit building 125 with computing device 105. The computing device 105 may include an application that communicates with the surface meters 110, 115, and 120. The application may activate a short range radio or other similar wireless communication module of computing device 105. The application may request data from each of the surface meters 110, 115, and 120. The application may request data using a unique identifier for each of the surface meters 110, 115, and 120. During installation of each of the surface meters 110, 115, and 120, the apartment manager may store the location of each surface meter with the application. While moving around the multiunit building 125, the computing device 105 may determine its location using a location sensor, such as GPS, and ping the nearby surface meters.

The computing device 105 collects data from surface meter 110 by transmitting a request for data from surface meter 120. In response, the surface meter 120 transmits audio data 160 and temperature data 165. The computing device 105 receives the data 160 and 165, stores the data 160 and 165, and tags the data 160 and 165 with data identifying surface meter 120 and the current time period. In some implementations, the computing device 105 may display on the user interface that the computing device 105 received the audio data 160 and temperature data 165. In some implementations, the computing device 105 may transmit a signal to the surface meter 120 indicating that it successful received the data. The surface meter 120 may then delete the audio data 160 and temperature data 165. The surface meter 120 may also deactivate its transceiver until the next specified time period, even if some time remains during the current time period.

The computing device 105 collects data from surface meter 110 by transmitting a request for data from surface meter 110. In response, the surface meter 110 transmits audio data 170 and temperature data 175. The computing device 105 receives the data 170 and 175, stores the data, and updates the user interface.

The computing device 105 collects data form surface meter 115 by transmitting a request for data from surface meter 110. The surface meter 115 may transmit temperature data 180. The computing device 105 receives the data 180, stores the data, and updates the user interface. The surface meter 115 may not be able to transmit any audio data. The transceiver of the surface meter 115 or the transceiver of the computing device 105 may encounter an error. In this instance, the computing device 105 may indicate that the audio data for surface meter 115 is still outstanding. The computing device 105 may send additional requests to the surface meter 115 for audio data.

In some implementations, the computing device 105 may connect wirelessly with the flow meter 130. In this instance, the flow meter may transmit flow data 185 to the computing device 105 indicating that seven CCFs flowed through the flow meter 130.

The computing device 105 or a server may process the received audio and temperature data to determine the relative water usage of apartments A and B. In some implementations, the computing device 105 may calculate a ratio of the water usage of apartment A to the water usage of apartment B. The computing device may use the ratio and the flow data 185 to calculate the absolute usage of each apartment A and B. Additionally details related to calculating water usage are discussed in relation to FIGS. 4 and 5. In some implementations, the usage readings may not be exact because the surface meters 110, 115, and 120 may not be as accurate as a flow meter.

FIG. 2 illustrates an example system 200 for processing meter data and an example device 250 for collecting meter data from a pipe. Briefly, and as described in more detail below, the system 200 may be configured to request temperature data and audio data from device 250. The system 200 may be similar to computing device 105 of FIG. 1. The device 250 may be similar to the surface meters 110, 115, and 120 of FIG.

The system 200 includes a transceiver 205. The transceiver 205 may be a short range radio module that is capable of transmitting and receiving data wirelessly. The transceiver 205 may receive data form device 250 and transmit and receive data from a server that is located in the cloud.

The system 200 includes an audio analyzer 210 and temperature analyzer 215. The audio analyzer 210 and temperature analyzer 215 may analyze the audio data and the temperature data received from device 250 and other similar devices. The system 200 may use the audio analyzer 210 and temperature analyzer 215 to generate relative water usage data or water usage ratios. The audio analyzer 210 and temperature analyzer 215 may use the processes discussed in relation to FIGS. 4 and 5. In some implementations, the audio analyzer 210 and temperature analyzer 215 may use flow data from an in-pipe meter to determine absolute water usage data.

The system 200 includes an audio and temperature data storage 220. The audio and temperature data storage 220 may be configured to store the audio and temperature data received from the device 250 and other similar devices. The audio and temperature data storage 220 may include a field for the particular device that provided the data and a field for the time period for which the device 250 collected the data.

The system 200 includes a user interface generator 225. The user interface generator 225 may be configured to provide, for display, on a screen of the system 200 a visual indication of the device 250 and other similar devices that have provided audio and temperature data and flow meters that have provided flow data to the system 200. The user interface generator 225 may be configured to display results of the water usage calculations performed by the audio analyzer 210 and temperature analyzer 215.

The device 250 includes a transceiver 255. The transceiver 255 may be a short range radio module that is capable of transmitting and receiving data wirelessly. The transceiver 255 may be active for a specified period. For example, the transceiver 255 may only be active during the first two days of a month. During other times, the transceiver 255 may be inactive to save battery power.

The device 250 includes a thermometer 260 and a microphone 265. The device 250 may be configured to be attached to a pipe. The portion of the device 250 that faces the pipe may include the thermometer 260 and microphone 265. The device 250 may sample the audio data received by the microphone 265 at periodic intervals, such as every five hundred milliseconds. The device 250 may sample the temperature detected by the thermometer 260 at periodic intervals, such as every three seconds.

The device 250 may store the sampled temperature and audio data in the audio and temperature data storage 270. The device 250 may record timing data in the audio and temperature data storage 270 to indicate the time at which the corresponding sample was collected. The device 250 may store the temperature and audio data in the audio and temperature data storage 270 until the data is successfully transmitted to the system 200.

For security purposes, it may be helpful for the device 250 to detect when it has been moved. The device 250 may include an accelerometer 275. The accelerometer 275 or other similar motion sensor may provide motion data to the movement detector 280. The movement detector 280 may store data indicating the time when the device 250 moved. Additionally or alternatively, the device 250 may include a speaker and activate an alarm when moved. Any stored movement data may be transmitted to the system 200 when the transceiver 255 is active and receives a request from the device 250.

As security example, a resident may move the device 250 from one bathroom to another bathroom that the resident rarely uses. The resident may wish to have the device 250 measure temperature and audio data at a pipe that doesn't have water flowing through it as frequently as other pipes in the resident's unit. The movement detector 280 may receive motion data from the accelerometer 275 and determine that the device 250 has moved more than would be expected if the device 250 remained on the original pipe. The device 250 may transmit the time of the movement to the system 200.

FIG. 3 illustrates an example method 300 for processing meter data to determine relative usage. In general, the method 300 determines the relative flow between two pipes using audio data and temperature data recorded at the pipes. The method 300 will be described as being performed by a computer system comprising one or more computers, for example, the computing device 105 as shown in FIG. 1 or the computing system 200 as shown in FIG. 2.

The system receives, from a first meter that is connected to a first pipe, first audio data collected during a time period and first temperature data collected during the time period (310). In some implementations, the first pipe is a water pipe. In some implementations, the first pipe is a gas pipe. In some implementations, the system transmits a request, to the first meter, for audio and temperature data. The first meter transmits the audio and temperature data in response to that request.

The system receives, from a second meter that is connected to a second pipe, second audio data collected during the time period and second temperature data collected during the time period (320). In some implementations, the second pipe is a water pipe. In some implementations, the second pipe is a gas pipe. In some implementations, the system transmits a request, to the second meter, for audio and temperature data. The second meter transmits the audio and temperature data in response to that request.

In some implementations, the system receives data indicating that the first meter or the second meter moved. The system may display data to a user indicating that one of the meters may have moved. The system may indicate the location of the moved meter in instances where the system receives location data from the moved meter. In some implementations, the system may only receive relative movement data. The system may combine the relative movement data with data related to the original location of the meter to determine the new location. For example, the system may receive data that the system moved ten meters. The system may know that the meter was is bathroom A and kitchen A is about ten meters from bathroom A in the same unit. The system may estimate that the moved meter may be in kitchen A.

The system, based on the first audio data, the first temperature data, the second audio data, and the second temperature data, determines a first amount of material that has flowed through the first pipe during the time period relative to a second amount of material that has flowed through the second pipe (330).

In some implementations, the system determines that a first temperature of the first pipe has changed by at least a threshold temperature change during a particular amount of time. The system determines that a second temperature of the second pipe has changed by at least the threshold temperature change during the particular amount of time. The system, after determining that the first temperature of the first pipe has changed by at least the threshold temperature change during the particular amount of time, determines a first elapsed time that the first temperature of the first pipe is changing. The system, after determining that the second temperature of the second pipe has changed by at least the threshold temperature change during the particular amount of time, determines a second elapsed time that the second temperature of the second pipe is changing. The system, based on the first elapsed time and the second elapsed time, determines the first amount of material that has flowed through the first pipe during the particular amount of time relative to the second amount of material that has flowed through the second pipe during the particular amount of time.

In some implementations, the system determines, based on the first audio data, determining a first level of first audio energy that corresponds to the first audio data. The system, based on the second audio data, determines a second level of second audio energy that corresponds to the second audio data. The system determines that the first level of first audio energy has changed by at least a threshold energy change during the particular amount of time. The system determines that the second level of audio energy has changed by at least the threshold energy change during the particular amount of time. The system, after determining that the first level of first audio energy has changed by at least the threshold energy change during the particular amount of time, determines a first elapsed time that the first level of the first audio energy has changed by at least the threshold energy change. The system, after determining that the second level of second audio energy has changed by at least the threshold energy change during the particular amount of time, determines a second elapsed time that the second level of the second audio energy has changed by at least the threshold energy change. The system, based on the first elapsed time and the second elapsed time, determines the first amount of material that has flowed through the first pipe during the particular amount of time relative to the second amount of material that has flowed through the second pipe during the particular amount of time.

In some implementations, the system receives, from a third meter that is connected to a third pipe that feeds into the first pipe and the second pipe, flow data collected during the time period. The system, based on the first amount of material that has flowed through the first pipe during the time period relative to the second amount of material that has flowed through the second pipe and based on the flow data from the third meter, determines a first absolute amount of material that has flowed through the first pipe during the time period and a second absolute amount of material that has flowed through the second pipe during the time period.

The subject matter described below relates to a method of measuring flow rates in a pipe. The method involves using a thermometer to measure the temperature of the outside of a pipe. A computing device collects the temperature data and determines a flow rate through the pipe based on the changes in the temperature. Another method involves using a microphone to collect audio data on the outside of the pipe. A computing device collects the audio data and determines a flow rate through the pipe based on the changes in the audio data. In some implementations, a computing device may use both audio data and temperature to determine the flow rate through the pipe. In some implementations, a computing device may use temperature to detect when flow starts through a pipe and audio data to detect when flow stops, or vice versa.

Figure 4:
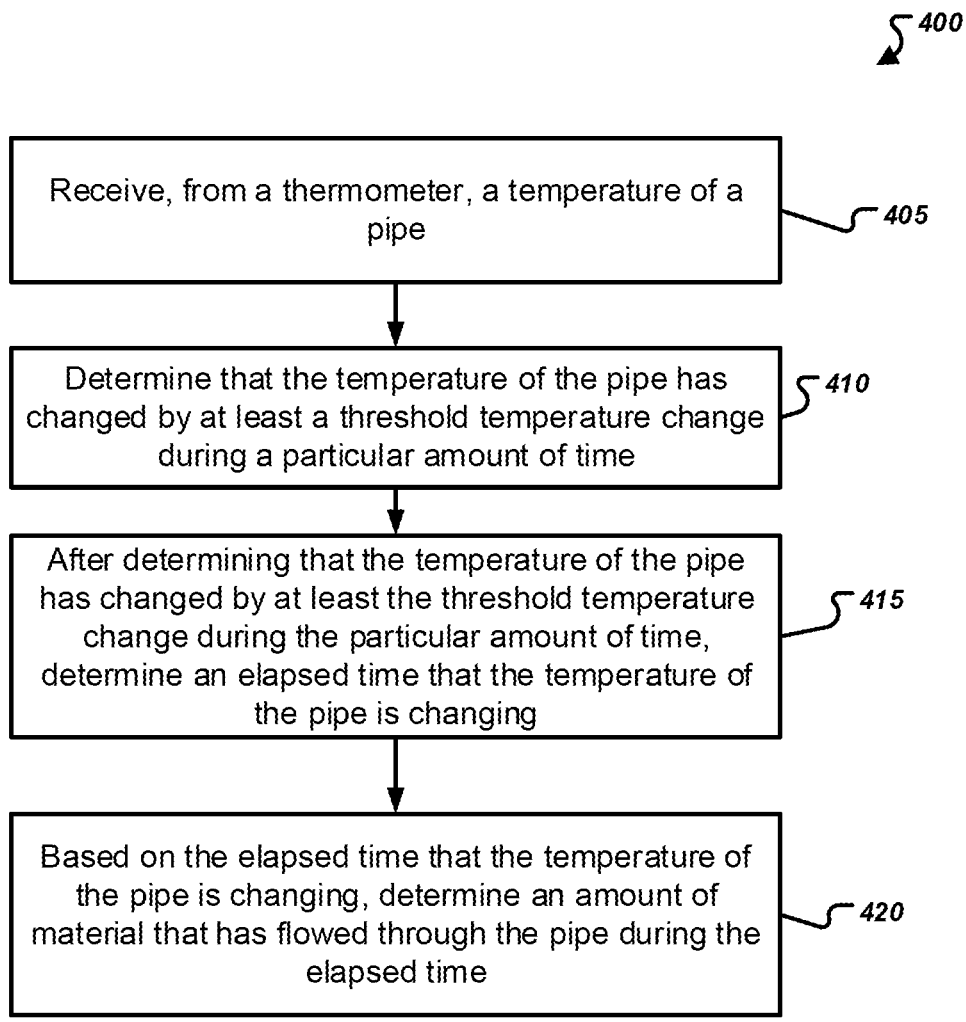
FIG. 4 illustrates an example method to measure a flow rate through a pipe using a thermometer.

FIG. 4 illustrates an example method 100 to measure a flow rate through a pipe using a thermometer. The method 100 may be performed by a computing that is located near the pipe such as a computing device that is directly connected to the thermometer. Alternatively, the method 100 may be performed by a computing device that receives data from the thermometer over a wireless connection.

The computing device receives, from a thermometer, a temperature of a pipe (405). In some implementations, the pipe is a water pipe or a pipe that provides another liquid. In some implementations, the pipe is a gas pipe that provides any type of gas such as methane. The thermometer is attached to the outside of the pipe and is configured to measure the temperature of the pipe itself. The thermometer may be covered in insulation to reduce the effect of the surrounding air on the temperature reading. In some implementations, multiple thermometers a placed on a portion of a pipe. For example, a first thermometer may detect the temperature of the pipe at one foot from the wall. A second thermometer may detect the temperature of the pipe also at one foot from the wall but at a different location on the circumference of the pipe. A third thermometer may detect the temperature of the pipe two feet from the wall or one foot from where the pipe next branches off.

The computing device determines that the temperature of the pipe has changed by at least a threshold temperature change during a particular amount of time (410). As the computing device monitors the temperature, the computing device determines a difference between temperature readings at predetermined intervals, for example, one minute. The computing device determines the threshold temperature change based on a calibration process. In some implementations, the calibration process may be based on the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe, then the computing device may monitor for a threshold temperature change of two degrees. In some implementations, the calibration process is based on training data that includes temperature readings of the pipe and flow data through the pipe. For example, during a setup process of the thermometer, the computing device receives temperature data from the thermometer and flow data from another meter that is measuring the flow rate through the pipe. Using the temperature and flow rate data, the computing device determines an appropriate threshold temperature change to detect. In some implementations, the threshold temperature change may be different depending on whether the temperature is increasing or decreasing. For example, the threshold temperature change may be two degrees if the temperature is increasing and three degrees if the temperature is decreasing.

After determining that the temperature of the pipe has changed by at least the threshold temperature change during the particular amount of time, the computing device determines an elapsed time that the temperature of the pipe is changing (415). During this stage, computing device may monitor the temperature of the pipe at shorter intervals, for example, three seconds. The computing device may determine that the temperature of the pipe is no longer changing if the temperature does not change by at least a threshold within the shorter interval or another interval. For example, the computing device may determine that the temperature has stopping changing if it measures temperatures of 50.1 degrees at a particular time and 50.2 degrees at the particular time plus two minutes. If the temperature changes from 50.1 degrees at a particular time and 50.2 degrees at the particular time plus one minute, then the computing device determines that the temperature is still changing.

Based on the elapsed time that the temperature of the pipe is changing, the computing device determines an amount of material that has flowed through the pipe during the elapsed time (420). To compute the flow rate or material that has flowed through the pipe during the elapsed time, the computing device uses the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe and the temperature changed from 50.0 degrees to 45.0 degrees during a ten minute period, then the computing device determines that thirty gallons flowed through the pipe. In some implementations, the computing device determines the amount of material that has flowed through the pipe during the elapsed time based on the training data collected during the calibration process.

In some implementations, the computing device stores data related to the flow rate through the pipe and provides the data to other computing devices in response to requests. For example, a billing device may be generating bills for water customers. The billing device sends requests to the computing devices with the flow rate data. The computing devices with the flow rate data authenticate the request and, if authenticated, providing the billing device with the flow rate data. The billing device may then generate bills to provide to the customers.

In some implementations, the computing device may use the multiple thermometer configuration to determine flow rate by determining when all of the measurements from the multiple thermometers satisfy the threshold changes or a majority of the measurements satisfy the threshold changes. For example, if two of the three temperatures change by a threshold temperature change, then the computing device may begin monitoring the temperatures at a more frequent intervals or only the temperatures from the thermometers that satisfied the threshold. In some implementations, each thermometer has a different threshold temperature change based on either the characteristics of the pipe at the thermometer or based on training data or both.

Once the liquid or gas has been flowing through the pipe for a period of time, the temperature of the pipe reaches a steady state. During this time, the computing device monitors the temperature of the pipe and determines the elapsed time that the pipe is at a constant temperature. Once the liquid or gas stops flowing the temperature of the pipe will return to the original temperature. Therefore, if the computing device measures the time that elapses between the pipe reaching a constant temperature and the pipe returning to the original temperature, the computing device can determine the flow rate through the pipe during the elapsed time.

In some implementations, the threshold temperature change that the computing device detects once the temperature of the pipe reaches a steady state is the same as the threshold temperature change detects when gas or liquid initially began flowing. In some implementations, the threshold temperature changes are different with either one being greater depending on the material of the pipe, the outer diameter of the pipe, the inner diameter of the pipe, and the material flowing through the pipe or the training data or both.

In some implementations, the amount of time that the computing device monitors for the threshold temperature change that the computing device detects once the temperature of the pipe reaches a steady state is the same as the amount of time that the computing device monitors for threshold temperature change when gas or liquid begins flowing. In some implementations, the two time periods are different and are based on the material of the pipe, the outer diameter of the pipe, the inner diameter of the pipe, and the material flowing through the pipe or the training data or both.

Figure 5:
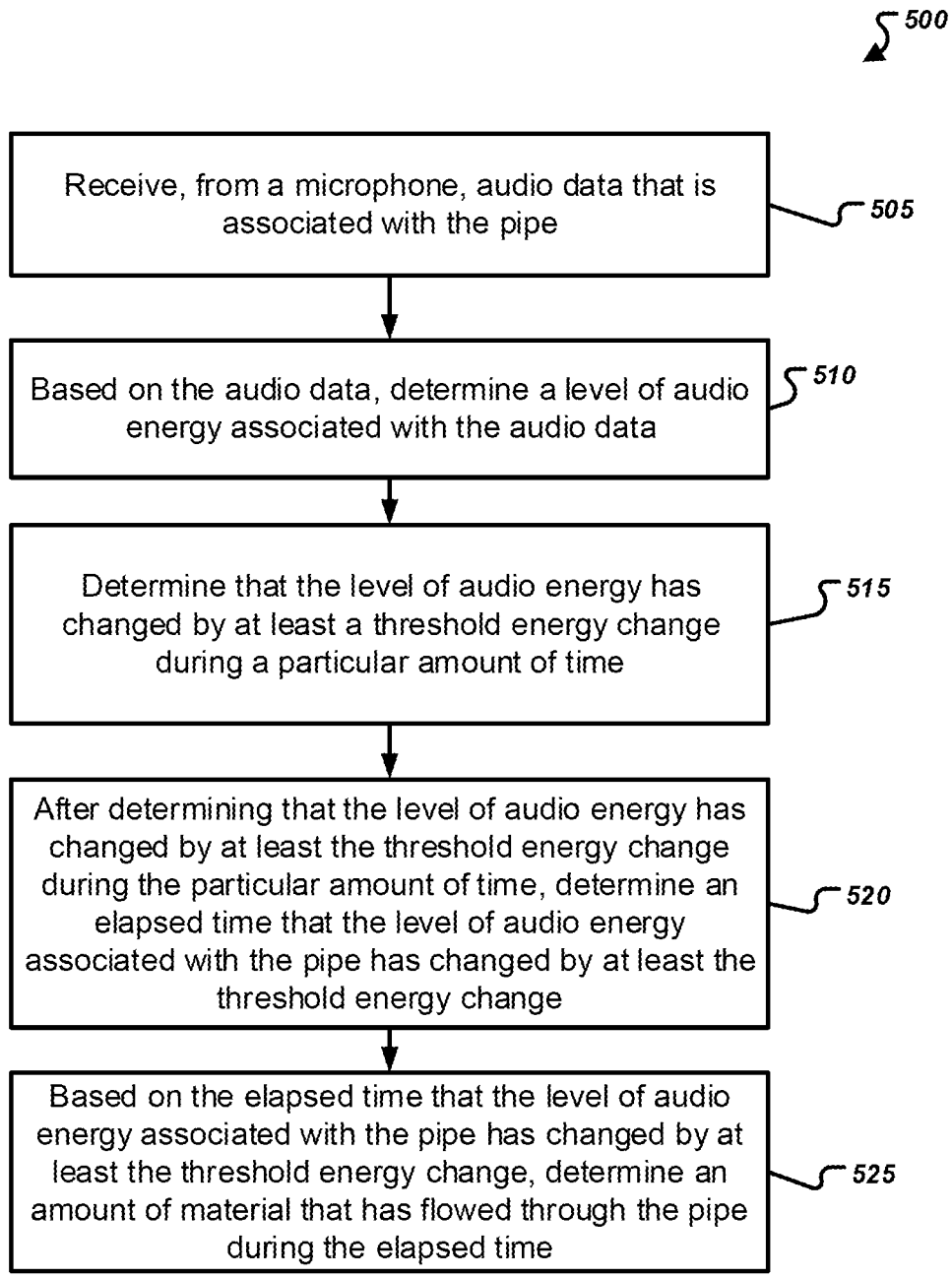
FIG. 5 illustrates an example method to measure a flow rate through a pipe using a microphone.

FIG. 5 illustrates an example method 500 to measure a flow rate through a pipe using a microphone. The method 500 may be performed by a computing that is located near the pipe such as a computing device that is directly connected to the microphone. Alternatively, the method 500 may be performed by a computing device that receives data from the microphone over a wireless connection.

The computing device receives, from a microphone, audio data that is associated with the pipe (505). In some implementations, the pipe is a water pipe or a pipe that provides another liquid. In some implementations, the pipe is a gas pipe that provides any type of gas such as methane. The microphone is attached to the outside of the pipe and is configured to measure the sound waves emitted from the pipe itself. The microphone may be covered in insulation to reduce the effect of the ambient noise on the microphone. In some implementations, multiple microphones a placed on a portion of a pipe. For example, a first microphone may detect the sound waves emitted from the pipe at one foot from the wall. A second microphone may detect the sound waves emitted from the pipe also at one foot from the wall but at a different location on the circumference of the pipe. A third microphone may detect the sound waves emitted from the pipe two feet from the wall or one foot from where the pipe next branches off. The computing device may use audio data from multiple microphones to cancel out noise.

Based on the audio data, the computing device determines a level of audio energy associated with the audio data (510). As the computing device receives audio data, the computing device converts the audio data to a level of audio energy. In some implementations, the computing device calculates the root mean square or the average amplitude of the audio data to determine the level of audio energy. In some implementations, the computing device determines the frequency components of the audio data and uses the frequency components to determine the flow rate of the pipe.

The computing device determines that the level of audio energy has changed by at least a threshold energy change during a particular amount of time (515). As the computing device computes the level of audio energy, the computing device determines a difference between levels of audio energy at predetermined intervals, for example, one minute. The computing device determines the threshold energy change based on a calibration process. In some implementations, the calibration process may be based on the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe, then the computing device may monitor for a threshold energy change of two decibels. In some implementations, the calibration process is based on training data that includes audio energy levels of the pipe and flow data through the pipe. For example, during a setup process of the microphone, the computing device receives audio data from the microphone and flow data from another meter that is measuring the flow rate through the pipe. Using the audio data and flow rate data, the computing device determines an appropriate threshold energy change to detect. In some implementations, the threshold energy change may be different depending on whether the audio energy level is increasing or decreasing. For example, the threshold energy change may be two decibels if the audio energy level is increasing and three decibels if the audio energy level is decreasing.

After determining that the level of audio energy has changed by at least the threshold energy change during the particular amount of time, the computing device determines an elapsed time that the level of audio energy associated with the pipe has changed by at least the threshold energy change (520). During this stage, computing device may compute the audio energy level of the pipe at shorter intervals, for example, three seconds. The computing device may determine that the audio energy level of the pipe is no longer outside the threshold energy change if the audio energy level fails to satisfy the threshold within the shorter interval or another interval. For example, the computing device may determine that the audio energy level no longer surpasses the threshold of three decibels if it measures an energy change of 1.7 decibels at a particular time and 1.8 decibels at the particular time plus two minutes. If the energy level change is 1.7 decibels at a particular time and 2.2 decibels at the particular time plus one minute, then the computing device determines that the audio energy level is still outside of the threshold energy range.

Based on the elapsed time that the level of audio energy associated with the pipe has changed by at least the threshold energy change, the computing device determines an amount of material that has flowed through the pipe during the elapsed time (525).

To compute the flow rate or material that has flowed through the pipe during the elapsed time, the computing device uses the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe and the audio energy level was outside of the threshold energy range during a ten minute period, then the computing device determines that thirty gallons flowed through the pipe. In some implementations, the computing device determines the amount of material that has flowed through the pipe during the elapsed time based on the training data collected during the calibration process.

In some implementations, the computing device factors in the level that the audio energy changes to determine flow rate. Instead of only considering whether the audio energy level either satisfies or does not satisfy the threshold energy level, the computing device may consider the level of the audio energy change. For example, an audio energy change of one decibel may correspond to eighty percent the water flowing through the pipe as a two decibel audio energy change. The computing device may consider the material of the pipe, the outer diameter of the pipe, the inner diameter of the pipe, and the material flowing through the pipe or training data or both to determine what flow rates correspond to what audio energy changes.

In some implementations, the computing device may receive audio energy level data and temperature data to determine the flow rate through the pipe. For example, the computing device may average flow rates determined based on the temperate data and based on the audio energy level data to determine the flow rate through the pipe.

In some implementations, the computing device stores data related to the flow rate through the pipe and provides the data to other computing devices in response to requests. For example, a billing device may be generating bills for water customers. The billing device sends requests to the computing devices with the flow rate data. The computing devices with the flow rate data authenticate the request and, if authenticated, providing the billing device with the flow rate data. The billing device may then generate bills to provide to the customers.

In some implementations, the computing device may use the multiple microphone configuration to determine flow rate by determining when all of the energy levels computed from data from the multiple microphones satisfy the threshold changes or a majority of the energy levels satisfy the threshold changes. For example, if two of the three energy levels change by a threshold energy change, then the computing device may begin monitoring the microphones at a more frequent intervals or only the microphones associated with the energy levels that satisfied the threshold. In some implementations, each microphone has a different threshold energy change based on either the characteristics of the pipe at the microphone or based on training data or both.

As gas or liquid is flowing through the pipe, the energy level determined by the computing device will be relatively constant. Once the gas or liquid stops flowing, the energy level returns to the initial energy levels. While the energy level is constant, the computing device monitors the energy level and stores the elapsed time that the energy level is above the threshold energy change. When the gas or liquid stops flowing, the computing device monitors the energy level will likely determine that the energy level has changed by a second threshold energy change within a second particular amount of time. In some implementations, the second threshold energy change is the same as the threshold energy change when the flow began and in other implementations it is different. In some implementations, the second particular amount of time is the same as the particular amount of time when the flow began and in other implementations it is different. The computing device determines all four values based on the material of the pipe, the outer diameter of the pipe, the inner diameter of the pipe, and the material flowing through the pipe or the training data or both.

In some implementations, the computing device uses a combination of temperature and sound to determine flow through the pipe. For example, the computing device may use temperature to determine when flow begins through the pipe and audio energy levels to determine when flow stops. As another example, the computing device may use audio energy levels to determine when flow beings and temperature to determine when flow ends.

The water meter described in this application may be used in a variety of situations where the user wishes to measure water flow but not install a water meter by removing, cutting, or adding pipes. For example, in a multi-family housing, the management company may wish to measure water consumption for individual units that do not have individual meters. The management company may install these meters by attaching them to the pipes that feed each unit by using glue, tape, zip ties, or any other type of tie or adhesive. Units that are fed by more than one pipe can have a meter attached to each pipe. The meters may be linked to a billing system to generate individual bills for units that previously did not have meters. In some implementations, each meter may include a tamper resistant band that shows evidence of attempted removal. Each meter may also generate an alarm when someone attempts to remove it.

In some implementations, the meters may be configured with vibration sensors. The vibration sensors can detect vibrations in the pipes that occur when water or other material is flowing through the pipes. The meter may include multiple vibration sensors around the circumference of the pipe. The computing device that receives the data from the vibration sensors may determine that water flow rate increases as the water flow increases. In some implementations, the vibrations of the pipe may occur when the material changes its rate of flow. In this instance, the computing device may determine the water flow rate based on the rate of change in the vibrations.

In some implementations, the computing devices determine flow through the pipes based on a combination of sound, temperature, and vibrations. Any combination of the three may be used to detect start of the flow and end of the flow. For example, the computing device may use data from the temperature and vibration sensors to determine when flow starts and use only microphone data to determine when flow stops. As another example, the computing device may use sound, temperature, and vibration data to determine when flow starts and sound and vibration data to determine when flow stops. In some implementations, the ambient temperature, temperature of the material flowing, season, time of day, month, day of the week, etc. may be used to determine which data may be used.

In some implementations, the meter devices attached to the pipes may run on batteries. To save battery power, the devices may be configured to communicate only at certain intervals. For example, the devices may be configured to communicate only on Mondays between noon and 2 pm. During this time, a receiving computing device may request data from each of the meter devices. For the remainder of the week, the meter devices may only collect data from the pipe.

In some implementations, the meters may be configured to generate an alarm that may be audible or delivered to a computing device when the flow surpasses a threshold. For example, the meter may generate an alarm when the meter detects a flowrate above three gallons per minute. As another example, the meter may generate an alarm for different times of the day, day of the week, month, etc. The meter may generate an alarm when the rate is above 0.3 gallons per minute when nobody is likely using water such as during the middle of the day. This functionality may be useful in identifying leaks.

In some implementations, meters may be logically connected to one another. For meters that measure pipes that feed the same living unit, those meters may be configured to share data and then supply one set of data to a computing device. The meters may also share data to generate alarms. The meters may combine their data to determine whether the flow exceeds the threshold. For example, if the threshold his 0.3 gallons per minute then a meter that measures 0.2 gallons per minute may generate an alarm if it is logically connected to another meter that measures 0.2 gallons per minute.

Figure 6:
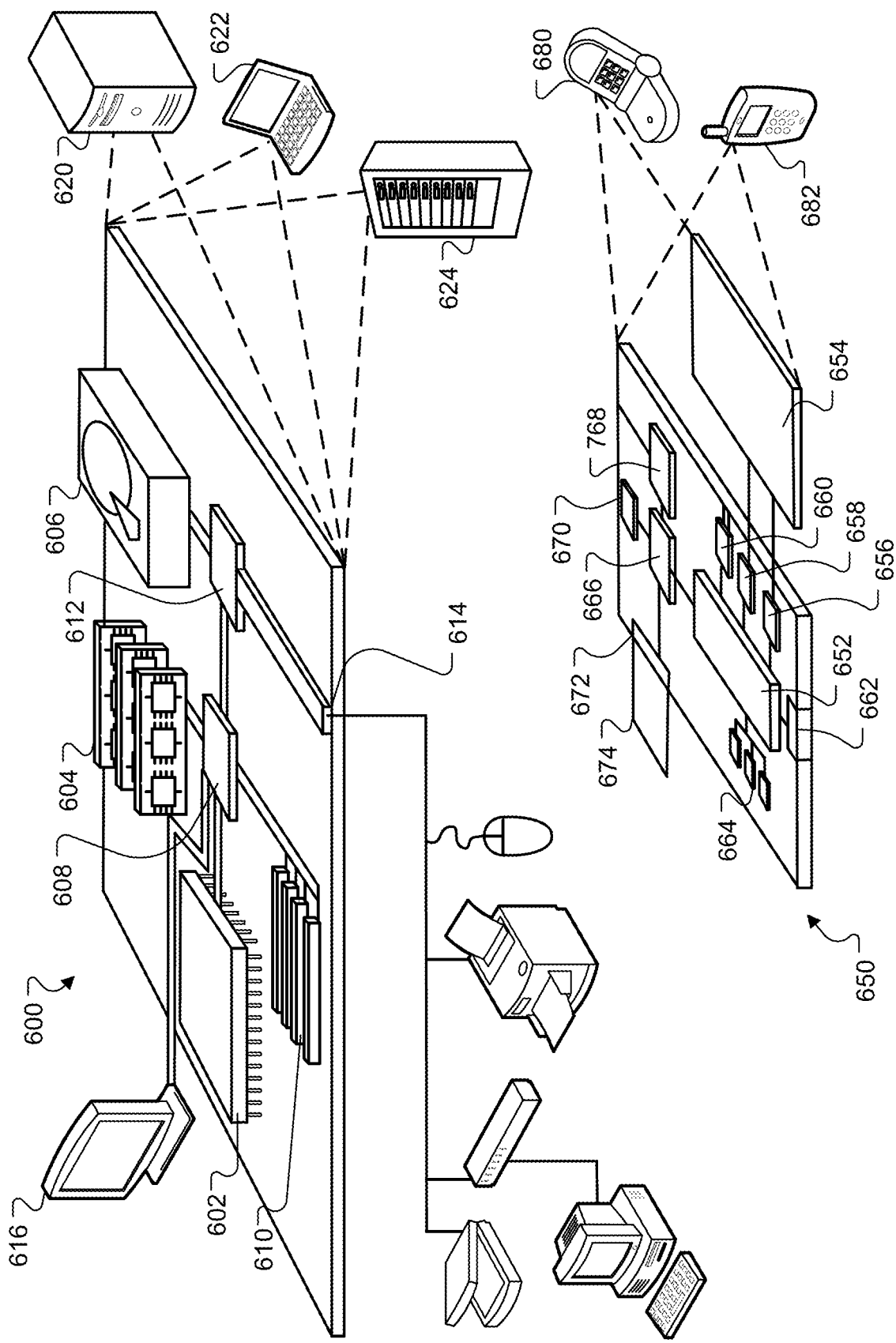
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 582, personal digital assistant, or other similar mobile device.

FIGS. 7A-7E illustrate example surface meters 702a-702e to collect sensor data from a pipe. The surface meters 702a-702e (each generally referred to as surface meter 702) can, for example, be externally fitted to a surface of a medium that includes a restricted area which fluid (or gas) can flow through. For example, the surface meters 702a-

702e can be fitted to the surface of a pipe. The pipe can be, for example, a main water line, a main gas line, a branching water or gas line, a hot water or cold water supply line, an appliance/fixture water or gas line, or a drain line. The pipe may be a pipe of a building, such as a pipe of a home or of an office building.

The surface meters 702a-702e can include a flexible substrate 740 that can be wrapped around a medium. For example, the flexible substrate 740 can be sufficiently flexible to be wrapped around pipes of one or more sizes (e.g., a pipe with a diameter between 0.5" and 2.5"). The flexible substrate 740 can be made out of a flexible material such as plastic, cloth, or rubber (e.g., natural or synthetic rubber).

The flexible substrate 740 can be elastic so that it can be stretched when fitted to a medium so as to better secure the surface meter 702 to the medium (e.g., by increasing the friction fit of the surface meter 702 to the medium). The one or more sensors of the surface meter 702 may be able to collect more accurate sensor data from the medium when the surface meter 702 is better secured to the medium such that the location of the surface meter 702 changes as little as possible over time and/or the surface meter 702 is less likely to introduce noise into the sensor data (e.g., as a result of the surface meter 702 vibrating).

In some implementations, there are different size surface meters for different medium applications. For example, a small size surface meter can be designed to fit pipes having a first range of sizes (e.g., 0.25" diameter to 1" diameter, 0.5" diameter to 2" diameter, 0.5" diameter to 3" diameter), a medium size surface meter can be designed to fit pipes having a second range of sizes (e.g., 2" diameter to 4" diameter, 3" diameter to 6" diameter, etc.), and a large size surface meter can be designed to fit pipes having a third range of sizes (e.g., 4" diameter to 8" diameter, 6" diameter to 12" diameter, 6" diameter to 16" diameter, etc.). Separately or in addition, the pipe can be pre-configured to begin operating with a specified range of thresholds based on the designed size of the pipe. The pipe can be rigid or flexible.

The surface meters 702a-702e can be fitted to a medium using one or more fasteners or fastener systems. For example, with respect to FIGS. 7A-7E, the surface meter 702 can be fitted with stem fasteners (e.g., Dual Lock or Duotec) with a first fastener section 720a that can be secured to a second fastener section 720b when the surface meter 702 is wrapped around a medium. When the surface meter 702 is fitted to the medium, at least a subset of stems in the first fastener section 720a can engage a subset of stems in the second fastener section 720b and, as a result, secure the first end of the surface meter 702 containing the first fastener section 720a to the second end of the surface meter 702 containing the second fastener section 720b.

The surface meter 702 can use one or more different types of fasteners. For example, the surface meter 702 can include a hook-and-loop fastener system where the first fastener section 720a includes a set of hooks and the second fastener section 720b includes a set of loops. When the surface meter 702 is fitted to a medium, the hooks in the first fastener section 720a can engage with the loops in the second fastener section 720b and, as a result, secure the first end of the surface meter 702 to the second end of the surface meter 702.

As another example, as shown in FIG. 7E described in more detail below, the surface meter 702 can use a belt and loop or a belt and buckle fastener system. For example, the first end of the surface meter 702 can include a loop or buckle and the second end of the surface meter 702 can serve as a belt that the loop or buckle receives. The second end of the surface meter 702 can include one or more holes that that are configured to receive a piece of the buckle to secure the first end of the surface meter 702 to the second end of the surface meter 702 when the surface meter 702 is fitted to a medium. The holes in the second end of the surface meter 702 may be located at or between markings 722 that correspond to different medium sizes.

As another example, the first end of the surface meter 702 can include a loop that receives the second end of the surface meter 702. The first end of the surface meter 702 can be fastened to the second end of the surface meter 702 by sliding the second end through the loop of the first end, which can provide a friction fit or can secure the two ends through a magnet (e.g., permanent magnet) in the loop and (i) a ferrous material in the second end or (ii) one or more magnets in the second end (e.g., a magnet at or between each of the markings 722).

As another example, the surface meter 702 may include a fixed latch where the first end of the surface meter 702 contains a first latch piece and the second end of the surface meter 702 includes a second latch piece. The first latch piece and the second latch piece can engage to secure the first end of the surface meter 702 to the second end of the surface meter 702. The latch may not be adjustable. Instead, the flexible substrate 740 may be elastic and change shapes depending on the size of the medium that the surface meter 702 is installed on.

The surface meters 702a-702e can include a power source 704. The power source 704 can power other electrical components of the surface meter 702. For example, power source 704 can power a microprocessor 706, a transceiver 708, and one or more sensors of the surface meter 702. The power source 704 can include one or more batteries. For example, the power source 704 can include one or more rechargeable batteries, such as one or more lithium-ion batteries. As another example, the power source 704 can include one or more non-rechargeable batteries, such as one or more replaceable alkaline batteries.

In some implementations, the power source 704 includes one or more capacitors. For example, the power source 704 can include one or more super capacitors or ultracapacitors.

The power source 704 can include sufficient energy capacity so as to a power the electric components of the surface meter 702 for a threshold period time. The threshold period of time may be, for example, two years, two and a half years, three years, etc. To determine if the power source 704 is sufficient to meet the threshold period of time, an expected power life for the surface meter 702 can be calculated. The expected power life can be a calculated using the known power usage of all electronic components when on. Alternatively, where at least some components of the surface meter 702 operate at least part of the time in a low-power mode, the expected power life can be calculated using the known power usage of the electronic components in the different modes (e.g., low-power mode and full-power mode) and one or more assumptions for how often the components of the surface meter 702 will be operating in a low-power mode compared to a full-power mode. These one or more assumptions may be based on, for example, a type of building that the surface meter 702 is being fitted to a pipe in, the number of persons living in or working in the building, the size of the pipe, and/or the type of pipe that the surface meter 702 is being fitted to (e.g., main water line, branching water line, appliance/fixture water line (e.g., for a dishwater, refrigerator, sink, bath, etc.), main gas line, etc.). A worst-case assumption can be used (e.g., electronic components will be operating in full-power mode 90% of the time, 80% of the time, 70% of the time, etc.) to calculate the expected power life to ensure that the power source 704 of the surface meter 702 has sufficient energy capacity to power the surface meter 702 for the threshold period of time despite the particular application of the surface meter 702.

In calculating an expected power life of the surface meter 702, other factors can be taken into consideration. For example, the loss in energy capacity over time (e.g., based on the type of battery or capacitor used for the power source 704) can be taken into account when calculating the expected. As another example, the type of pipe that the surface meter 702 is to be attached to can be used to calculate the power life. For example, if the surface meter 702 is to be fitted to a cold water pipe, the expected power life of the surface meter 702 may be calculated to be lower than if the surface meter 702 were to be fitted to a hot water pipe.

In some implementations, an external computing system calculates the power life expectancy of the surface meter 702 and uses the power life expectancy to perform one or more actions. The external computing system may, for example, update the power life expectancy over time. For example, based on the amount of sensor data collected by the surface meter 702, the age or install time of the surface meter 702, characteristics of the medium that the surface meter 702 is fitted to (e.g., type of pipe, fluid in the pipe, average temperature of the pipe, etc.), percent of time that the surface meter 702 is operating in a low-power or full-power mode, and/or information from the surface meter 702 indicating a remaining power life or the health of the power source 704, the external computing system can continually update the expected remaining power life for the surface meter 702. When the expected power life for the surface meter 702 falls below a threshold time (e.g., one month, one week, one day, etc.), the external computing system can generate a notification and transmit the notification to one or more computing devices. These computing devices can be computing devices belonging to occupants of the building where the surface meter 702 is located or the building that receives fluid from a medium that the surface meter 702 is fitted to. The notification can be, for example, a reminder to replace the battery of the surface meter 702.

As another example, in response to the power life expectancy of the surface meter 702 falling below a threshold time, the external computing system can send instructions to the surface meter 702 to reduce the power consumption of the surface meter 702. For example, with respect to FIG. 7E, the external computing system can generate and transmit instructions to the surface meter 702e instructing the surface meter 702e to operate in a low-power mode such that sensor data is collected using only a subset of the sensors of the surface meter 702e. For example, the instructions may provide that the surface meter 702e is to collect sensor data using only a vibration sensor 712, with the microprocessor 706 turning off (e.g., not providing power to or stopping power drawn by) a microphone 710 and a temperature sensor 714.

The surface meters 702a-702e can include the microprocessor 706. The microprocessor 706 can include a CPU. The microprocessor 706 can be a processor. The microprocessor 706 can be configured to control various electrical components of the surface meter 702. For example, the microprocessor 706 can be configured to obtain sensor data generated by the one or more sensors of the surface meter 702 (e.g., a microphone, a vibration sensor, and/or a temperature sensor 714). The microprocessor 706 may be able to further control the state of the one or more sensors. For example, the microprocessor 706 can be configured to reduce or stop power provided to or power drawn by the one or more sensors when the surface meter 702 is being operated in a low-power mode. In this low-power mode, the one or more sensors may not collect sensor data from the medium that the surface meter 702 is fitted to. In response to a triggering event that turns off low-power mode, the microprocessor 706 can increase power provided to or the amount of power that can be drawn by the one or more sensors so that they The triggering event can be instructions received by the surface meter 702 from an external computing device. For example, the surface meter 702 may receive instructions wirelessly indicating that the surface meter 702 is instructed to collect sensor data. In response to receiving these instructions, the microprocessor 706 can turn off low-power mode by, for example, providing power to the one or more sensors of the surface meter 702 such that they start generating sensor data, such as audio data, vibration data, and/or temperature data.

The triggering even can be a determination that the surface meter 702 has been installed such that it has been fitted to a medium. For example, the surface meter 702 may, in low-power mode, operate one of multiple sensors such as a vibration sensor. The microprocessor 706 can process the vibration data and, in processing the vibration data, determine that that the surface meter 702 has been fitted to a pipe. In response to this determination, the microprocessor 702 can turn on one or more other sensors of the surface meter 702 such as a microphone.

As another example, an installer of the surface meter 702 can provide an indication that the surface meter 702 has been installed through a computing device. For example, the installer can use her smart phone to indicate that she completed the installation of the surface meter 702 on a particular pipe in a property. The smart phone can provide an indication of the install directly to the surface meter 702 (e.g., through Bluetooth protocol) or indirectly to the surface meter 702 (e.g., through a server or a coordinator device of a local area network). In response to receiving this indication, the microprocessor 706 can turn off low-power mode.

The triggering event can be a detection event generated by one or more onboard components of the surface meter 702. For example, the surface meter can include a wake-on-sound sensor that is electrically coupled to the microprocessor 706. The wake-on-sound sensor can be a low-power or low-current sensor that operates in a listen mode (e.g., where it draws less than or equal to 20 micro amps of current, 15 micro amps of current, or 10 micro amps of current) when the other sensors of surface meter 702 are powered off. As an example, the wake-on-sound sensor can be a wake-on-sound piezoelectric micro-electromechanical systems (MEMS) microphone that is configured to detect audio energy using a pressure-sensitive membrane. In response to detecting audio energy that reaches a level greater than a threshold level of audio energy, the MEMS microphone can trigger the waking of other components of the surface meter 702 such as the other sensors of the surface meter 702.

A number of benefits are achieved by operating the surface meter 702, at least part of the time, in a low-power mode. By operating in the surface meter 702 in a low-power mode such that one or more sensors of the surface meter 702 are not actively collecting or generating sensor data, the power life of the surface meter 702 can be greatly increased and, thereby, the frequency that the power source 704 needs to be recharged or replaced can be greatly reduced. As will be discussed in more detail with respect to FIG. 10, a computing system can obtain sensor data from multiple surface meters and use the collected sensor data to intelligently identify events or problems occurring at a property where the multiple surface meters are installed. By having more surface meters 702 remain operational so that they are able to collect and/or process sensor data, the accuracy of the computing system's event detections and event identifications improves. Accordingly, event detection and event identification accuracy can be improved as a result of extending the power life of the surface meters 702.

Moreover, due to the locations of pipes in buildings being often difficult to get to, increasing the battery life and, thereby, decreasing the frequency that power source 704 needs to be recharged or replaced can afford installers of the surface meters 702 much added convenience and occupants improved safety. That is, if more frequent power source 704 recharges or replacements are required of the surface meters 702, installer convenience will suffer and it is more likely that one or more of the installed surface meters 702 will lose power and cease to collect sensor data for a period of time, thereby increasing the risk that a safety event at the property, such as a water leak, goes undetected.

The surface meters 702*a*-702*e* can include a transmitter. The transmitter can be, for example, a radio transmitter such as a Wi-Fi transmitter, a Zigbee or Bluetooth transmitter, or a cellular transmitter. For example, the surface meter 702 can include a radio transmitter that can the surface meter 702 can use to wirelessly transmit sensor data to one or more external computing devices or systems.

The surface meters 702*a*-702*e* can include a receiver. The receiver can be, for example, a radio receiver such as a Wi-Fi receiver, a Bluetooth receiver, or a cellular receiver. For example, the surface meter 702 can include a radio receiver that allows the surface meter 702 to receive instructions to perform particular actions (e.g., collect sensor data, transmit sensor data, etc.).

The surface meters 702*a*-702*e* can include both a transmitter and a receiver. For example, the surface meter 702 can include a transceiver 708 that includes a transmitter and a receiver. The surface meter 702 can use the transceiver 708 to communicate with one or more external computing devices or systems. For example, the surface meter 702 can receive requests from a coordinator device over the transceiver. These requests can include, for example, requests to initiate sensor data collection, to initiate sensor data transmission, and/or to collect sensor data for a predetermined amount of time. The surface meter 702 can, for example, proceed to use the transceiver to transmit collected sensor data to the coordinator device or to one or more other devices.

The transceiver 708 can be a transceiver for a particular network and/or communication protocol described in more detail below. For example, the transceiver 708 can be a transceiver particular to a specific low-power mesh network (e.g., Zigbee or Z-wave network) and configured to communicate with one or more other devices on the same network.

In some implementations, the transceiver 708 can perform one or more operations when the surface meter 702 is in a low-power or sleep mode. For example, the transceiver 708 can continue to receive communications from one or more computing devices over a mesh network and perform one or more actions in response to the received communications. In more detail, in response to receiving a communication instructing the surface meter 702 to be activated or to otherwise start collecting sensor data, the transceiver 708 can be configured to wake other electrical components of the surface meter 702. For example, the transceiver 708 may be able to wake the microprocessor 706 and the one or more sensors from a low-power mode. As another example, the microprocessor 706 can cyclically wake itself from a low-power or sleep mode and use the transceiver 708 to check to see if any communications have been received, such as instructions requesting sensor data.

When the surface meter 702 includes a wake-on-sound sensing device such as a MEMS microphone, the surface meter 702 may be able to be woken from a sleep or low-power mode multiple ways. For example, the surface meter 702 may be awoken from a low-power mode in response to receiving particular instructions through the transceiver 708 and in response to the wake-on-sound sensing device detecting more than a threshold level of audio energy.

In some implementations, the surface meter 702 does not include a transceiver. For example, the surface meter 702 can only include a transmitter. As another example, the surface meter 702 can include a separate transmitter and receiver.

The surface meters 702*a*-702*e* can communicate over a network with one or more computing devices. For example, the surface meter 702*a*-702*e* can communicate directly or indirectly (e.g., through one or more servers, one or more routers, one or more routers, or a combination thereof) with a mobile computing device of an occupant using the transceiver 708. The communication protocol used by the surface meter 702 can be a Wi-Fi protocol, a cellular protocol, a near field communication protocol (e.g., Bluetooth, NFC, or RFID), or a low-power or low-rate protocol (e.g., Zigbee or Z-wave).

The surface meters 702*a*-702*e* can be part of a local area network. The local area network can be wireless local area network, such as a WPAN (e.g., Bluetooth network). The local area network can be a low-power, low-latency, and/or low-rate local area network, such as a Zigbee network or a Z-wave network. For example, the local area network can be a low-rate WPAN (LR-WPAN) that uses IEEE 802.15.4 standard (e.g., Zigbee network).

The local area network can be a mesh network, cluster tree, or star network. For example, the surface meter 702 can serve as a node of a wireless mesh network that includes one or more other devices that also serve as nodes of the wireless mesh network. These other devices can be, for example, other surface meters (e.g., of the same or different design as the surface meter 702) that are fitted to other mediums that provide fluid to the same property that a medium that the surface meter 702 is fitted to also provides fluid to. These other devices can include other sensing devices, such as smart plugs that can detect the amount of power being drawn from one or more outlets of the property, thermostats that can detect the ambient temperature inside the property, security devices such as cameras and door/window sensors, etc. These other devices can also include, for example, routers that can receive and transmit communications signals from and to other devices in the network. In some cases, sensing devices such as the surface meter 702 can serve as a router. These other devices can also include, for example, coordinator devices such as a smart hubs, gateways, or the like.

As an example, a mesh network can include as a first node a first surface meter 702 that is fitted to a main water line of a home, as a second node a second surface meter 702 that is fitted to a cold water line that provides water to a washing machine of the home, as a third node a third surface meter 702 that is fitted to a hot water line that provides water to the washing machine of the home, and as a fourth node a fourth surface meter 702 that is fitted to a natural gas line for the home. The sensor data collected by these four surface meters can be transmitted over the mesh network to a smart hub (e.g., through one or more network routers). As will be discussed in more detail below with respect to FIG. 8, FIG. 9, and FIG. 10, the smart hub may use the sensor data to make one or more determinations as to the state of the property and, based on the one or more determinations, generate a notification. The smart hub can transmit this notification to mobile computing devices of occupants of the property through a server (e.g., cloud computing server), a Wi-Fi router, and/or a cellular network.

By communicating or being part of a low-power or low-rate network, such as low-rate mesh network, the amount of power used by the surface meter 702 for communication is greatly reduced. As a result, the power life of the surface meter 702 can be extended by using a low-power or low-rate network, such as a LR-WPAN. For example, the surface meter 702's microprocessor 706 and/or transceiver 708 can be part of a microchip that is particularly configured to the local area mesh network such that it is optimized for battery-powered devices such as the surface meter 702. This microchip can receive signals bounced, passed, or routed by one or more repeater/router devices in the mesh network (e.g., that are closest to the surface meter 702) or transmit signals to be bounced, passed, or routed by the one or more repeater/router devices in the mesh network. By taking advantage of these repeater/router devices, the distance between the surface meter 702 and a device that can receive a signal from the surface meter 702 can be reduced and, thereby, the amount of power needed to transmit the signal can be reduced.

One or more of the electrical components of the surface meters 702*a*-702*e* can be flexible. For example, the microprocessor 706 can be a flexible computer processor that can bend with the flexible substrate 740 when the surface meter 702 is fitted to a medium such as a pipe. The flexible electrical components can be sufficiently flexible so as to bend to the shape or substantially bend to the shape of the medium that the surface meter 702 is fitted to when the surface meter 702 is installed.

In some implementations, all of the electrical components of the surface meters 702*a*-702*e* are flexible. For example, the power source 704, the microprocessor 706, the transceiver 708, and the one or more sensors of the surface meter 702 can be flexible so as to bend with the flexible substrate 740 or substantially bend with the flexible substrate 740 of the surface meter 702 when the surface meter 702 is fitted to a medium such as a pipe.

One or more of the electrical components of the surface meters 702*a*-702*e* can be part of or otherwise electrically coupled to a flexible circuit board. For example, the power source 704, the microprocessor 706, and the transceiver 708 can be printed on or coupled to a flexible circuit board that is capable of bending with the flexible substrate 740 when the surface meter 702 is fitted to a medium such as a pipe. The flexible circuit board can be sufficiently flexible so as to bend to the shape or substantially bend to the shape of the medium that the surface meter 702 is fitted to when the surface meter 702 is installed.

In some implementations, each of the circuit boards of the surface meters 702*a*-702*e* are flexible. For example, the power source 704, the microprocessor 706, the transceiver 708, and the one or more sensors of the surface meter 702 can be embedded in or otherwise electrically coupled to flexible circuit boards that are able to bend with the flexible substrate 740 or substantially bend with the flexible substrate 740 of the surface meter 702 when the surface meter 702 is fitted to a medium such as a pipe.

Fasteners

The surface meters 702*a*-702*e* can include a set of markers 722. The markers 722 can indicate, for example, the size of the pipe when the surface meter 702 is fitted to the pipe. For example, the markers 722 can be a set of markers that indicate different possible diameters 734 for a pipe. The diameters 734 may indicate an inside diameter of the pipe or an outside diameter of the pipe. When the surface meter 702 is fitted to a pipe such that a first end of the surface meter 702 that includes the first fastener area 720*a* is fastened to a second end of the surface meter 702 that includes the second fastener area 720*b*, then the marker of the markers 722 that is closest to the first end of the surface meter 702 best estimates the diameter of the pipe. In more detail, if the first end of the surface meter 702 reaches the marker labeled "1" after it is fastened to the second end of the surface meter 702 when the surface meter 702 is fitted to the pipe, then the markers 722 indicate that the pipe has a diameter of one inch.

As another example, the markers 722 can be a set of markers that indicate different possible circumferences of a pipe, such as different possible inside or outside diameters of a pipe. When the surface meter 702 is fitted to a pipe such that the first end of the surface meter 702 that includes the first fastener area 720*a* is fastened to the second end of the surface meter 702 that includes the second fastener area 720*b*, then the marker of the markers 722 that is closest to the first end of the surface meter 702 best estimates the circumference of the pipe.

The markers 722 can include markers for standard pipe sizes. For example, the markers 722 can include markers for standard home water pipe sizes. The markers 722 can include a first marker for a ½ inch pipe, a second marker for a ¾ inch pipe, and a third marker for a 1 inch pipe.

In some implementations, the markers 722 are consistently spaced apart at a particular distance. For example, a first marker and a second marker of the markers 722 may be spaced apart at a distance of $\pi/4$ or 0.785 inch from one another. A third marker of the markers 722, following the second market, may be spaced $\pi/4$ inch from the second marker and $\pi/2$ inch from the first marker. In other examples, the markers 722 can be spaced apart at a different particular distance, such as 0.5 inches, 1.0 inch, 2.0 inches, 3.0 inches, 1.0 centimeter, 2.0 centimeters, 5 centimeters, etc.

In some implementations, the markers 722 are spaced apart at two or more different distances. For example, the markers 722 may include a first marker that is spaced 0.5 inches from a second marker, and a third marker that is spaced 1 inch from the second marker and 1.5 inch from the first marker.

In some implementations, the microprocessor 706 can receive sensor data that indicates the size of the pipe that the surface meter 702 is fitted to and perform one or more actions with the sensor data. The microprocessor 706 can use the sensor data to determine the size of the pipe, such as a diameter or a circumference of the pipe. The microprocessor 706 can use the sensor data to make other decisions. For example, the microprocessor 706 can use the sensor data indicating the pipe size along with other sensor data, such as a temperature sensor, to identify a type of pipe that the surface meter 702 is fitted to. In more detail, based on received sensor data indicating that the diameter of the pipe is one-half inch and that the temperature of the pipe is less than a threshold temperature (e.g., 60°, 55°, or 50° Fahrenheit), then the microprocessor 706 can identify the pipe as a cold water line. In configurations where the sensor is encompassed in a wrap (e.g., a tape or flexible Velcro wrap), the wrap can communicate the pipe size to a processor. For example, the wrap may contain a conductive element whose resistivity changes with the diameter. The different resistivity may be used to automatically determine pipe size. The determined pipe size then may be used to identify ambient (e.g., non fault) states and/or program a wake-on demand microphone, for example, by adjusting the wake-on-demand volume or vibrational settings.

Additionally or alternatively, the microprocessor 706 can use the transmitter 708 to transmit the sensor data to an external computer system, such as a server. The external computer system can use the sensor data to determine the size of the pipe, such as a diameter or a circumference of the pipe. The external computer system can use the sensor data to make other decisions. For example, the external computer system can use the sensor data indicating that the p microprocessor 706 can use the sensor data indicating the pipe size along with other sensor data, such as a temperature sensor, to identify a type of pipe that the surface meter 702 is fitted to. In more detail, based on received sensor data indicating that the diameter of the pipe is one inch and that the temperature of the pipe is less than a threshold temperature (e.g., 60°, 55°, or 50° Fahrenheit), then the microprocessor 706 can identify the pipe as a cold water line The sensor data can include sensor data obtained from one or more Hall effect sensors. For example, the first end of the surface meter 702 can include a magnet (e.g., a permanent magnet or an electromagnet) that is attached to the first end of the surface meter 702 or that is embedded in the first end of the surface meter 702. The second end of the surface meter 702 (e.g., the end of the surface meter 702 where the markers 722 are located) can include one or more Hall effect sensors that generate outputs that are reactive to the magnet in the first end of the surface meter 702. The one or more Hall effect sensors can be attached to the second end of the surface meter 702 or embedded in the second end of the surface meter 702.

As an example, the surface meter 702 can include a single Hall effect sensor. The Hall effect sensor may be centrally located in the second end of the surface meter 702 (e.g., at the 1.5 inch marker of the markers 722). The Hall effect sensor can provide an analog output that is proportional to the strength of a magnetic field introduced by the magnet in the first end of the surface meter and, therefore, indicative of the distance that the magnet is to the Hall effect sensor. The microprocessor 706 can associate different outputs of the Hall effect sensor with different distances or markers of the markers 722. For example, the microprocessor 706 can refer to a lookup table that associated different ranges of outputs with different markers of the markers 722. Using this technique, the microprocessor 706 can use the output of the Hall effect sensor to identify the size of the pipe when the surface meter 702 is fitted to a pipe.

In some implementations, the locations of the markers 722 correspond to locations of Hall effect sensors. For example, the surface meter 702 can include a Hall effect sensor for each marker of the markers 722. Each Hall effect sensor can share a location with a corresponding marker of the markers 722 such that the Hall effect sensor touches the marker, crosses the marker, or is otherwise substantially the same distance as the marker from a right-most or left-most edge of the surface meter 702 (e.g., when the surface meter 702 is lying flat and not fitted to a pipe as shown in FIGS. 7A-7D). The Hall effect sensors can provide a binary output such that when the surface meter 702 is fitted to a pipe, the Hall effect sensor closest the to the magnet in the first end of the surface meter 702 outputs a "1" while the other Hall effect sensors output a "0." The microprocessor 706 can, for example, use an ID for the Hall effect sensor that is outputting "1" to identify a corresponding marker that indicates a size of the pipe that the surface meter is fitted to. Using this technique, the microprocessor 706 can use the outputs of the Hall effect sensors to identify a size of the pipe that the surface meter 702 is fitted to.

In some implementations, the sensor data can include sensor data obtained from one or more stress, deformation, or flex sensors. For example, the surface meter 702 can include a flex sensor embedded in the second end of the surface meter 702 (e.g., in an area of the surface meter 702 where the markings 722 are located). The output of the flex sensor can have a resistance that is proportional to the amount of bend that the flex sensor and, therefore, the surface meter 702 experiences. The surface meter 702 and, therefore, the flex sensor will experience greater bend for smaller diameter pipes and less bend for larger diameter pipes. After the surface meter 702 is fitted to a pipe, the microprocessor 706 can obtain the output of the flex sensor. The microprocessor 706 can use the transmitter 708 to transmit the flex sensor output to an external computing system that can proceed to use the output to determine a size of the pipe. Additionally or alternatively, the microprocessor 706 can use the output to determine a size of the pipe. For example, the microprocessor 706 can use an algorithm that uses the output of the flex sensor as an input and provides a size (e.g., diameter or circumference) of the pipe as an output.

The surface meters 702a-702e can include memory. The memory can be used by the surface meters 702a-702e to store sensor data obtained from the one or more sensors of the surfaced meters 702a-702e.

The surface meters 702a-702e can be fitted to various types of mediums. These mediums can include mediums of varying sizes (e.g., different diameters, circumferences, etc.). These mediums can also include different types of mediums, such as pipes made of different materials and that contain or transport different types of fluids. For example, the surface meter 702 can be fitted to a 1" diameter natural gas pipe and also fitted to a 0.5" diameter hot water line.

The surface meters 702a-702e can be removable and re-fitted to different mediums or to different sections of the same medium. For example, after the surface meter 702 has been fitted to a 2" diameter main water line for a home. A person, such as an occupant of the home, can remove the surface meter 702 and fit it to a 1" diameter natural gas line for the home.

FIG. 7A illustrates an example surface meter 702a. The surface meter 702a includes a microphone 710 configured to detect audio energy levels. For example, the surface meter 702a can use the microphone 710 to detect audio energy levels created by fluid moving through a pipe when the surface meter 702a is fitted to the pipe.

The microphone 710 can be an electret condenser microphone or a MEMS microphone. However, other types of microphones or audio sensors can be used as the microphone 710.

In some implementations, the microphone 710 includes multiple microphones or other audio sensors. For example, the microphone 710 can include a wake-on-sound MEMS microphone that can wake electrical components of the surface meter 702a from a low-power mode and a electret condenser microphone.

The microphone 710 can be located on a top surface of the flexible substrate 740. The flexible substrate 740 can include, for example, one or more through-holes (e.g., that extend from a bottom surface of the flexible substrate 740 to the top surface of the flexible substrate) for the microphone 710 to improve accuracy of audio energy detection by the microphone 710 when the surface meter 702a is fitted to the medium. The one or more through-holes can, for example, allow sound to more efficiently travel from the medium to the microphone 710 using the one or more through-holes.

The microphone 710 can be embedded in the flexible substrate 740 or partially embedded in the flexible substrate 740. When the microphone 710 is embedded in the flexible substrate 740, the flexible substrate 740 may include one or more holes that extend at least partially through the flexible substrate 740 (e.g., extend from a bottom surface of the flexible substrate 740 partway towards the top surface of the flexible substrate 740) so as to allow sound to travel more efficiently between a medium that the surface meter 702a is fitted to and the microphone 710.

The microphone 710 can be located on a bottom surface of the flexible substrate 740. For example, when the surface meter 702a is fitted to a pipe, the microphone 710 may be brought into contact with an outer surface of the pipe.

FIG. 7B illustrates an example surface meter 702b. The surface meter 702b includes a vibration sensor 712 configured to detect vibrations or levels of vibration. For example, the surface meter 702b can use the vibration sensor 712 to detect vibrations in a pipe that occurs when water or other material is flowing through the pipe when the surface meter 702b is fitted to the pipe.

The vibration sensor 712 can be displacement sensor, a velocity sensor, an accelerometer (e.g., piezoelectric vibration sensor), a MEMS-based vibration sensor, or a strain gauge. However, other types of vibration sensors can be used as the vibration sensor 712.

In some implementations, the vibration sensor 712 is or includes a low-power vibration sensor that can wake one or more electrical components of the surface meter 702b from a low-power mode. For example, the vibration sensor 712 can be a low-power vibration sensor that can wake the microprocessor 706 and the transceiver 708 from a low-power mode in response to detecting vibrations greater than a threshold vibration level.

The vibration sensor 712 can be located on a top surface of the flexible substrate 740. The flexible substrate 740 can include, for example, one or more through-holes (e.g., that extend from a bottom surface of the flexible substrate 740 to the top surface of the flexible substrate) for the vibration sensor 712 to improve accuracy of vibration detection by the vibration sensor 712 when the surface meter 702b is fitted to the medium. The one or more through-holes may be filled with a material that allows vibrations to more efficiently travel to the vibration sensor 712 or that reduces noise introduced to the vibrations.

The vibration sensor 712 can be embedded in the flexible substrate 740 or partially embedded in the flexible substrate 740. When the vibration sensor 712 is embedded in the flexible substrate 740, the flexible substrate 740 may include one or more holes that extend at least partially through the flexible substrate 740 (e.g., extend from a bottom surface of the flexible substrate 740 partway towards the top surface of the flexible substrate 740). These one or more holes can be filled with a material that allows vibrations to more efficiently travel from a medium to the vibration sensor 712.

The vibration sensor 712 can be located on a bottom surface of the flexible substrate 740. For example, when the surface meter 702b is fitted to a pipe, the vibration sensor 712 can be brought into contact with an outer surface of the pipe.

Figure 7C:
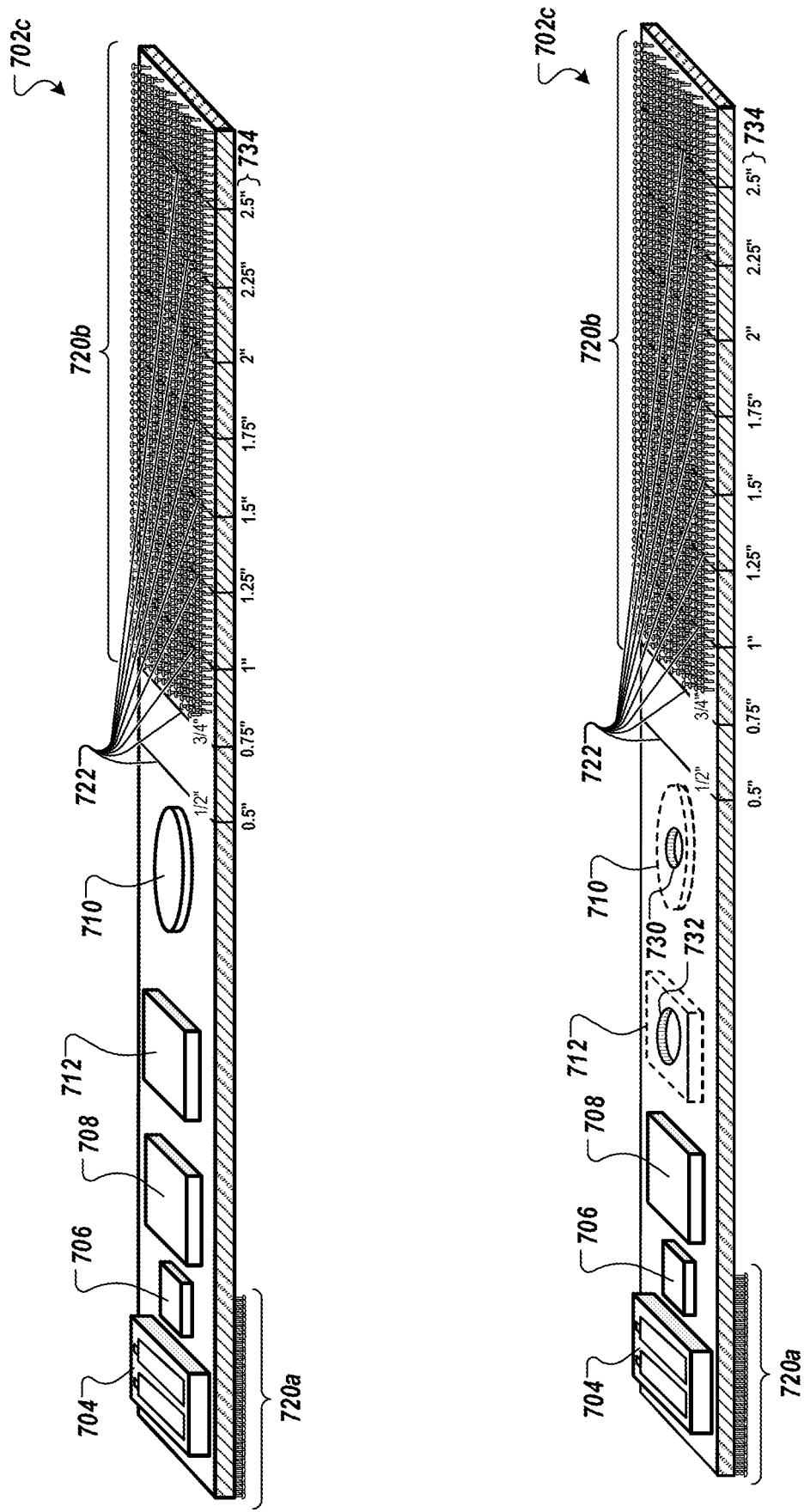

FIG. 7C illustrates an example surface meter 702c. The surface meter 702c includes the microphone 710 and the vibration sensor 712. For example, the surface meter 702c can use the microphone 710 to detect audio energy in a pipe and the vibration sensor 712 to detect vibrations in the pipe.

The surface meter 702c can include a first through-hole 730 for the microphone and a second through-hole 732 for the vibration sensor 712. The first through-hole 730 can be empty. Alternatively, the first through-hole 730 can be filled or partially filed by the microphone 710 or a portion of the microphone 710 so that the microphone 710 is brought closer to or in contact with a surface of a medium when the surface meter 702c is fitted to the medium. The first through-hole 730 can be filled with a material that allows sound to travel more efficiently.

The second through-hole 732 can be empty. Alternatively, the second through-hole 732 can be filled or partially filed by the vibration sensor 712 or a portion of the vibration sensor 712 so that the vibration sensor 712 is brought closer to or in contact with a surface of a medium when the surface meter 702c is fitted to the medium. The second through-hole 732 can be filled with a material that allows vibrations to travel more efficiently.

FIG. 7D illustrates an example surface meter 702d. The surface meter 702d includes the microphone 710, the vibration sensor 712, and a temperature sensor 714 configured to detect a temperature of a medium that the surface meter 702d has been fitted to. For example, the surface meter 702d can use the microphone 710 to detect audio energy in a pipe produced by fluid or other material moving through the pipe, the vibration sensor 712 to detect vibrations in the pipe caused by fluid or other material moving through the pipe, and the temperature sensor 714 to detect a temperature of the outer surface of the pipe that is affected by a temperature of fluid in the pipe, flow rate of fluid in the pipe, and/or amount of fluid in the pipe.

The temperature sensor 714 can be a thermistor, a resistance temperature detector, an infrared sensor, a bimetallic device, a thermometer, a change-of-state sensor, or a silicon diode. However, other types of temperature sensors can be used as the temperature sensor 714.

In some implementations, the temperature sensor 714 is or includes a low-power temperature sensor that can wake one or more electrical components of the surface meter 702d from a low-power mode. For example, the temperature sensor 714 can be a low-power temperature sensor that can wake the microprocessor 706 and the transceiver 708 from a low-power mode in response to detecting a temperature above a first temperature threshold or below a second temperature threshold.

The temperature sensor 714 can be located on a bottom surface of the flexible substrate 740. This can allow the temperature sensor 714 to come into contact with a medium such as a pipe when the surface meter 702d is fitted to the medium.

The temperature sensor 714 can be embedded or partially embedded in the flexible substrate 740. For example, the temperature sensor 714 can be partially embedded in a cavity formed in the bottom surface of the flexible substrate 740 that permits the allows the temperature sensor 714 to be flush with the bottom surface of the flexible substrate while allowing at least a portion of the temperature sensor 714 to contact an outer surface of a medium when the surface meter 702d is fitted to the medium.

The output of the temperature sensor can provide the surface temperature of the pipe. An external computing system such as, for example, the computing device 105 or a smart hub can use the temperature data and known characteristics of the medium that the surface meter 702*d* is in contact with to estimate the temperature of the fluid in or flowing through the medium. For example, a smart hub of a mesh network that the surface meter 702*d* belongs to can obtain a lookup table for the pipe or type of pipe that the surface meter 702*d* is fitted to. The lookup table can be used by the smart hub to convert the temperature data of the surface of the pipe to a fluid temperature based on, for example, a material of the pipe (e.g., PVC, aluminum, steel, etc.), a type of pipe (e.g., main water line, natural gas line, hot water line, etc.), an outside diameter or circumference of the pipe, and/or an inside diameter or circumference of the pipe.

FIG. 7E illustrates an example surface meter 702*e*. The surface meter 702*e* includes the microphone 710 configured to detect audio energy levels. For example, the surface meter 702*e* can use the microphone 710 to detect audio energy levels created by fluid moving through a pipe when the surface meter 702*e* is fitted to the pipe.

The surface meter 702*e* can also include the vibration sensor 712. The surface meter 702*e* can also include the temperature sensor 714.

The surface meter 702*e* shows a different fastening system than that used by the surface meters 702*a*-702*d* described above. The fastening system for the surface meter 702*e* includes a buckle or loop 724 on a first end of the surface meter 702*e* and a belt 726 that includes the markers 722 on the second end of the surface meter 702*e*. The buckle or loop 724 can be configured to receive the belt 726 when the surface meter 702*e* is fitted to the medium and secure the first end of the surface meter 702*e* to the second end of the surface meter 702*e*. As described above, the fastening system can use friction fit between the buckle or loop 724 and the belt 726, a prong in the buckle or loop 724 that can go through one of multiple holes in the belt 726 (e.g., a hole at or between each of the markers in the markers 722), or one or more magnets (e.g., one magnet in the buckle or loop 724 and multiple magnets in the belt 726 such that a magnet is embedded in the flexible substrate 740 at each marker in the markers 722).

FIG. 8 illustrates an example system for analyzing sensor data from a surface meter 802. The system can include the computing device 105 and one or more wireless networks that allow the computing device 105 to communicate with the surface meter 802.

In some implementations, the surface meter 802 is the surface meter 702*c* shown in FIG. 7C and described above.

The surface meter 802 ("Meter 1") is fitted to a medium and collects sensor data from the medium. For example, the surface meter 802 is fitted to a natural gas pipe 820 that has a first level of fluid 830*a* (e.g., a first level of natural gas) flowing through the pipe 820. Fluid, such as natural gas, flowing through the pipe 820 can cause the pipe 820 produce noise that a microphone of the surface meter 802 can detect and can introduce vibrations into the pipe 820 that a vibration sensor of the surface meter 802 can detect. The amount of fluid and/or speed of the fluid flowing through the pipe can affect noise produced by the pipe 820. Additionally, the amount of fluid and/or speed of the fluid flowing through the pipe can affect the vibration of the pipe 820. The surface meter 802 can produce audio data 804*a* and vibration data 806*a* that indicates the level of fluid 830*a* flowing through the pipe 820.

The computing device 105 can receive the sensor data from the surface meter 802 over one or more wireless networks. For example, at a first time, the computing device 105 can receive audio data 804*a* and vibration data 806*a* from the surface meter 802 over a cloud computing server. The cloud computing server may have received the audio data 804*a* and the vibration data 806*a* from a smart hub of a mesh network that the surface meter 802 ("Meter 1") belongs to (e.g., is a node of).

The sensor data transmitted by the surface meter 802 can be the sensor data most recently acquired by the surface meter 802. For example, the audio data 804*a* can include the most recent audio energy measurement from a microphone of the surface meter 802 and the vibration data 806*a* can include the most recent vibration measurement from a vibration sensor of the surface meter 802. The surface meter 802 can continually (e.g., periodically) transmit the most recently acquired sensor data. For example, the surface meter 802 may transmit the most recently acquired audio energy measurement and vibration measurement every 30 seconds to the computing device 105.

The sensor data transmitted by the surface meter 802 can include sensor data collected over a period of time. For example, the audio data 804*a* can include the audio energy measurements collected by the surface meter 802 over a threshold period of time (e.g., last minute, last 15 minutes, last 30 minutes, last hour, etc.) most recent measurement from a microphone of the surface meter 802 and the vibration data 806*a* can include the most recent measurement from a vibration sensor of the surface meter 802. The surface meter 802 can continually (e.g., periodically) transmit the collected sensor data. For example, the surface meter 802 may transmit every 15 minutes to the computing device 105 a collection of audio energy levels detected over the last 30 minutes and a collection of vibration levels detected over the last 30 minutes. The collected sensor data can be stored in memory on-board the surface meter 802. For example, the surface meter 802 can store the last 30 minutes of sensor data obtained such that the newest sensor data is added to the memory and the oldest sensor data (e.g., older than 30 minutes) is deleted from the memory.

The surface meter 802 may process the collected sensor data before it is transmitted. In processing the sensor data, the surface meter 802 may, for example, average the output of sensor data over a period of time (e.g., five seconds, thirty seconds, or one minute) and then transmit the processed sensor data. For example, the audio data 804*a* can include an average audio energy level from audio energy levels measured over the last minute and the vibration data 806*a* can include an average vibration level from vibration levels measured over the last minute. The surface meter 802 may use one or more other data processing techniques to, for example, reduce noise in the sensor data or otherwise improve the accuracy of the sensor data.

The sensor data transmitted by the surface meter 802 can be a stream of data. For example, the surface meter 802 can continually stream the sensor data to the computing device 105 as it is generated by the surface meter. In more detail, the surface meter 802 can, in response to receiving The sensor data transmitted by the surface meter 802 can include sensor data that meets one or more criteria for transmission. For example, the surface meter 802 may only transmit audio data 804*a* in response to determining that audio energy levels measured by a microphone of the surface meter 802 meet or exceed a threshold audio energy level. This audio energy threshold may be a threshold for a The surface meter 802 may only transmit the vibration data 806a in response determining that the vibration levels measured by a vibration sensor of the surface meter 802 meet or exceed a threshold vibration level.

After receiving the sensor data computing device 105 can analyze the sensor data to make one or more determinations. The computing device 105 can use the sensor data to determine one or more characteristics of the fluid in or traveling through the pipe 820. For example, the computing device 105 can use the audio data 804a and the vibration data 806a to determine an estimated flow rate of fluid flowing through the pipe 820. The computing device 105 may use an algorithm such as a machine learning algorithm to calculate the flow rate. The algorithm can use the sensor data as input and generate an output indicating a flow rate of the fluid or other characteristics of the fluid (e.g., velocity of the fluid). Alternatively, the computing device 105 can use a lookup table to estimate the flow rate. The lookup table can indicate, for example, an estimated flow rate for natural gas in the pipe 820 based on the detected level of vibration included in the vibration data 806a and/or the detected level of audio energy included in the audio data 804a.

The algorithm or lookup table may be specific for the pipe 820, for the type of pipe that the pipe 820 is, and/or the fluid in or that travels through the pipe 820. For example, the computing device 105 can access a machine learning algorithm that generates estimated flow rates for natural gas pipes. The computing device 105 can provide the sensor data (or one or more metrics generated from the sensor data) as input to the machine learning algorithm along with characteristics of the pipe 820 such as a size of the pipe 820 (e.g., diameter of 2"). In response to receiving this input, the machine learning algorithm can output an estimated current flow rate of natural gas traveling through the pipe 820 based on the size of the pipe 820 and the sensor data. The machine learning algorithm can be pre-trained using a set of training data that includes known flow rates of natural gas for different size pipes and corresponding audio energy and/or vibration levels from the pipes at those flow rates. The machine learning algorithm can be updated over time using, for example, feedback in the form of readings from a dedicated natural gas meter acquired at a property where the surface meter 802 is located or acquired from an external computing system (e.g., server of natural gas provider for the property).

As another example, the computing device 105 may access a lookup table for the pipe 820 that is specific to the size of the pipe 820 or the material that the pipe 820 is made of. For example, the computing device 105 may access a first lookup table for determining flow rate of natural gas in a pipe when the pipe is a natural gas pipe of 2" diameter and is made of steel, a second lookup table for determining flow rate of natural gas in a pipe when the pipe is a natural gas pipe of 1" diameter and made of steel, and a third lookup table for determining flow rate of natural gas in a pipe when the pipe is a natural gas pipe of 2" diameter and made of copper.

The sensor data, other determinations, and/or known characteristics of a medium that a surface meter is fitted can be used to make intelligent determinations for the property that receives material from medium. These intelligent determinations can be made by, for example, the computing device 105 using one or machine learning models. For example, the computing device 105 can access a machine learning model trained to recognize natural gas leaks based on audio data, vibration data, and characteristics of the pipe (e.g., size of the pipe).

The machine learning models can be trained to recognize activity patterns and generate outputs based on those activity patterns. The activity patterns can be activity of fluid flowing through the medium. For example, a machine learning model may generate a different output for the vibration data 806a and the audio data 804a based on a time of day or time of year. In more detail, if the current date is in the month of December when use of natural gas in the property is typical, the machine learning model may generate an output indicating no issues using the vibration data 806a and the audio data 804a. However, if the current date is in the month of July where use of natural gas in the property is atypical, the same machine learning model may generate an output indicating that there is an issue or a specific issue (e.g., gas leak, gas for stove left on, etc.).

The activity patterns can include activity or use of appliances or fixtures in a property that receives material from a medium that the surface meter is fitted to. For example, the computing device 105 can use sensor data collected by one or more surface meters to determine one or more appliances that are running or one or more fixtures that are being used. The computing device 105 can also use the sensor data to determine how long the appliances have been running or the fixtures have been used. Determining whether an appliance is on or a fixture is being used can be based on a flow rate of fluid in a pipe, the fluid in the pipe, the size of the pipe, the type of pipe, and/or the location of the surface meters. The computing device 105 can continue to analyze new sensor data. After determining from new sensor data that the appliance is no longer on or the fixture is no longer being used, the computing device 105 can calculate a run time for the appliance or a use time for the fixture. The computing device 105 can form activity patterns for appliances, fixtures, or the pipes themselves by associating with an appliance, fixture, or pipe, for example, a flow rate in the pipe when the appliance is running and/or when the fixture is used, a time of day or range of times that the appliance is typically running or the fixture is typically used, flow rates of liquid in the pipe for different times of day, a time of year or range of times of years that the appliance is typically running or the fixture is typically used, flow rates of liquid in the pipe for different times of year, a volume of fluid that is typically used by an appliance or fixture in a session or over a set period of time (e.g., one day, one week, one month, etc.), a volume of fluid that typically flows through the pipe over a set period of time, effect of number of occupants in the property on flow rate, effect of number of occupants in the property on appliance or fixture use, etc.

The activity patterns can be represented by a machine learning model for an appliance, fixture, and/or medium. For example, the computing device 105 can calculate a flow rate of gas in the pipe 820 based on the vibration data 806s and the audio data 804a. After calculating the flow rate, the computing device 105 can provide the flow rate as input to a machine learning model trained to recognize what fixtures are being used, what appliances are running, or a combination of one or more fixtures being used and appliance are running. The input for the machine learning model can also include the sensor data generated by the surface meter 802 and/or one or more other surface meters. The input can also include characteristics for the pipe 820, such as a diameter of the pipe, the type of fluid that flows through the pipe, the one or more fixtures that receive fluid from the pipe 820, and/or the one or more appliances that receive fluid from the pipe 820. Other inputs can be the time of day, the time of year, the number of occupants in the property, or the number of occupants in a room where a particular appliance or fixture is located. The output of the machine learning model can be a value that corresponds to a specific appliance, a specific set of appliances, a specific fixture, a specific set of fixtures, or a combination of particular appliances and fixtures such that the output indicates which appliances are currently running and/or fixtures are currently being used.

For example, the computing device can provide as input to the machine learning model the calculated flow rate of 28.6 meters cubed per hour, a current time (e.g., 2:00 pm), and a day of the week (e.g., Saturday). Based on this input, the machine learning model can generate an output value of 3. The computing device 105 can use a lookup table to determine that an output value of 3 indicates that a gas fireplace in the property that receives gas from the pipe 820 is on and that one burner on the stove is on.

The activity patterns can include activity of occupants in a property that receives material from a medium that the surface meter is fitted to. For example, the computing device 105 can use sensor data collected by one or more surface meters and other sensor data to identify activity patterns for one or more occupants of a property where the one or more surface meters are installed. The other sensor data can be collected by one or more cameras, motion sensors, GPS units of mobile computing devices used by the occupants, NFC units of mobile computing devices used by the occupants, etc. The other sensor data can indicate the number of occupants in the property, the particular occupants in the property, and/or the location of the occupants in the property or their location with respect to one or more appliances or fixtures of the property. Using the other sensor data and the sensor data collected by the one or more surface meters, the computing device 105 can form activity patterns for the occupants of the property based on the time of day, time of year, and/or their location in the property. These activity patterns can indicate what appliances or fixtures the occupants will use, how long the occupants will use the appliance or fixtures, times of day or times of year that the occupants will use the appliances or fixtures, the amount of fluid that the occupants will use during a particular time of day or time of year, or the amount of fluid that the occupants will use in a set period of time.

For example, the activity patterns can indicate that a first occupant (Occupant A) of a property where a surface meter is fitted typically runs the dishwasher once a day for a two hour cycle sometime between 6:00 pm and 10:00 pm. If the surface meter is fitted to a water line pipe (e.g., water supply pipe or drain pipe) that is used by the dishwasher and provides sensor data to the computing device 105 indicating (e.g., based on a flow rate of water in the pipe) that the dishwasher started running at 7:00 pm but has continued to run past 9:00 pm, the computing device 105 can generate an alert indicating that the abnormal activity has been detected t The activity patterns can be represented by a machine learning model for the occupants or individual occupants. For example, the computing device 105 can calculate a flow rate of gas in the pipe 820 based on the vibration data 806s and the audio data 804a. After calculating the flow rate, the computing device 105 can provide the flow rate as input along to a machine learning model trained to recognize what fixtures are being used, what appliances are running, or a combination of one or more fixtures being used and appliance are running based on occupant information. The input for the machine learning model can also include an indication of the number of occupants in the property, the location of the occupants in the property, and/or a time of day. Based on the flow rate, the time of day being 7:00 pm, and a determination that Occupant A being is located in the kitchen, the machine learning model can generate a first output indicating that all four burners of the stove are on. However, based on the same flow rate, the time of day being 7:00 pm, and a determination that Occupant A is in the living room, the machine learning model can generate a second output indicating that the gas fireplace is on and that none of the stove burners are on.

As an example, in response to detecting abnormal activity such as activity that deviates from the activity patterns or deviates more than a threshold amount (e.g., threshold value or threshold percentage) from the activity patterns, the computing device 105 can generate a warning or alert to notify one or more persons of the detected issue. The warning or alert can be presented on an interface of the computing device 105, such as a display of the computing device 105 to notify one or more users of the computing device 105 of the issue. Additionally or alternatively, the computing device 105 can generate a notification for the warning or alert and transmit the notification to one or more remote computing devices, such as mobile computing device of occupants in the building where the surface meter 802 is installed to notify them of the issue which could present a safety issue for the occupants. As another example, the computing device 105 can generate a notification for the warning or alert and transmit the notification to a server system of a service or repair provider to schedule a work order to correct the detected issue.

The one or more machine learning models used to make intelligent determinations for the state of the property or events occurring at the property can be updated over time. For example, the one or more machine learning models can be initially trained using a pre-generated training data set (e.g., generated from sensor data collected at other properties, characteristics of mediums the sensor data was obtained from, and known events such as fluid leaks, operation of fixtures, running of appliances, etc.). The one or more machine learning models can be updated using the collected sensor data and/or feedback from one or more users of the computing device 105 or other computing devices in communication with installed surface meters. For example, if a first machine learning model generates outputs indicating unusual activity of bath fixtures in a home but a user of the computing device 105 provides feedback indicating that the activity was normal, then the first machine learning model can be updated to reflect that use of bath fixtures in this home is typically greater (e.g., greater volume of water is used in the home with a period of time) than what was indicated in the training data set. After the update and for the same level of use of the bath fixtures, the output of the machine learning model can indicate no issues with the activity of the bath fixtures of home.

As another example, the machine learning model can be updated over time using feedback from a user of the computing device 105 or another computing device in communication with the computing device 105 and/or the surface meter 802. In more detail, in response to determining that a gas fireplace is on and that a burner of a stove (e.g., four burner stove) is on, the computing device 105 can generate a notification that it can present on the display of the computing device 105 and/or transmit to one or more other computing devices for display. A user of the computing device 105 can provide feedback confirming that the determinations were correct or feedback indicating that one or more determinations were incorrect. For example, a user of the computing device 105 can interact with an interface element in the notification to indicate that the fireplace is on but that none of the burners of the stove are on. Based on this feedback, the machine learning model can be updated to reflect that the gas fireplace uses more gas than the machine learning model was trained for or than was previously used by the gas fireplace (e.g., heat setting for the fireplace was on average increased by an occupant of the property). Additionally or alternatively, based on this feedback, the computing device 105 may issue a warning of a potential gas leak.

Other feedback can include sensor data collected from sensors other than a surface meter or determinations made using sensor data collected from sensors other than a surface meter. This sensor data can include meter data for the property, such as water meter data that provides a total amount of water used at the property for a given period of time or gas meter data that provides a total amount of gas used at the property for a given period of time. The sensor data can also include data from devices connected to the same network as the surface meter 802. For example, the sensor data can include power data collected from one or more smart plugs connected to the same mesh network as the surface meter 802. In more detail, if an output of a machine learning model for a water line of the house indicates that a washer in the house is running, the computing device 105 can obtain power data from a smart plug connected to the washer. If the smart plug data verifies that the washer is on, no changes may be made to the machine learning model. However, a confidence metric for the machine learning model can be increased. If, however, the smart plug data provides that the washer is not on, the machine learning model can be updated based on the feedback.

In place of or in addition to a machine learning model or algorithm, the computing device 105 can use a lookup table to make intelligent determinations. The lookup table can associate different events or different states of a property with different metrics. These metrics can include, for example, a flow rate of fluid in one or more mediums, the size of the one or more mediums, a level of audio energy measured in the one or more mediums, a level of vibration on the one or more mediums, and/or a temperature of the one or more mediums or the temperature of fluid in the one or more mediums. The lookup table accessed can be one of multiple lookup tables. Which lookup table that the computing device 105 accesses can depend on certain conditions. For example, the computing device 105 may access a first lookup table when a determination is made that the occupants of a home (e.g., where the one or more surface meters are installed in) are away or are asleep and a second lookup table when a determination is made that the occupants are at home and/or are awake. As another example, the computing device 105 may access, based on the current time, a first lookup table that corresponds to certain time of day (e.g., between 12:00 pm and 4:00 pm when a first set of events typically occur or typically do not occur) or a second lookup table that corresponds to a different time of day (e.g., between 4:00 pm and 8:00 pm when a second set of events typically occur or typically do not occur).

The computing device 105 can present an interface 810a at a first time. The interface 810a can be presented based on the sensor data 804a and 806a. For example, the interface 810a can be presented in response to receiving the sensor data 804a and the sensor data 806a (e.g., the most recently obtained sensor data).

As shown, the interface 810a can include a first interface area 812a for the surface meter 802. The first interface area 812a can present information describing the sensor data collected by the surface meter 802 and characteristics about the surface meter 802 and/or the pipe 820 that the surface meter 802 is currently fitted to. The characteristic information can include, for example, the size of the pipe 820, the type of fluid that travels through the pipe 820, a material that the pipe 820 is made from, a thickness of the pipe 820 (e.g., difference between an inner diameter and outer diameter of the pipe 820), an ID for an appliance or indication of a type of appliance that receives fluid from the pipe 820, and/or an ID for a fixture or an indication of a type of fixture that receives fluid from the pipe 820.

The sensor information presented in the interface area 812a can include the most recently acquired sensor data or summary of the most recently acquired sensor data, and/or sensor data acquired by the surface meter 802 over a set period of time or a representation of that sensor data (e.g., a first graph for the audio energy measurements collected over the past hour and a second graph for the vibration measurements collected over the past hour). For example, the interface area 812a can present the most recently measured audio energy levels (e.g., 4/10) from the audio data 804a and the most recently measured vibration levels (e.g., 3.4/10) from the vibration data 806a.

The interface 810a can include a second interface area 814a for analyses made based on sensor data obtained from one or more surface meters. For example, the second interface area 814a can present information indicating determinations made using sensor data collected from all surface meters fitted to gas pipes in the property. In more detail, the interface area 814a can present a flow rate of gas in the pipe 820 determined using the vibration data 806a and the audio data 804a. The interface area 814a can also provide an indication of whether any issues have been detected. As an example, because the detected flow rate is below a threshold flow rate (e.g., calculated to be equal to the maximum flow rate that can be expected such as when all gas-using appliances or fixtures are currently being used), then no issues for the pipe 820 were detected.

At a second time, the computing device 105 can present an interface 810b. The interface 810b can be presented in response to receiving new sensor data, such as the new audio data 804b and the vibration data 806b. The first interface area 812b has also been updated to reflect the new sensor data 804b and 806b. The second interface area 814b now indicates that the current flow rate in the pipe 820 is 53.2 meters cubed per hour. Because this flow rate is above the threshold flow rate of 35 meters cubed per hour, the computing device 105 can determine that there is an issue and present an indication of the issue. For example, the computing device 105 can determine from the flow rate that there is a gas leak in the property where the surface meter 802 is fitted or that there is greater than a threshold probability that there is a gas leak. In response to this determination, the computing device 105 can display in the second interface area 814b an alert indicating that there is a gas leak or a potential gas leak. The computing device 105 can also generate and transmit notification to one or more other computing devices that are communication with surface meter 802, belong to the same mesh network as the surface meter 802, or belong to known occupants of the property.

The characteristics of the pipe 820 can be inputted through the computing device 105 or through another computing device. For example, when an occupant of a property fits the surface meter 802 to the pipe 820, the occupant can go through a setup process for the surface meter 802 on the computing device 105. This setup process can request information that is used to later generate the first interface areas 812a-812b. For example, the computing device 105 can present an interface allowing the occupant to select a type of fluid in the pipe that the meter 802 is being fitted to (e.g., water, gas, etc.), a size of the pipe, a material for the pipe, a thickness of the pipe, an indication of appliances or fixtures that receive fluid from the pipe, etc. The selection can be made by manual entry in different fields corresponding to the different characteristics and/or through one or more drop down menus corresponding to the different characteristics.

In some implementations, the computing device 105 may determine that one or more characteristics of a medium that the surface meter 820 is fitted to are incorrect and, in response, generate a notification for a user or update the characteristics. For example, if a user initially provided that the diameter of the pipe 820 was 1" but an output of a flex sensor in the surface meter 820 indicates that diameter is actually 2", the computing device 105 can update the characteristics of the pipe 820 to reflect the detected diameter of 2" and generate a notification for a user of the computing device 105 to notify them that the characteristics for the Meter 1 natural gas pipe have been updated.

The techniques described above with respect to the surface meter 802 are applicable to the surface meter 902 described below with respect to FIG. 9, and the surface meters 1002 and 1004 described below with respect to FIG. 10.

Figure 9:
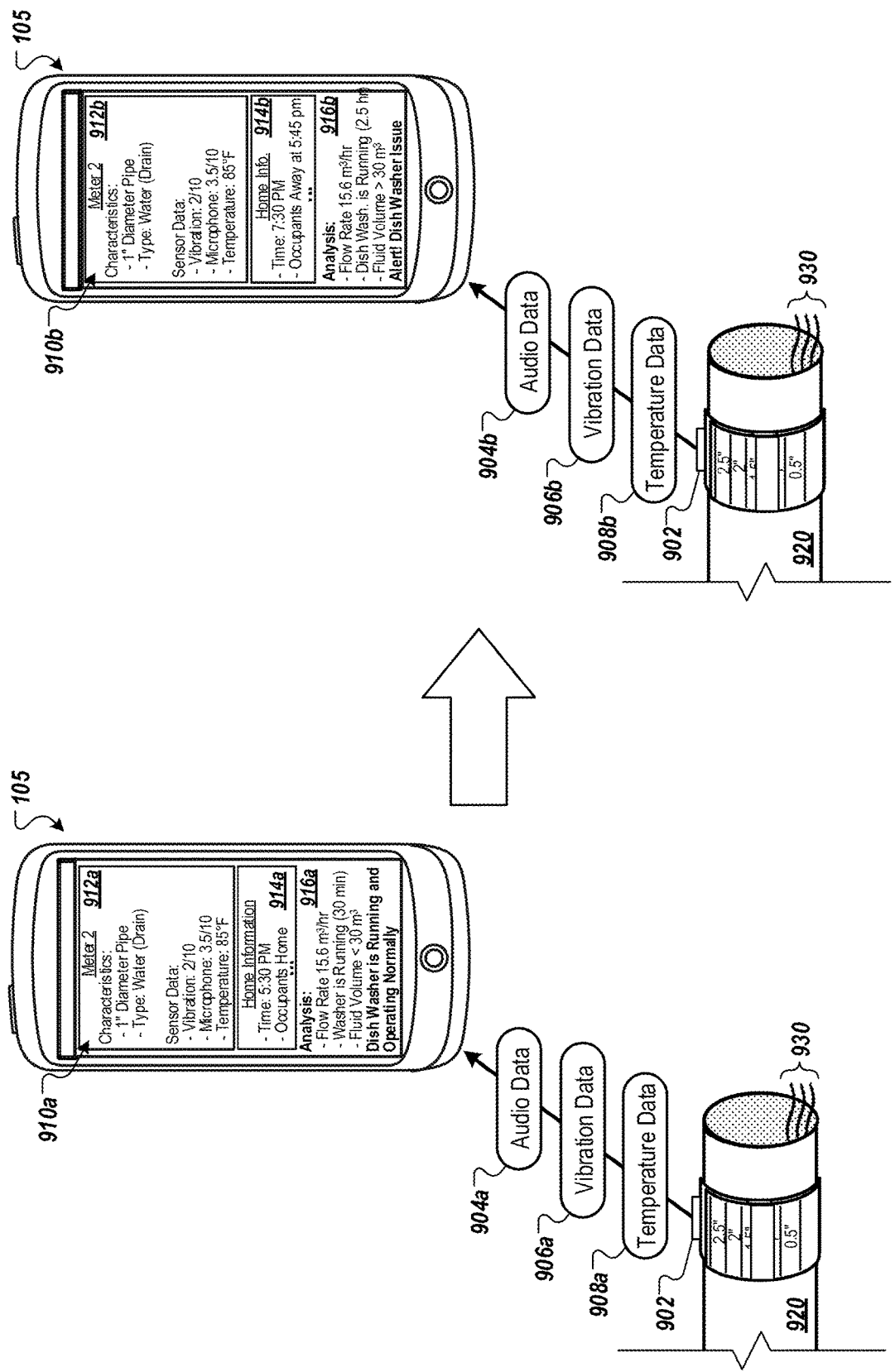
FIG. 9 illustrates an example system for analyzing sensor data from a surface meter.

FIG. 9 illustrates an example system for analyzing sensor data from a surface meter 902. The system can include the computing device 105 and one or more wireless networks that allow the computing device 105 to communicate with the surface meter 902.

In some implementations, the surface meter 802 is the surface meter 702d shown in FIG. 7D and described above.

The surface meter 902 ("Meter 1") is fitted to a medium and collects sensor data from the medium. For example, the surface meter 902 is fitted to a drain pipe 920 that has a level of fluid 930 (e.g., a level of material that is substantially water but can include other fluids or materials) flowing through the pipe 920.

The computing device 105 can receive the sensor data from the surface meter 902 over one or more wireless networks. For example, at a first time, the computing device 105 can receive audio data 904a, vibration data 806a, and temperature data 908a from the surface meter 902 over a cloud computing server. The audio data 904a may have been generated by the surface meter 902 using a microphone of the surface meter 902. The vibration data 906a may have been generated by the surface meter 902 using a vibration sensor of the surface meter 902. Additionally, the temperature data 908a may have been generated by a temperature sensor of the surface meter 902. Continuing the previous example, the cloud computing server may have received the audio data 904a, the vibration data 806a, and temperature data 908a from a smart hub of a mesh network that the surface meter 902 ("Meter 2") belongs to (e.g., is a node of).

The computing device 105 can present an interface 910a at the first time. The interface 910a can be presented on a display of the computing device 105 based on the sensor data 904a, 906a, and 908a. For example, the interface 910a can be presented by the computing device 105 in response to receiving the sensor data 904a, 906a, and 908a (e.g., the most recently obtained sensor data from the surface meter 902).

As shown, the interface 910a can include a first interface area 912a for the surface meter 902. The first interface area 912a can present information describing the sensor data collected by the surface meter 902 and characteristics about the surface meter 902 and/or the pipe 920 that the surface meter 902 is currently fitted to. The characteristic information can include, for example, the size of the pipe 920, the type of fluid that travels through the pipe 920, a material that the pipe 920 is made from, a thickness of the pipe 920 (e.g., difference between an inner diameter and outer diameter of the pipe 920), an ID for an appliance or indication of a type of appliance that receives fluid from the pipe 920 or outputs fluid to the pipe 920, and/or an ID for a fixture or an indication of a type of fixture that receives fluid from the pipe 920 or outputs fluid to the pipe 920.

The sensor information presented in the interface area 912a can include the most recently acquired sensor data or summary of the most recently acquired sensor data, and/or sensor data acquired by the surface meter 902 over a set period of time. The interface area 912a can include a representation such as a graphical representation of at least a portion sensor data (e.g., a line graph that includes a first line depicting the audio energy measurements collected over the past hour, a second line depicting the vibration measurements collected over the past hour, and a third line depicting the temperature measurements collected over the past hour). For example, the interface area 912a can present the most recently measured audio energy levels (e.g., 3.5/10) from the audio data 904a, the most recently measured vibration levels (e.g., 3.4/10) from the vibration data 806a.

The computing device 105 can process sensor data received from the surface meter 902 after receiving the sensor data. For example, the computing device 105 can normalize the audio energy measurements in the audio data 904a to scale the measurements to a range of values between 0 and 10 and, thereby, generate the audio energy level of 3.5/10 shown in the interface area 912a. The computing device 105 can also normalize other sensor data received from the surface meter 902. For example, the computing device 105 can normalize the vibration measurements in the vibration data 906a to scale the measurements to a range of values between 0 and 10 and, thereby, generate the vibration level of 3.5/10 shown in the interface area 912a.

In some implementations, the computing device 105 does not process all of the sensor data received. For example, as depicted in the first interface area 912a, the computing device 105 can present the raw temperature data 908a (e.g., 85° F.).

In some implementations, the surface meter 902 processes the sensor data before transmitting the processed sensor data to the computing device 105. For example, the audio data 904a can include normalized audio energy levels and the vibration data 906a can include normalized vibration levels.

The interface 910a can include a second interface area 914a that presents information obtained from sensors or devices other than a surface meter. The second interface area 914a can be an area the presents information about a state of a property or a state of a security system for the property. For example, the second interface area 914a can indicate a current time at location of the property, an indication whether all or a subset of the occupants of the property are located in the property, an indication of the locations of the occupants within the property, an indication of a security system state for the property (e.g., armed, unarmed, armed away, armed stay, etc.), an indication of appliances that are drawing sufficient power to be on (e.g., determined from one or more smart plugs), etc.

The computing device 105 can propagate the interface area 914a using sensor data obtained from one or more security sensors, such as one or more cameras, motion detectors, magnetic sensors fitted to doors and windows, etc.

The computing device 105 can also propagate the interface area 914a using information obtained from other sensors or devices, such as smart plugs installed on the property that indicate an amount of power being drawn (e.g., by particular appliances or systems of the property) As will be discussed below, the computing device 105 can use the property information presented in the second interface area 914a with the sensor data collected by the surface meter 902 to determine a state of the property and/or identify issues at the property.

The interface 910a can include a third interface area 916a for analyses based on sensor data obtained from one or more surface meters. For example, the third interface area 916a can present information indicating determinations made using sensor data collected from the surface meter 902. In more detail, the interface area 916a can present a flow rate of liquid in the pipe 920 determined by the computing device 105 using the audio data 904a and the vibration data 906a. Based on the flow rate, an amount of time the flow rate has been sustained or stayed above a threshold flow rate, or a determination that the flow rate is following a known flow rate pattern (e.g., for a washing machine, a dishwasher, etc.), the computing device 105 can determine that an appliance that receives fluid from the pipe 920 or provides fluid to the pipe 920a is running and a runtime for the appliance.

As an example, based on the sensor data 904a and 906a indicating a flow rate in the pipe 920 of 15.6 meters cubed per hour at a time of 5:30 pm and prior sensor data indicating that the flow rate in the pipe 920 has stayed above 15 meters cubed per hour since 5:00 pm, the computing device 105 can determine that a dish washing cycle was started at 5:00 pm and that the washing machine is currently running. The computing device 105 can also use the temperature of the fluid in the pipe 920 from the temperature data 908a to identify the type of cycle that the dishwasher is performing or to verify that the dishwasher is operating normally.

After making determinations for a particular appliance or fixture, the computing device 105 can compare the determination results to metrics that indicate normal or abnormal operation for the appliances or fixtures. For example, the metrics may specify an expected runtime for an appliance, a range of acceptable runtimes for the appliance (e.g., where different run times may fall into different ranges that correspond to different types of appliances operating modes or cycles), an expected volume of fluid to be provided to an appliance or to be output from an appliance (e.g., 30 meters cubed), a range of acceptable volumes of fluid to be provided to an appliance or to be output from an appliance, an expected flow rate of intake fluid for an appliance or an acceptable range of flow rates of intake fluid for the appliance, an expected flow rate of fluid output by an appliance or an acceptable range of flow rates output by the appliance, etc.

In more detail, the metrics for normal operation of a dishwasher in a property where the surface meter is located can provide that the total volume of liquid output by the dishwasher should be less than 30 meters cubed during a dish washing cycle. Based on the determined flow rate(s) and/or the runtime for the dishwasher, the computing device 105 can determine that the total volume of fluid output by the dishwasher since the current cycle was started is 7.8 meters cubed and, therefore, is less than 30 meters cubed. Accordingly, the computing device 105 can conclude that the dish washer is running and is operating normally.

In some implementations, the dishwasher provides one or more determination results as input to a machine learning model that generates an output indicating a normal operation of an appliance, a particular operation of the appliance, or abnormal operation of the appliance. For example, the computing device 105 can provide as input to the machine learning model a set of flow rates calculated by the computing device 105 since sensor data indicated a dishwasher cycle was started (e.g., the flow rate reached 15 meters cubed per hour) and a set of temperatures that correspond to the set of flow rates. The output of the machine learning model can indicate normal operation of the dishwasher.

At a second time, the computing device 105 can present an interface 910b. The interface 910b can be presented in response to receiving new sensor data, such as the new audio data 904b, vibration data 906b, and temperature data 908b. The first interface area 912b has also been updated to reflect the new sensor data 904b, 906b, and 908b. The second interface area 914b similarly has been updated and now reflects the current time as 7:30 pm and that the occupants of the property have been away from the property since 5:45 pm.

Using the techniques described above, the computing device 105 can use the updated sensor data depicted in the first interface area 912b and the updated property data depicted in the second interface area 914b to determine a state of the property and/or detect any issues at the property and update the third interface area 916b accordingly. For example, the computing device 105 can use the new audio data 904b and the new vibration data 906b to determine that the flow rate of fluid in the pipe 920 remains 15.6 meters cubed per hour. The computing device 105 can also determine that dish washer has continued to run since 5:00 pm so that the runtime is now 2.5 hours. Based on this runtime and/or the calculated flow rate(s), the computing device 105 can estimate the total volume of fluid to have traveled through the pipe 920 during the dishwasher cycle is 34.2 meters cubed. As a result of comparing this volume to a volume threshold of 30 meters cubed from the normal operating metrics for the dishwasher, the computing device 105 can detect an issue with the dishwasher. The computing device 105 can generate an alert ("Alert! Dish Washer Issue") that is displayed in the third interface area 916b. The computing device 105 can also generate a notification indicating the detected issue with the dishwasher and wirelessly transmit the notification for display on one or more mobile computing devices of the occupants currently away from the property.

The techniques described above with respect to the surface meter 902 are applicable to the surface meters 802 described above with respect to FIG. 8, and the surface meters 1002 and 1004 described below with respect to FIG. 10.

Figure 10:
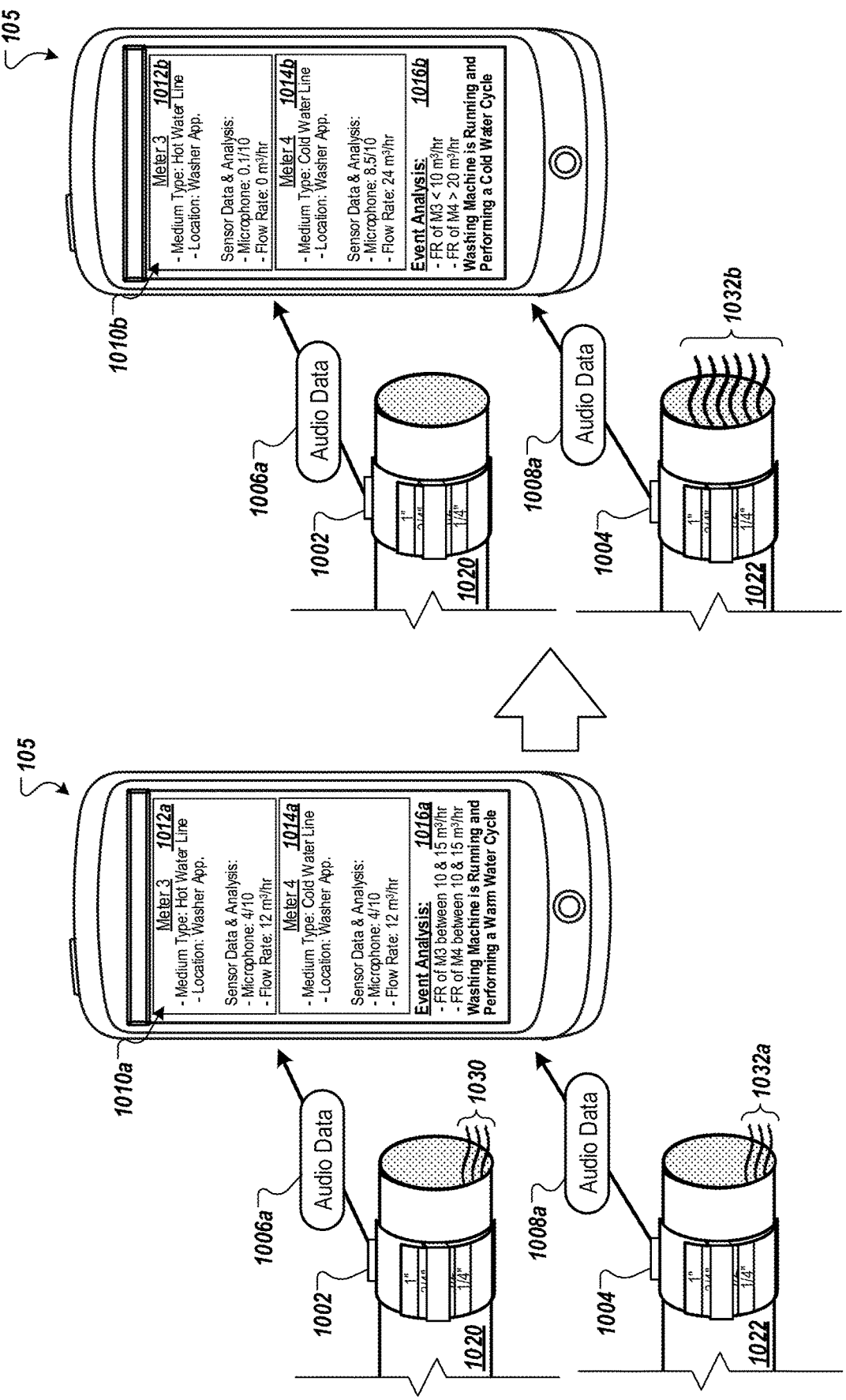
FIG. 10 illustrates an example system for analyzing sensor data from multiple surface meters.

FIG. 10 illustrates an example system for analyzing sensor data from multiple surface meters 1002 and 1004. The system can include the computing device 105 and one or more wireless networks that allow the computing device 105 to communicate with the surface meters 1002 and 1004.

In some implementations, the surface meter 802 is the surface meter 702a shown in FIG. 7A and described above.

The surface meter 1002 ("Meter 3") is fitted to a medium and collects sensor data from the medium. For example, the surface meter 1002 is fitted to a hot water supply line pipe 1020 that has a level of fluid 1030 (e.g., a level of hot water) flowing through the pipe 1020.

The surface meter 1004 ("Meter 4") is fitted to a second medium and collects sensor data from the second medium. For example, the surface meter 1004 is fitted to a cold water supply line pipe 1022 that has a first level of fluid 1032 (e.g., a level of cold water) flowing through the pipe 1022.

The computing device 105 can receive the sensor data from the surface meters 1002 and 1004 over one or more wireless networks. For example, at a first time, the computing device 105 can receive audio data 1006a from the surface meter 1002 and audio data 1008a from the surface meter 1004 over a cloud computing server. The audio data 1006a may have been generated by the surface meter 1002 using a microphone of the surface meter 1002, and the audio data 1008a may have been generated by the surface meter 1004 using a microphone of the surface meter 1004. The cloud computing server may have received the audio data 1006a and 1008a from a smart hub of a mesh network that the surface meters 1002 and 1004 belong to (e.g., are nodes of).

The computing device 105 can present an interface 1010a at the first time. The interface 1010a can be presented on a display of the computing device 105 based on the sensor data 1006a and 1008a. For example, the interface 1010a can be presented by the computing device 105 in response to receiving the sensor data 1006a and 1008a (e.g., the most recently obtained sensor data from the surface meters 1002 and 1004).

As shown, the interface 910a can include a first interface area 1012a for the surface meter 1002. The first interface area 1012a can present information describing the sensor data collected by the surface meter 1002 and characteristics about the surface meter 1002 and/or the pipe 1020 that the surface meter 1002 is currently fitted to. The characteristic information can include, for example, the size of the pipe 1020, the type of fluid that travels through the pipe 1020, a material that the pipe 1020 is made from, a thickness of the pipe 1020 (e.g., difference between an inner diameter and outer diameter of the pipe 1020), an ID for an appliance or indication of a type of appliance that receives fluid from the pipe 1020 or outputs fluid to the pipe 1020, and/or an ID for a fixture or an indication of a type of fixture that receives fluid from the pipe 1020 or outputs fluid to the pipe 1020. As an example, the first interface area 1012a indicates that the surface meter 1002 is fitted to a hot water supply line for a washing machine appliance.

The first interface area 1012a can also present determinations or calculations made by the computing device for the surface meter 1002 and/or the pipe 1020. For example, based on the audio data 1006a suggesting a normalized audio energy level of 4/10 and a known size of the pipe 1020, the computing device 105 can calculate a flow rate of 12 meters cubed per hour for hot water flowing through the pipe 1020.

The interface 910a can include a second interface area 1014a for the surface meter 1004. The second interface area 1014a can present information describing the sensor data collected by the surface meter 1004 and characteristics about the surface meter 1004 and/or the pipe 1022 that the surface meter 1004 is currently fitted to. The characteristic information can include, for example, the size of the pipe 1022, the type of fluid that travels through the pipe 1022, a material that the pipe 1022 is made from, a thickness of the pipe 1022 (e.g., difference between an inner diameter and outer diameter of the pipe 1022), an ID for an appliance or indication of a type of appliance that receives fluid from the pipe 1022 or outputs fluid to the pipe 1022, and/or an ID for a fixture or an indication of a type of fixture that receives fluid from the pipe 1022 or outputs fluid to the pipe 1022. As an example, the second interface area 1014a indicates that the surface meter 1004 is fitted to a cold water supply line for the washing machine appliance.

The second interface area 1014a can also present determinations or calculations made by the computing device for the surface meter 1004 and/or the pipe 1022. For example, based on the audio data 1008a suggesting a normalized audio energy level of 4/10 and a known size of the pipe 1022, the computing device 105 can calculate a flow rate of 12 meters cubed per hour for cold water flowing through the pipe 1022.

The interface 1010a can include a third interface area 1016a for analyses made based on sensor data obtained from one or more surface meters. For example, the third interface area 1016a can present information indicating determinations made using sensor data collected from the surface meters 1002 and 1004 or using metrics previously calculated using the sensor data, such as a flow rate of hot water in the pipe 1020 and a flow rate of cold water in the pipe 1022. The computing device 105 can compare the sensor data, processed sensor data, and/or metrics calculated using the sensor data to metrics indicating normal operation of an appliance or fixture, a particular operation of an appliance or fixture, a combined operation of one or more appliances and/or fixtures, and/or or abnormal operation of an appliance or fixtures. For example, a set of metrics can indicate that a washing machine is running and performing a warm water cycle. The set of metrics can include a first metric for the hot water supply line 1020 that indicates a flow rate range of between 10 and 15 meters cubed per hour, and a second metric for the cold water supply line 1022 that indicates a flow rate range of between 10 and 15 meters cubed per hour. The computing device 105 can compare the calculated flow rates for the pipe 1020 and 1022 to the metrics in the set of metrics to determine that the washing machine for a property is running and is performing a warm water cycle.

These metrics can be part of a lookup table. For example, the computing device 105 can identify an entry in a lookup table based on the normalized audio energy level of 4/10 from the audio data 1006a and the normalized audio energy level of 4/10 from the audio data 1008a. The entry can indicate that, based on these detected audio energy levels, a washing machine is running and is performing a warm water cycle. Alternatively, the computing device can input the audio energy levels and/or the calculated flow rates as input to a machine learning model. The output of the machine learning model can be a value that the computing device 105 can interpret to indicate that the washing machine is running and is performing a warm water cycle.

At a second time, the computing device 105 can present an interface 1010b. The interface 1010b can be presented in response to receiving new sensor data, such as the new audio data 1006b and 1008b from the surface meters 1002 and 1004 respectively. The first interface area 1012b has also been updated to reflect the new sensor data 1006b, and the second interface area 1008b has been updated to reflect the new sensor data 1008b. As shown, the audio data 1006a indicates the current flow rate of hot water in the pipe 1020 is 0 meters cubed per hour. The audio data 1008a indicates the current flow rate of cold water in the pipe 1022 is 24 meters cubed per hour.

Using the techniques described above, the computing device 105 can use the updated sensor data depicted in the first interface area 1012b and the second interface area 1014b to determine a state of the property and/or detect any issues at the property and update the third interface area 1016b accordingly. For example, the computing device 105 can use the new audio data 1006a and 1008a, the calculated flow rate of 0 meters cubed per hour for the pipe 1020, and/or the calculated flow rate of 24 meters cubed per hour for the pipe 1022 to determine the washing machine is still running but is now performing a cold water cycle.

In more detail, the computing device can use the sensor data or metrics generated using the sensor data to identify one or more metrics that indicate a current state of the property or issue occurring at the property. For example, using the flow rate of 0 meters cubed per hour for the pipe 1020 and the flow rate of 24 meters cubed per hour for the pipe 1022, the computing device 105 can identify a set of metrics that indicate that the washing machine is running and is performing a cold water cycle. This set of metrics can include a first metric for the pipe 1020 that specifies the flow rate of hot water is less than 10 meters cubed per hour, and a second metric for the pipe 1022 that specifies the flow rate is greater than 20 meters cubed per hour.

The techniques described above with respect to the surface meters 1002 and 1004 are applicable to the surface meter 802 described above with respect to FIG. 8 and the surface meter 902 described above with respect to FIG. 9.

A computing device that receives sensor data from one or more flexible sensing devices can use tiny artificial intelligence (tiny AI) techniques to identify one or more events at a property or a state of the property. For example, the computing device 105 can use tiny AI techniques to analyze sensor data received from the surface meter 802 shown in FIG. 8, the surface meter 902 shown in FIG. 9, and/or the surface meters 1002 and 1004 shown in FIG. 10 and other data received from one or more other devices, such as devices that are connected to the same local network as the surface meters. In response to receiving the sensor data and the other data, the computing device 105 can use tiny AI techniques to generate outputs that indicate one or more events at a property or a state of the property. These tiny AI techniques can, for example, be used by the computing device 105 to associate different events or states of property with different data sets that include sensor data, metrics calculated from the sensor data such as flow rate, and/or data indicating different scenarios at a property.

For example, the events of a property can include an event for a particular appliance running, an event or group of events for a combination of particular appliances running, an event for a particular fixture being used, and/or an event or group of events for a combination of particular fixtures being used. The state of the property can include a state of a leak such as water leak generally, a gas leak generally, a water leak in a particular pipe, and/or a gas leak in a particular pipe.

Using machine learning techniques, such as tiny AI, the computing device 105 can associate these different events at a property and states of the property with different sensor data values or value ranges obtained from one or more surface meters, different values or values ranges of metrics calculated from the sensor data such as flow rate and total volume of fluid that has moved through the pipe in a period of time, and other values indicating different scenarios at the property. These other values can, for example, include a value for the current time, a value for the number of occupants currently in the property, a value that indicates whether a particular occupant is in the property, a value that indicates a location of an occupant in the property, a value that indicates a location of a particular occupant in the property, a value that indicates the date, a value that indicates the outside temperature, a value that indicates the inside temperature, etc. The computing device 105 can use a machine learning model that includes parameters for these different data/value types and assigns a weight to each of these parameters. During training of the machine learning model, the weights applied to these parameters can be adjusted (e.g., using back propagation) to improve the accuracy of event and/or state identification by the machine learning model given a set of input values that include values for sensor data obtained from one or more surface meters and/or values for metrics calculated from the sensor data.

In some implementations, the described system uses multiple machine learning models or multiple parameter weight sets for different scenarios to identify the events at the property and/or the state of the property. For example, the computing device 105 can use a first set of parameter weights when data indicates that all of the occupants of the property are currently away, a second set of parameter weights when data indicates that there is one occupant currently in the property and the occupant is Occupant A, a third set of parameter weights when the data indicates that there is one occupant currently in the property and the occupant is Occupant B, a fourth set of parameters weights when the data indicates that there are two more occupants currently in the property and the current time is between 8:01 am and 5:00 pm, a fifth set of parameters weights when the data indicates that there are two more occupants currently in the property and the current time is between 5:01 pm and 9:00 pm, and a sixth set of parameters weights when the data indicates that there are two more occupants currently in the property and the current time is between 9:01 pm and 8:00 am. Given these different parameter weights, the machine learning model can produce different outputs for the same inputs depending on the scenario that the computing device 105 determines.

In some implementations, tiny AI techniques are employed on one or more flexible sensing devices. For example, each of the surface meters fitted to pipes for a property can their respective microprocessor 706 to process sensor data collected by one or more sensors of the surface meters. The tiny AI techniques can be used to, for example, normalize the sensor data and/or generate metrics such as flow rate of material and/or volume of material based on the sensor data. The tiny AI techniques can also be used on the surface meters for more intelligent determinations, such as particular appliances running or fixtures being used. In some implementations, the surface meters receive data, such as sensor data or metrics generated from sensor data, from other surface meters and use a tiny AI model to make determinations based on collected sensor data and the received data. For example, a first surface meter that is fitted to a hot water line connected to a washer and that includes a microphone can be configured to receive over a mesh network temperature data from a second surface meter that is fitted to a drain pipe of the washer. The first surface meter can provide its own collected audio data and the received temperature data as input to a tiny AI model and receive an output from the tiny AI model indicating that the washer is currently running and performing a warm water cycle.

By leveraging tiny AI techniques, the described system can realize a number of benefits. For example, significantly less energy is required of a computing device to identify events occurring at a property or a state of the property when the computing device uses tiny AI techniques over other machine learning techniques. Additionally, less processing resources such as processing power is required of the computing device to identify events occurring at a property or a state of the property when the computing device uses tiny AI techniques over other machine learning techniques. In turn, processing resources of the computing device are freed to perform other tasks and/or to process additional data to produce more accurate event and state results of the property. An added benefit of using tiny AI techniques is that the size and processing capabilities required of the computing device that identifies events or a state of a property is reduced and, therefore, a greater number of devices or types of devices are suitable to the task of processing sensor data received surface meters, processing data from one or more other computing devices, and identifying events or a state of property based on the sensor data and the other data. Accordingly, devices such as mobile phones or the described surface meters can be used to efficiently process through a machine learning model relatively large quantities of data given the processing capabilities of the devices.

FIG. 11 illustrates an example chart 1100 that associates different events to sensor measurements obtained from one or more surface meters installed for a property.

The chart 1100 can be a lookup table used by a computing system to determine events based on sensor data obtained from one or more surface meters.

As an example, the chart 1100 can include a set of metrics that correspond to normal operation for one or more appliance and/or fixtures, particular operating mode(s) for one or more appliances or fixtures, or abnormal operation for one or more appliances or fixtures. The computing device 105 described above, can, for example, use the chart 1100 to determine if an appliance is running or a fixture is being used, or to determine if a combination of one or more appliances and/or fixtures are being used.

The chart 1100 can also indicate events other than appliances running or fixtures being used. For example, the chart 1100 can include metrics that indicate water leaks or gas leaks. In more detail, when a Surface Meter C fitted to a cold water supply line provides sensor data indicating a normalized vibration level of 4.5, a normalized audio energy level of 3.0, and a fluid temperature of 80° F., the computing device 105 can identify entry 1102 from the chart 1100 and determine that there is cold water leak.

The chart 1100 can depict inputs provided to one or more machine learning models and results determined from outputs of the one or more machine learning models based on the inputs. For example, computing device can provide a normalized vibration level of 4.5, a normalized audio energy level of 3.0, and a fluid temperature of 80 as input to a machine learning model. The output of the machine learning model can be a value that the computing device 105 can interpret to indicate a cold water leak.

In some implementations, the described system uses multiple machine learning models for different scenarios. For example, the described system can use a first machine learning model where the chart 1100 depicts inputs provided to the first machine learning model and corresponding outputs of the first machine learning model when a first scenario is detected, a second machine learning model when a second scenario is detected, and a third machine learning model when a third scenario is detected. In more detail, the first scenario can be when the computing device 105 receives data indicating that there are currently two or more occupants at a property and the current time is between 9:00 am and 9:00 pm, such as location data (e.g., GPS data from occupant mobile devices, cell tower data or cell tower triangulation data from occupant mobile devices, or data indicating that the occupant devices connected to a local network of the property). The second scenario can be when the computing device 105 receives data indicating that there is currently no occupants at the property. The third scenario can be when the computing device 105 receives data indicating that there are currently three occupants at a property and the current time is between 9:00 pm and 9:00 am.

Continuing the previous example, the different machine learning models for the different scenarios can generate different outputs given the same input. For example, with respect to FIG. 10, if the computing device 105 receives the audio data 1006a and other data indicating the first scenario, then the computing device 105 can provide the audio data 1006a as input to the first machine learning model and receive an output indicating that there are no alerts for the property and/or that the washing machine is running. That is, the training data for the first machine learning model can indicate, for example, a flow rate of water in the pipe 1020 of 12 meters cubed per hour is normal between the hours of 9:00 am and 9:00 pm when at least two occupants are at the property and/or that it is typical behavior for occupants of the property to run the washer between the hours of 9:00 am and 9:00 pm when at least two occupants are at the property. However, if the computing device 105 receives the audio data 1006a and other data indicating the second scenario, then the computing device 105 can provide the audio data 1006a to the second machine learning model.

The output of the second machine learning model can differ from the output of the first machine learning model and indicate, for example, that there is more than a first threshold probability of a water leak in the pipe 1020 and that a water leak alert should be generated. The training data for the second machine learning model can indicate, for example, that a flow rate of water in the pipe 1020 of 12 meters cubed per hour is abnormal when there are no occupants in the property and/or the most likely cause of the flow rate is a water leak.

Continuing the example, if the computing device 105 receives the audio data 1006a and other data indicating the third scenario, then the computing device 105 can provide the audio data 1006a to the third machine learning model. The output of the third machine learning model can differ from the output of the first machine learning model and/or second machine learning model and indicate, for example, that there is more than a second threshold probability (that is less than the first threshold probability) of a water leak in the pipe 1020 and that a water leak warning should be generated. The training data for the third machine learning model can indicate, for example, that a flow rate of water in the pipe 1020 of 12 meters cubed per hour is not typical when the current time is between hours of 9:00 pm and 9:00 am when at least two occupants are at the property and/or that it is not typical behavior for occupants of the property to run the washer between the hours of 9:00 pm and 9:00 am when there are two or more occupants at the property. The training data can also indicate, for example, the a sufficient likely cause of the flow rate is a water leak.

An issued warning may be less invasive or have a lower priority than an issued alert. For example, for a water leak warning, the computing device 105 may send out requests to occupant devices of the occupants at the property asking the occupants to confirm whether or not they recently started a washing machine cycle. In contrast, for a water leak alert, the computing device 105 may turn on an audible alarm at the property and/or issue high priority notifications to devices of the occupants that may be at or away from the property.

The one or more machine learning model that receives the inputs shown in the chart 1100 and that produce the outputs in the chart 1100 can be one or more tiny AI models. Continuing the previous example, the first ML model, the second ML model, and/or the third ML model can be a tiny AI model.

In some implementations, the described system uses multiple lookup tables for different scenarios. For example, the computing device 105 can refer to the chart 1100 as a lookup table for the first scenario described above, to a second lookup table for the second scenario described above, and to a third lookup table for the third scenario described above.

In some implementations, the described systems uses a combination of lookup tables and machine learning models. For example, the computing device 105 can refer to the chart 1100 as a lookup table for the first scenario, can refer to a second lookup table for the second scenario, and can use a machine learning model for third scenario.

Figure 12:
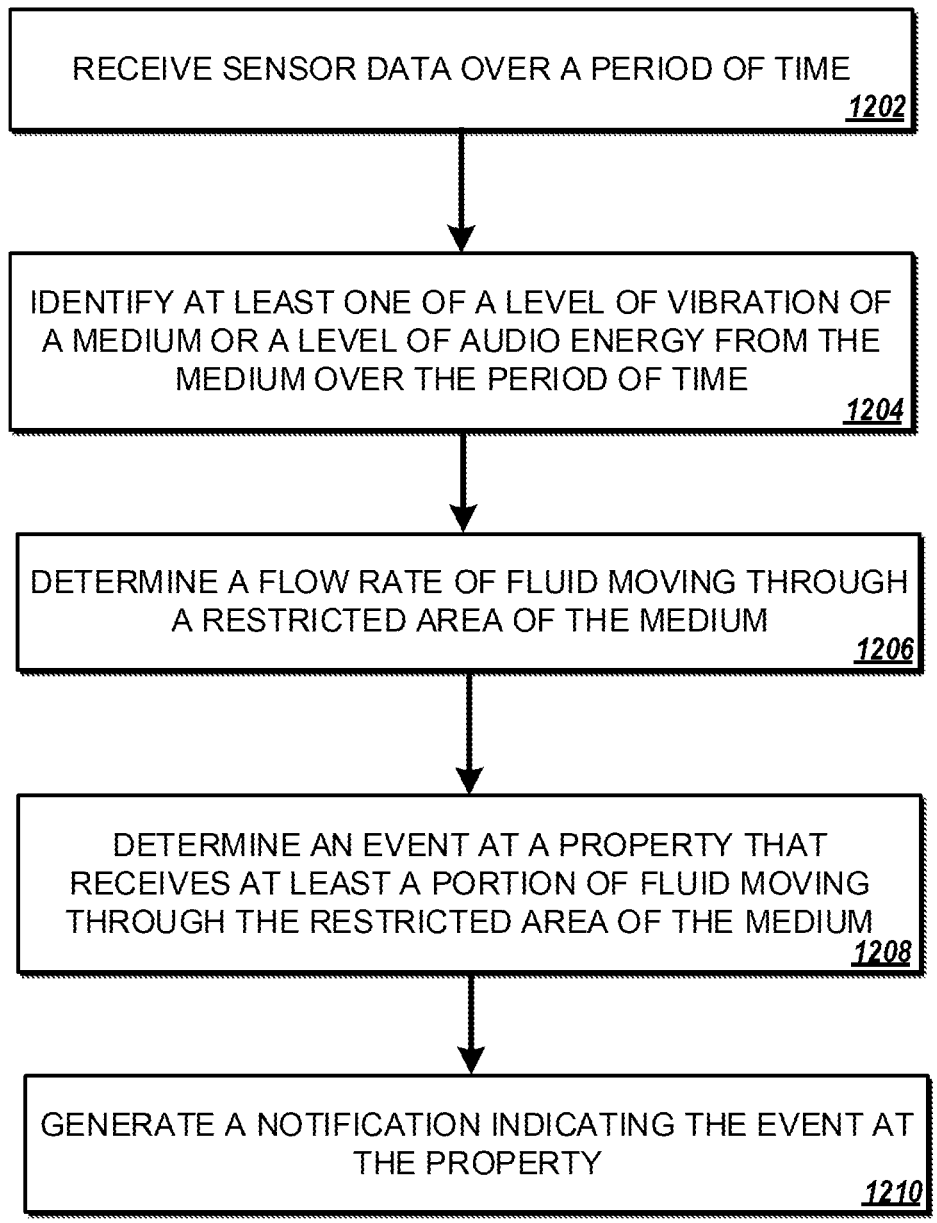
FIG. 12 illustrates an example process for using a surface meter.

FIG. 12 illustrates an example process for using a surface meter to determine a state of a property or to detect issues at the property. The example process 1200 can be performed, at least in part, using the computing device 105 described above.

The process 1200 includes receiving sensor data over a period of time (1202). The sensor data can be received from a flexible sensing device fitted to a medium that includes the restricted area through which fluid can move. For example, the computing device 105 can receive audio data and/or vibration data generated by the surface meter 802 over a mesh network that the surface meter 802 is connected to. The audio data and/or vibration data can include audio energy measurements and vibration measurements produced by sensors of the surface meter 802 over a period of time (e.g., the last five seconds, the last minute, the last five minutes, etc.).

In some implementations, the process 1200 alternatively includes receiving sensor data at a point in time. For example, the computing device 105 can receive audio data and/or vibration data generated by the surface meter 802 over a mesh network that the surface meter 802 is connected to. The audio data and/or vibration data can include only the most recent audio energy measurement and vibration measurements produced by sensors of the surface meter 802.

The process 1200 includes identifying at least one of a level of vibration of the medium or a level of audio energy detected from the medium in the period of time (1204). For example, the computing device 105 can use the sensor data 804*a* and 806*a* received from the surface meter 802 to identify vibration levels of 3.4/10 and audio energy levels of 4/10 for the gas pipe 820.

The process 1200 includes determining a flow rate of fluid moving through a restricted area of the medium (1206). For example, the computing device 105 can use a lookup table, a static algorithm, or a machine learning algorithm to convert the level of vibration and/or the level of audio energy to a flow rate of fluid in a pipe that the sensing device (e.g., surface meter) is fitted to. In more detail, the computing device 105 can calculate the flow rate of gas in the pipe 820 to be 28.6 meters cubed per hour using the vibration level of 3.4/10, the audio energy level of 4/10, and a known size of the pipe 820 (e.g., 2" diameter).

In some implementations, the process 1200 alternatively does not determine a flow rate of fluid moving through the medium. For example, the computing device 105 can provide the level of vibrations and the level of audio energy as input to a machine learning model that generates an output in response. The output can indicate an event at the property, such as an appliance running, a fixture being used, a combination of appliances and/or fixtures being used, a fluid leak, etc.

The process 1200 includes determining an event at a property that receives at least a portion of fluid moving through the restricted area of the medium. The event can be determined by using the sensor data, the level of vibrations identified from the sensor data, the level of audio energy identified from the sensor data, and/or the determined flow rate of fluid moving through the medium. For example, the computing device 105 can obtain a lookup table that associates different flow rates with different events. The lookup table can be specific to a particular sensing device, a particular medium, and/or a particular type of medium. For example, the computing device 105 can, in response to receiving the audio data 804*b* and the vibration data 806*b* from the surface meter 802, obtain a lookup table for the surface meter 802. Based on the calculated flow rate of gas traveling through the pipe 820, the computing device 105 can identify an entry in the lookup table that indicates a gas leak or greater than a threshold likelihood (e.g., 35%, 50%, 60%, etc.) of a gas leak.

As another example, the computing device 105 can use a machine learning model to identify the event. The ML model can be particular for the medium or type of medium that the sensing device is fitted to. For example, the ML model can be a model for the gas line pipe 820 shown in FIG. 8. The computing device 105 can provide as input to the ML model the level of vibrations identified from the sensor data 806*a*, the level of audio energy identified from the sensor data 804*a*, and/or the determined flow rate of gas moving through the pipe 820. The output of the ML model can be a value that indicates normal use of gas in a property that receives gas from the pipe 820.

The process 1200 includes generating a notification indicating the event at the property. For example, the computing device 105 can generate a notification in response to determining that a gas leak is occurring. The notification can indicate that there is a gas leak or greater than a threshold likelihood of a gas leak. The notification can be presented on a display of the computing device. Additionally or alternatively, the notification can be transmitted to one or more computing devices, such as mobile computing devices of occupants of the property or to a motorized shut-off valve for a gas line of the property. For example, the notification can be or include instructions to control a motorized shut-off valve for the main gas of the property. The computing device 105 can transmit these instructions to the motorized shut-off valve to turn off the gas being provided to the property and, thereby, improving the safety afforded to occupants of the property.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for detecting movement of fluid through a restricted area, the method comprising:
receiving, by one or more computers and from a flexible sensing device fitted to a medium that includes the restricted area through which fluid can move, sensor data over a period of time;
identifying, by the one or more computers and from the sensor data, at least one of a level of vibration of the medium or a level of audio energy from the medium in the period of time;
based on the at least one of the level of vibration or the level of audio energy, determining, by the one or more computers, a flow rate of fluid moving through the restricted area of the medium;
based on the at least one of the flow rate and the period of time, determining, by the one or more computers, an event at a property that receives at least a portion of fluid moving through the restricted area of the medium; and
generating, by the one or more computers, a notification indicating the event at the property.

2. The method of claim 1, wherein receiving sensor data over the period of time comprises receiving vibration data over the period of time, wherein the vibration data is generated by a vibration sensor of the flexible sensing device that is configured to detect vibrations of the medium,
wherein identifying at least one of the vibrations of the medium or the level of audio energy corresponding to the medium over the period of time comprises identifying, from the vibration data, the vibrations of the medium over the period of time, and
wherein determining the flow rate of fluid moving through the restricted area of the medium is based on the vibrations of the medium over the period of time.

3. The method of claim 1, wherein receiving sensor data over the period of time comprises receiving audio data over the period of time, wherein the audio data is generated by a microphone of the flexible sensing device that is configured to detect audio energy output by the medium due to fluid flowing through the restricted area of the medium,
wherein identifying at least one of the vibrations of the medium or the level of audio energy corresponding to the medium over the period of time comprises identifying, from the audio data, the level of audio energy over the period of time, and
wherein determining the flow rate of fluid moving through the restricted area of the medium is based on the level of audio energy over the period of time.

4. The method of claim 1, comprising determining, from the sensor data, a rate of change in the vibrations over the period of time; and
wherein determining the flow rate of fluid moving through the restricted area of the medium comprises determining the flow rate of fluid moving through the restricted area of the medium is based on the rate of change in the vibrations over the period of time.

5. The method of claim 1, comprising determining, from the sensor data, a rate of change in the level of audio energy over the period of time; and
wherein determining the flow rate of fluid moving through the restricted area of the medium comprises determining the flow rate of fluid moving through the restricted area of the medium is based on the rate of change the level of audio energy over the period of time.

6. The method of claim 1, comprising using the flow rate to generate a likelihood that a particular appliance is running or that a particular fixture is using fluid, wherein the appliance or the fixture receives fluid from the restricted area of the medium,
wherein determining the event at the property comprises:
determining that the likelihood is greater than a likelihood threshold, indicating that the appliance is running or that the fixture is using fluid;
determining that the likelihood is less than a likelihood threshold and that flow rate is less than a threshold flow rate, indicating that the appliance is not running or that the fixture is not using fluid; or
determining that the likelihood is less than a likelihood threshold and that the flow rate is greater than a threshold flow rate, indicating that fluid is leaking; and
wherein generating the notification comprises:

generating a notification indicating that the appliance is running or that the fixture is using fluid;
generating a notification indicating the appliance has stopped running or that the fixture has stopped using fluid; or
generating a notification indicating that a fluid leak has been detected.

7. The method of claim 6, wherein using the flow rate to calculate the likelihood that the particular appliance is running or that the particular fixture is using fluid comprises:
increasing the likelihood in response to determining that the period of time is in a period of time when the appliance is typically running or the fixture is typically used; or
decreasing the likelihood in response to determining that the period of time is outside of a period of time when the appliance is typically running or the fixture is typically used.

8. The method of claim 6, wherein using the flow rate to calculate the likelihood that the particular appliance is running or that the particular fixture is using fluid comprises:
receiving information indicating an action performed by one or more occupants of the property at a time immediately preceding the period of time or during the period of time; and
changing the likelihood in response to the action by the one or more occupants.

9. The method of claim 8, wherein:
receiving information indicating the action comprises receiving a notification indicating that power being drawn from the appliance is greater than a threshold amount of power; and
changing the likelihood in response to the action comprises increasing the likelihood in response to receiving the notification indicating that the power being drawn from the appliance is greater than the threshold amount of power.

10. The method of claim 8, wherein:
receiving information indicating the action comprises receiving image data indicating that the one or more occupants of the property are in area of the property (i) where the appliance or the fixture is located and (ii) at a time immediately preceding the period of time or during the period of time; and
changing the likelihood in response to the action comprises increasing the likelihood in response to receiving the image data.

11. The method of claim 8, wherein:
receiving information indicating the action comprises receiving location data indicating that the one or more occupants of the property are away from the property during the period of time; and
changing the likelihood in response to the action comprises decreasing the likelihood in response to receiving the location data.

12. The method of claim 6, wherein using the flow rate to calculate the likelihood that the particular appliance is running or that the particular fixture is using fluid comprises:
using the sensor data to identify a category of medium that the medium belongs to;
determining that the appliance belongs to a type of appliance or the fixture belongs to a type of fixture that receives fluid from mediums in the identified category of medium; and
increasing the likelihood in response to the determination.

13. The method of claim 1, wherein determining the event at the property comprises:

based on the flow rate, determining that a particular appliance is running, wherein the appliance is an appliance in the property and receives fluid from the medium;
based on the flow rate, determining that a particular fixture is using fluid, wherein the fixture is a fixture of the property and receives fluid from the medium;
based on the flow rate and the period of time, determining that a particular appliance is running at a time when the particular appliance is not expected to be running, wherein the appliance is an appliance in the property and receives fluid from the medium;
based on the flow rate and the period of time, determining that a particular fixture in the property is using fluid at a time when the particular fixture is not expected to be using fluid, wherein the fixture is a fixture in the property and receives fluid from the medium;
based on the flow rate and the period of time, determining that an appliance has been running for more than a threshold time, wherein the appliance is an appliance in the property and receives fluid from the medium;
based on the flow rate and the period of time, determining that a fixture has been using fluid for more than a threshold time, wherein the fixture is a fixture in the property and receives fluid from the medium;
based on the flow rate, determining that the flow rate is greater than a threshold flow rate for a particular appliance or fixture of the property;
based on the flow rate, determining that the flow rate is less than a threshold flow rate for a particular appliance or fixture of the property;
based on the flow rate, determining that the flow rate deviates more than a threshold percentage from an expected flow rate for a particular appliance or fixture of the property;
based on the flow rate and the period of time, determining that a volume of fluid is greater than a threshold volume of fluid for a particular appliance or fixture;
based on the flow rate and the period of time, determining that a volume of fluid is less than a threshold volume of fluid for a particular appliance or fixture; or
based on the flow rate and the period of time, determining that a volume of fluid deviates more than a threshold percentage from an expected volume of fluid for a particular appliance or fixture.

14. The method of claim 1, the method comprising:
collecting, over a second period of time, use data for one or more occupants of the property, wherein the use data indicates at least one of (i) a frequency of use of an appliance or a fixture that receives at least a portion of the fluid moving through the restricted area, (ii) times of use of an appliance or a fixture that receives at least a portion of the fluid moving through the restricted area, or (iii) a pattern of use of an appliance or a fixture that receives at least a portion of the fluid moving through the restricted area over the second period of time;
training a machine learning model using the use data, wherein the use data indicates typical use of the appliance or the fixture over the second period of time, and wherein training the machine learning model comprises training the machine learning model to recognize typical use of the fixture or the appliance by the one or more occupants;
providing (i) the sensor data or (ii) the flow rate as input to the machine learning model; and after providing the sensor data or the flow rate as input to the machine learning model, receiving an output of the machine learning model indicating atypical use of the appliance or the fixture based on the sensor data or the flow rate, wherein generating the notification indicating the event at the property comprises generating an alert indicating atypical use of the appliance or the fixture.

15. The method of claim 14, the method comprising:
collecting, over a third period of time, second use data for the one or more occupants of the property, wherein the second use data indicates at least one of a frequency of use of the appliance or the fixture, times of use of the appliance or the fixture, or a pattern of use of the appliance or the fixture over the third period of time, and wherein the third period of time (i) starts after the second period of time, (ii) starts at a beginning of the second period of time and ends at a time after an end of the second period of time, or (iii) starts at a time in the second period of time and ends at a time after the end of the second period of time; and
updating the machine learning model using the second use data, wherein the second use data indicates a change to the typical use of the appliance or the fixture by the one or more occupants, and wherein updating the machine learning model comprises updating the machine learning model to recognize typical use of the fixture or the appliance that accounts for the change to the typical use of the appliance or the fixture.

16. The method of claim 15, the method comprising:
providing the sensor data or the flow rate as input to the updated machine learning model;
after providing the sensor data or the flow rate as input to the updated machine learning model, receiving an output of the updated machine learning model indicating typical use of the appliance or the fixture based on the sensor data or the flow rate; and
in response to receiving the output of the updated machine learning model indicating typical use of the appliance or the fixture, removing the alert or generating a second notification indicating typical use of the appliance or fixture.

17. A device for detecting movement of fluid through a restricted area, the device comprising:
a flexible substrate having a first end, a second end, a first side, and a second side;
a printed circuit board disposed on the first side of the flexible substrate;
a power source electronically coupled to the printed circuit board and disposed on the first side of the flexible substrate; and
one or more sensors electronically coupled to the circuit board and configured to collect sensor data from a medium that includes a restricted area through which fluid can move,
wherein the printed circuit board includes:
a microprocessor configured to obtain the sensor data from the one or more sensors and provide instructions to a transmitter to transmit the sensor data; and
the transmitter configured to transmit sensor data obtained from the one or more sensors,
wherein the flexible substrate is configured to be wrapped around the medium,
wherein a length of the flexible substrate from the first end to the second end is greater than a width of the substrate at the first end, and
wherein a length of the flexible substrate from the first end to the second end is greater than a width of the substrate at the second end.

18. The device of claim 17, wherein the one or more sensors comprise a microphone electronically coupled to the circuit board, and
wherein the sensor data includes sensor data obtained from the microphone.

19. The device of claim 17, wherein the one or more sensors comprise a vibration sensor electronically coupled to the circuit board, and
wherein the sensor data includes sensor data obtained from the vibration sensor.

20. The device of claim 17, wherein the one or more sensors comprise a temperature sensor electronically coupled to the circuit board, and
wherein the sensor data includes sensor data obtained from the temperature sensor.

21. The device of claim 17, wherein the one or more sensors comprise multiple sensors, and
wherein the sensor data includes sensor data obtained from the multiple sensors.

22. The device of claim 17, the device comprises a wake-on-sound sensor,
wherein the device is configured to operate in a first power mode when the wake-on-sound sensor does not detect more than a threshold level of audio energy such that the one or more sensors draw a first level of power from the power source, and
wherein the device is configured to operate in a second power mode when the wake-on-sound sensor detects more than a threshold level of audio energy such that the one or more sensors draw a second level of power from the power source that is greater than the first level of power.

23. The device of claim 17, comprising notches along at least a portion of the first side of the flexible substrate towards the second end of the flexible substrate,
wherein the notches correspond to measurements that indicate a diameter, radius, or circumference of the medium that the flexible substrate can be wrapped around.

24. The device of claim 17, comprising:
a first layer of fasteners disposed on the second side of the flexible substrate towards the first end of the flexible substrate; and
a second layer of fasteners disposed on the first of the flexible substrate towards the second end of the flexible substrate,
wherein the first layer of fasteners is configured to interact with at least a portion of the second layer of fasteners when the flexible substrate is wrapped around a medium so as to lock a position of the first end of the flexible substrate with respect to the second end of the flexible substrate.

25. The device of claim 17, comprising an adhesive layer disposed on the second side of the flexible substrate that is configured to interact with at least a portion of the first side of the flexible substrate when the flexible substrate is wrapped around a medium so as to lock a position of the first end of the flexible substrate with respect to the second end of the flexible substrate.

26. The device of claim 17, comprising a band disposed on the first side of the flexible substrate towards the first end,
wherein the band and a portion of the first side of the flexible substrate forms a sleeve configured to receive the second end of the flexible substrate when the flexible substrate is wrapped around a medium so as to lock a position of the first end of the flexible substrate with respect to the second end of the flexible substrate.

27. The device of claim 17, wherein the flexible substrate defines a through-hole between the first side of the flexible substrate and the second side of the flexible substrate, and
wherein at least a portion of a sensor of the one or more sensors resides in the through-hole such that a surface of the sensor contacts a surface of a medium when the flexible substrate is wrapped around the medium.

28. The device of claim 27, wherein the flexible substrate defines a second through-hole between the first side of the flexible substrate and the second side of the flexible substrate, and
wherein at least a portion of a second sensor of the one or more sensors resides in the second through-hole.

29. The device of claim 27, wherein the flexible substrate defines a third through-hole between the first side of the flexible substrate and the second side of the flexible substrate, and
wherein at least a portion of a third sensor of the one or more sensors resides in the third through-hole.

30. The device of claim 17, comprising a receiver configured to receive information from one or more external computing systems,
wherein the device is configured to use the transmitter and the receiver to wirelessly communicate over a personal area network that connects one or more other devices.

31. The device of claim 30, wherein the personal area network is a mesh network,
wherein the device serves as an infrastructure node of the mesh network, and
wherein each of the one or more other devices serve as a node of the mesh network.

32. The device of claim 30, comprising a transceiver,
wherein the transceiver includes the transmitter and the receiver.

33. A method for detecting movement of fluid through a restricted area using a flexible sensing device fitted to a medium that includes the restricted area, the method comprising:
obtaining, by one or more sensors of the flexible sensing device, sensor data over a period of time;
identifying, by the flexible sensing device, at least one of a level of vibration of the medium or a level of audio energy from the medium in the period of time; and
based on the level of vibration of the medium or the level of audio energy of the medium, transmitting, to one or more computing devices, a metric for fluid moving through the restricted area of the medium.

34. The method of claim 33, comprising using the sensor data to determine a flow rate of fluid moving through the restricted area of the medium.

35. The method of claim 33, comprising:
determining that the level of vibration of the medium or the level of audio energy from the medium is greater than a threshold level of vibration or a threshold level of audio energy; and
in response determining that the level of vibration of the medium or the level of audio energy from the medium is greater than the threshold level of vibration or the threshold level of audio energy, providing power or additional power to one or more other sensors of the flexible sensing device and collecting second sensor data over a second period of time.

36. The method of claim 35, wherein:
the one or more sensors include a wake-on-sound microphone; and
providing power or additional power to the one or more other sensors of the flexible sensing device and collecting the second sensor data over the second period of time comprises:
providing power or additional power to at least one of a second microphone, to a vibration sensor, and a temperature sensor; and
collecting at least one of audio data, vibration data, and temperature data over the second period of time.

37. The method of claim 33, the method comprising producing the metric,
wherein the metric is the sensor data or a collection of sensor data collected over a second period of time.

38. The method of claim 33, the method comprising generating the metric,
wherein the metric is a normalized value determined using the sensor data or a collection of sensor data collected over a second period of time.

39. The method of claim 33, the method comprising generating the metric,
wherein the metric is a flow rate of fluid through the restricted area of the medium determined using the sensor data or a collection of sensor data collected over a second period of time.

40. The method of claim 33, the method comprising generating the metric,
wherein the metric is a volume of fluid that has passed through the restricted area of the medium in the period of time or in a second period of time.

* * * * *